United States Patent
Pham Van et al.

(10) Patent No.: US 12,267,527 B2
(45) Date of Patent: Apr. 1, 2025

(54) OCCUPANCY CODING USING INTER PREDICTION IN GEOMETRY POINT CLOUD COMPRESSION

(71) Applicant: QUALCOMM Incorporated, San Diego, CA (US)

(72) Inventors: Luong Pham Van, San Diego, CA (US); Geert Van der Auwera, San Diego, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/810,106

(22) Filed: Jun. 30, 2022

(65) Prior Publication Data

US 2023/0018907 A1   Jan. 19, 2023

Related U.S. Application Data

(60) Provisional application No. 63/217,648, filed on Jul. 1, 2021.

(51) Int. Cl.
*H04N 19/597* (2014.01)
*H04N 19/105* (2014.01)
(Continued)

(52) U.S. Cl.
CPC ......... *H04N 19/597* (2014.11); *H04N 19/105* (2014.11); *H04N 19/109* (2014.11);
(Continued)

(58) Field of Classification Search
CPC .. H04N 19/597; H04N 19/105; H04N 19/109; H04N 19/13; H04N 19/159;
(Continued)

(56) References Cited

U.S. PATENT DOCUMENTS

2020/0242811 A1* 7/2020 Wang .................. G06T 9/00
2020/0288161 A1* 9/2020 Wang .................. G06T 17/00
(Continued)

OTHER PUBLICATIONS

ISO/IEC 23090-9:2020(E): "Geometry-Based Point Cloud Compression", CH, 1214 Vernier, Geneva, © ISO/IEC 2020 (Year: 2020).*

(Continued)

*Primary Examiner* — Dramos Kalapodas
(74) *Attorney, Agent, or Firm* — QUALCOMM Incorporated; Espartaco Diaz Hidalgo

(57) ABSTRACT

An example device for coding point cloud data includes a memory configured to store point cloud data; and one or more processors implemented in circuitry and configured to: determine whether inter prediction data is coded for a current node of an octree of the point cloud data; determine whether planar mask data is coded for the current node; when at least one of the inter prediction data or the planar mask data is coded for the current node, avoid coding a single occupancy value for the current node, the single occupancy value indicating whether only a single sub-node of the current node includes a point; and code the current node. The processors may also be configured to determine a context for entropy coding the planar mask data according to planar mask data for a collocated node in a reference frame when the planar mask data is coded.

30 Claims, 15 Drawing Sheets

(51) Int. Cl.
*H04N 19/109* (2014.01)
*H04N 19/13* (2014.01)
*H04N 19/159* (2014.01)
*H04N 19/167* (2014.01)
*H04N 19/172* (2014.01)
*H04N 19/196* (2014.01)

(52) U.S. Cl.
CPC ........... *H04N 19/13* (2014.11); *H04N 19/159* (2014.11); *H04N 19/167* (2014.11); *H04N 19/172* (2014.11); *H04N 19/196* (2014.11)

(58) Field of Classification Search
CPC .. H04N 19/167; H04N 19/172; H04N 19/196; G06T 9/004; G06T 9/40
See application file for complete search history.

(56) References Cited

U.S. PATENT DOCUMENTS

| | | | | |
|---|---|---|---|---|
| 2021/0084333 | A1* | 3/2021 | Zhang | H04N 19/96 |
| 2021/0211734 | A1* | 7/2021 | Ray | H04N 19/70 |
| 2022/0343556 | A1* | 10/2022 | Iguchi | G06T 9/001 |
| 2023/0118907 | A1* | 4/2023 | Iguchi | H04N 19/119 |
| | | | | 375/240.02 |
| 2023/0239501 | A1* | 7/2023 | Oh | H04N 19/136 |
| | | | | 375/240.08 |
| 2023/0316581 | A1* | 10/2023 | Lee | H04N 19/56 |
| | | | | 375/240.01 |

OTHER PUBLICATIONS

Shishir Subramanyam (hereinafter Subramanyam); "Inter frame compression for 3D dynamic point clouds", Oct. 2017 (Year: 2017).*
"G-PCC Future Enhancements", 130. MPEG Meeting, Apr. 20, 2020-Apr. 24, 2020, Alpbach, Motion Picture Expert Group or ISO/IEC JTC1/SC29/WG11, No. n19328, Jul. 21, 2020, XP030289575.
International Search Report and Written Opinion—PCT/US2022/073349—ISA/EPO—Oct. 17, 2022, 13 Pages.
ISO/IEC 23090-9:2020(E): "Information Technology—MPEG-1, Coded Representation of Immersive Media—Part 9: Geometry-based Point Cloud Compression", 132, MPEG Meeting, Oct. 12, 2020-Oct. 16, 2020, Motion Picture Expert Group or ISO/IEC JTC1/SC29/WG11, No. n19617, Apr. 12, 2022, 141 Pages, XP030304108.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
Van L. P., et al., "[G-PCC] [EE13.2 Test 1]: InterEM with Planar Mode Enabled", 135. MPEG Meeting, Jul. 12, 2021-Jul. 16, 2021, Online, Motion Picture Expert Group or ISO/IEC JTC1/SC29/WG11, No. m57286, Jul. 3, 2021, 8 Pages, XP030296800.
Van L. P., et al., "Improved global motion estimation for G-PCC", 133. MPEG Meeting, Jan. 11, 2021-Jan. 15, 2021, Online, Motion Picture Expert Group or ISO/IEC JTC1/SC29/WG11, No. m56113, Jan. 12, 2021, 12 Pages, XP030291074.

* cited by examiner

OCCUPANCY CODING USING INTER PREDICTION IN GEOMETRY POINT CLOUD COMPRESSION

This application claims the benefit of U.S. Provisional Application No. 63/217,648, filed Jul. 1, 2021, the entire contents of which are hereby incorporated by reference.

TECHNICAL FIELD

This disclosure relates to point cloud encoding and decoding.

BACKGROUND

A point cloud contains a set of points in a 3D space. Each of the points may have a set of attributes associated with the point. The attributes may be color information, such as R, G, B or Y, Cb, Cr information, or reflectance information, or other attributes. Point clouds may be captured by a variety of cameras or sensors such as LIDAR sensors and 3D scanners. Point clouds may also be computer-generated. Point cloud data may be used in a variety of applications including, but not limited to, construction (modeling), graphics (3D models for visualizing and animation), and the automotive industry (LIDAR sensors used to help in navigation).

A point cloud encoder/decoder (codec) may enclose the 3D space occupied by point cloud data in a virtual bounding box. The position of the points in the bounding box may be represented by a certain precision. Therefore, the point cloud codec may quantize positions of one or more points based on the precision. At the smallest level, the point cloud codec splits the bounding box into voxels, which are the smallest unit of space represented by a unit cube. A voxel in the bounding box may be associated with zero, one, or more than one point. The point cloud codec may split the bounding box into multiple cube/cuboid regions, which may be called tiles. The point cloud codec may code the tiles into one or more slices. The partitioning of the bounding box into slices and tiles may be based on a number of points in each partition, or based on other considerations (e.g., a particular region may be coded as tiles). The slice regions may be further partitioned using splitting decisions.

SUMMARY

In general, this disclosure describes techniques for coding (encoding and decoding) point cloud data. A Geometry Point Cloud Compression (G-PCC) encoder may encode a point cloud using inter-prediction. In particular, the G-PCC encoder may calculate a global motion vector for a previous (reference) frame relative to a current frame to be encoded, then generate a prediction frame by applying the global motion vector to the previous frame. Application of the global motion vector may include moving each point in the reference frame by the global motion vector to form the prediction frame. The G-PCC encoder may then, in some examples, encode local motion vectors for one or more points of the prediction frame to reposition the predicted points to proper locations. Additionally or alternatively, the G-PCC encoder may use the predicted points to determine a context for encoding a binary value representing occupancy for a current node of the current frame.

In some examples, the G-PCC encoder may encode occupancy of a current node in inter prediction using planar mode. That is, a node of an octree in G-PCC may be partitioned into eight sub-nodes. The node may have three axes: X, Y, and Z-axes. There may be two planes per axis, an "upper" plane and a "lower" plane. If all points of a node are within a single plane along a particular axis, the node may be planar along that axis (i.e., in the direction of that axis). For example, for the Y-axis, if all points of the node are in the upper four sub-nodes, the node may be said to be planar along the Y-axis. Furthermore, by indicating that the node is planar along the Y-axis, and by indicating that the points are all in the upper plane, occupancy data need not be coded for the sub-nodes of the lower plane.

In some examples, the G-PCC encoder may also encode occupancy of a current node using a single occupancy value. The single occupancy value indicates whether only exactly one sub-node of the current node is occupied (i.e., the single occupancy value indicating whether only a single sub-node of the current node includes one or more points). This disclosure recognizes, however, that single occupancy coding may not be efficient when either of inter prediction and/or planar mode data is encoded. Therefore, the G-PCC encoder may determine not to encode the single occupancy value when either or both of planar mode data and/or inter prediction data is encoded for the current node. Likewise, a G-PCC decoder may determine that the single occupancy value is not included in the bitstream when either or both of planar mode data and/or inter prediction data is included in the bitstream for the current node.

As discussed above, in some examples, the G-PCC encoder may encode planar mode data for a current node. The planar mode data may include data indicating whether the current node is planar in each of three axes. The G-PCC encoder may determine contexts for encoding the data indicating whether the current node is planar in the directions of each of the three axes according to a position of a plane in the corresponding axis direction for a collocated reference node.

In one example, a device for coding point cloud data includes: a memory configured to store point cloud data; and one or more processors implemented in circuitry and configured to: determine whether inter prediction data is coded for a current node of an octree of the point cloud data; determine whether planar mask data is coded for the current node; when at least one of the inter prediction data or the planar mask data is coded for the current node, avoid coding a single occupancy value for the current node, the single occupancy value indicating whether only a single sub-node of the current node includes one or more points; and code the current node.

In another example, a method of coding point cloud data includes: determining whether inter prediction data is coded for a current node of an octree of point cloud data; determining whether planar mask data is coded for the current node; and when at least one of the inter prediction data or the planar mask data is coded for the current node, avoiding coding a single occupancy value for the current node, the single occupancy value indicating whether only a single sub-node of the node includes one or more points.

In another example, a computer-readable storage medium has stored thereon instructions that, when executed, cause a processor to: determine whether inter prediction data is coded for a current node of an octree of point cloud data; determine whether planar mask data is coded for the current node; and when at least one of the inter prediction data or the planar mask data is coded for the current node, avoid coding a single occupancy value for the current node, the single occupancy value indicating whether only a single sub-node of the node includes one or more points.

In another example, a device for coding point cloud data includes: means for determining whether inter prediction data is coded for a current node of an octree of point cloud data; means for determining whether planar mask data is coded for the current node; and means for avoiding coding a single occupancy value for the current node, the single occupancy value indicating whether only a single sub-node of the node includes one or more points when at least one of the inter prediction data or the planar mask data is coded for the current node.

The details of one or more examples are set forth in the accompanying drawings and the description below. Other features, objects, and advantages will be apparent from the description, drawings, and claims.

DETAILED DESCRIPTION

Figure 1:
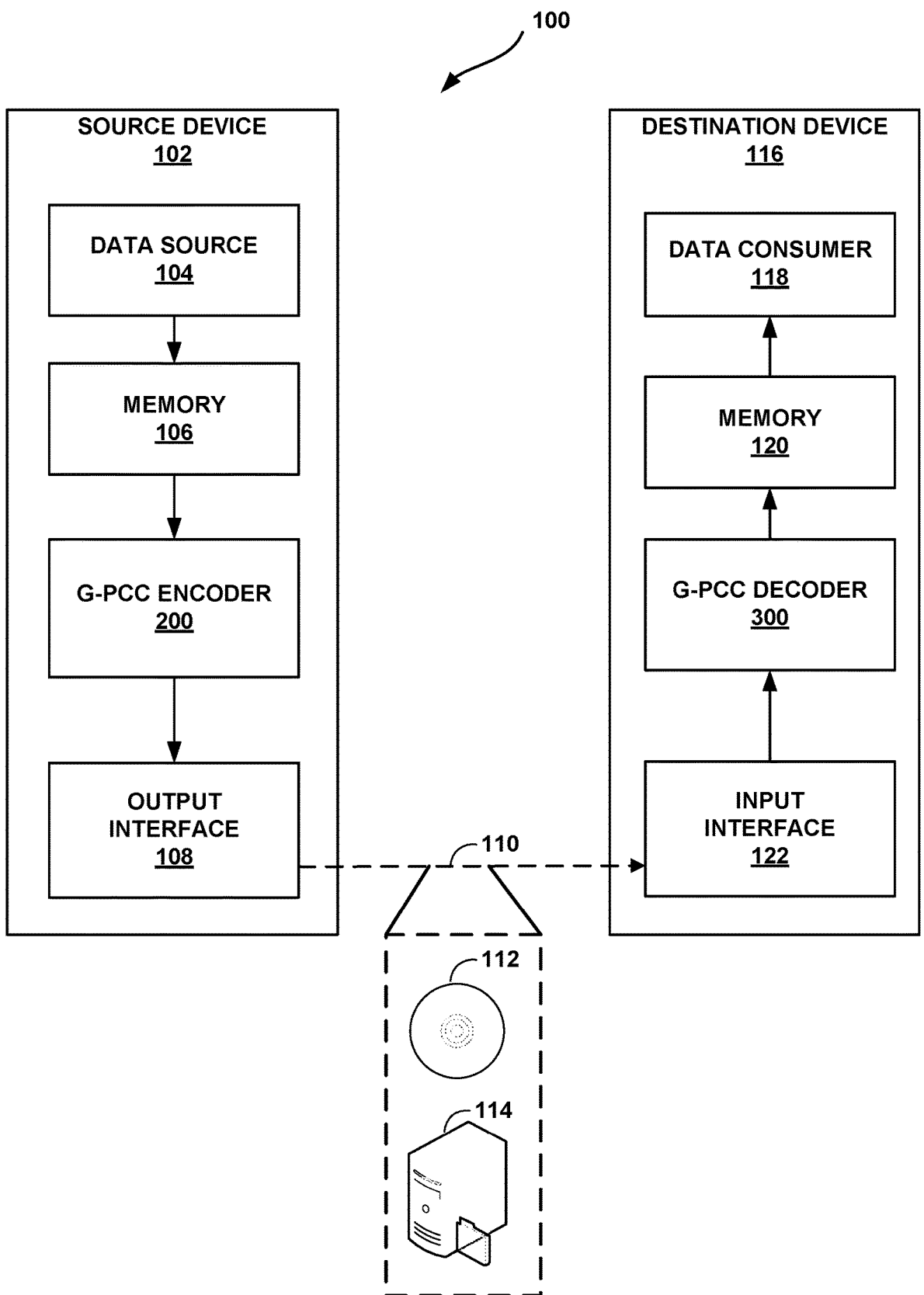
FIG. 1 is a block diagram illustrating an example encoding and decoding system that may perform the techniques of this disclosure.

Point cloud data may be generated by using, for example, a LIDAR system mounted to an automobile. The LIDAR system may emit lasers in multiple different directions in bursts over time as the automobile is moving. Thus, for a given laser emission, a point cloud may be formed. To compress the point cloud data, respective point clouds (frames) may be coded relative to each other, e.g., using intra-frame prediction or inter-frame prediction.

In general, this disclosure describes techniques for coding (encoding and decoding) point cloud data. A Geometry Point Cloud Compression (G-PCC) encoder may encode a point cloud using inter-prediction. In particular, the G-PCC encoder may calculate a global motion vector for a previous (reference) frame relative to a current frame to be encoded, then generate a prediction frame by applying the global motion vector to the previous frame. Application of the global motion vector may include moving each point in the reference frame by the global motion vector to form the prediction frame. The G-PCC encoder may then, in some examples, encode local motion vectors for one or more points of the prediction frame to reposition the predicted points to proper locations. Additionally or alternatively, the G-PCC encoder may use the predicted points to determine a context for encoding a binary value representing occupancy for a current node of the current frame.

In some examples, the G-PCC encoder may encode occupancy of a current node in inter prediction using planar mode. That is, a node of an octree in G-PCC may be partitioned into eight sub-nodes. The node may have three axes: X, Y, and Z-axes. There may be two planes per axis, an "upper" plane and a "lower" plane. If all points of a node are within a single plane along a particular axis, the node may be said to be planar along that axis (i.e., in the direction of that axis). For example, for the Y-axis, if all points of the node are in the upper four sub-nodes, the node may be said to be planar along the Y-axis. Furthermore, by indicating that the node is planar along the Y-axis, and by indicating that the points are all in the upper plane, occupancy data need not be coded for the sub-nodes of the lower plane.

In some examples, the G-PCC encoder may also encode occupancy of a current node using a single occupancy value. The single occupancy value indicates whether only exactly one sub-node of the current node is occupied. This disclosure recognizes, however, that single occupancy coding may not be efficient when either of inter prediction and/or planar mode data is encoded. Therefore, the G-PCC encoder may determine not to encode the single occupancy value when either or both of planar mode data and/or inter prediction data is encoded for the current node. Likewise, a G-PCC decoder may determine that the single occupancy value is not included in the bitstream when either or both of planar mode data and/or inter prediction data is included in the bitstream for the current node.

By not coding the single occupancy data when inter prediction and/or planar mode data are coded for a current node, these techniques may reduce processing performed by the G-PCC encoder and decoder. Likewise, these techniques may reduce the size of the bitstream, relative to if the single occupancy data were encoded in these circumstances (i.e., when inter prediction and/or planar mode data are coded for a current node).

As discussed above, in some examples, the G-PCC encoder may encode planar mode data for a current node. The planar mode data may include data indicating whether the current node is planar in each of three axes. The G-PCC encoder may determine contexts for encoding the data indicating whether the current node is planar in the directions of each of the three axes according to a position of a plane in a collocated node of a reference frame in the direction of the corresponding axis (if the collocated node is planar; if the collocated node is not planar in that direction, a value of "A" may be used). Likewise, the G-PCC decoder may similarly determine contexts for entropy decoding of the planar mode data.

By determining contexts for entropy coding the planar mode data in this manner, these techniques may increase the efficiency of entropy coding for planar mode data. This increased efficiency may reduce the bitrate for the coded point cloud bitstream.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may compress and/or decompress point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. G-PCC encoder 200 of source device 102 and G-PCC decoder 300 of destination device 116 may be configured to apply the techniques of this disclosure related to occupancy coding using inter-prediction in G-PCC. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to occupancy coding using inter-prediction in G-PCC. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, uncoded point cloud data) and may provide a sequential series of "frames" of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Additionally or alternatively, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A draft of the G-PCC standard is available in G-PCC DIS, ISO/IEC JTC1/SC29/

WG11 w19617 (hereinafter, "Draft 8"), and a description of the codec is available in G-PCC Codec Description, ISO/IEC JTC1/SC29/WG11 N001, Teleconference, October 2020.

A point cloud contains a set of points in a three-dimensional (3D) space, and may have attributes associated with the point. The attributes may be color information such as R, G, B or Y, Cb, Cr, or attributes such as reflectance information or other such attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

The units shown are logical, and do not necessarily correspond one-to-one to implemented code in the reference implementation of G-PCC codec, i.e., TMC13 test model software studied by ISO/IEC MPEG (JTC 1/SC 29/WG 11). Similarly, the units shown do not necessarily correspond one-to-one to hardware units in a hardware implementation of the G-PCC codec.

In both G-PCC encoder 200 and G-PCC decoder 300, point cloud positions are coded first. Attribute coding depends on the decoded geometry. For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

G-PCC encoder 200 may encode occupancy data using inter-prediction, planar mode, single occupancy data, or the like. When encoding occupancy using inter-prediction, G-PCC encoder 200 may calculate a global motion vector relative to a reference frame of a previously encoded frame (reference frame) of point cloud data. The global motion vector may indicate motion of points in the reference frame to form a prediction frame. To calculate the global motion vector, G-PCC encoder 200 may estimate motion between reference points in the reference frame and current points in the current frame, and determine the global motion vector that best represents the cumulative motion for each of the points. G-PCC encoder 200 may then apply the global motion vector to the reference frame to generate a prediction frame. G-PCC encoder 200 may then calculate and encode local motion vectors for one or more nodes of the prediction frame (or one or more points of the prediction frame) that indicate positions of the points in the current frame.

Additionally or alternatively, G-PCC encoder 200 may encode occupancy directly by using the predicted points in the prediction frame to determine contexts to entropy encode occupancy of a current node. That is, G-PCC encoder 200 may determine whether a collocated node in the prediction frame is occupied, and use this determination to encode data indicating whether the current node is occupied.

G-PCC encoder 200 may also encode occupancy data in planar mode. That is, the current node may be partitioned into eight sub-nodes: a front-upper-left sub-node, a front-upper-right sub-node, a rear-upper-left sub-node, a rear-upper-right sub-node, a front-lower-left sub-node, a front-lower-right sub-node, a rear-lower-left sub-node, and a rear-lower-right sub-node. In this manner, the current node may be partitioned along different axes: an X-axis that divides the current node into left and right sub-nodes, a Y-axis that divides the current node into upper and lower sub-nodes, and a Z-axis that divides the current node into front and rear sub-nodes. In planar mode, if all of the points of a current node belong to the same plane for a given one of the axes, the current node may be said to be planar in the direction of that axis. Thus, if a current node is planar in the direction of one of the axes, G-PCC encoder 200 may encode data indicating that the current node is planar in the direction of that axis, as well as data indicating which of the planes contains the points of the current node. In this manner, G-PCC encoder 200 need not encode occupancy data for sub-nodes of the current node in the other plane of the same direction.

In some examples, when planar mode data is encoded for the current node, G-PCC encoder 200 may entropy encode the planar mode data. Entropy coding involves determining a context for encoding one or more bits or "bins" of a value, where the context indicates a probability of the value being, e.g., 0 or 1. According to the techniques of this disclosure, G-PCC encoder 200 may determine the context for entropy encoding the planar mask data according to planar mask data for a collocated node in a reference frame for the current node. For example, if the collocated node is planar in a particular direction, G-PCC encoder 200 may determine a first or second context for entropy encoding data indicating whether the current node is planar in the same direction according to a position of the plane in the collocated node and in the direction. On the other hand, if the collocated node is not planar in that direction, G-PCC encoder 200 may determine a third context for entropy encoding the data indicating whether the current node is planar in the direction. The value indicating whether the current node is planar in a particular direction may be is_planar_flag[axisIdx], where axisIdx indicates the direction of the axis and is_planar_flag [axisIdx] indicates whether the current node is planar in the direction indicated by axisIdx. Thus, is_planar_flag[ ] may be an array of three values, where axisIdx may have a value of 0, 1, or 2, e.g., for the X-, Y-, and Z-axes.

In some examples, G-PCC encoder 200 may encode single occupancy data for a current node. In general, the single occupancy data may indicate whether only a single one of the sub-nodes of the current node is occupied (i.e., the single occupancy value may indicates whether only a single sub-node of the current node includes one or more points), and if so, an index indicating which of the sub-nodes is occupied. According to the techniques of this disclosure, G-PCC encoder 200 may determine whether inter-prediction occupancy data is encoded for the current node, and/or whether planar mode data is encoded for the current node. If either the inter-prediction occupancy data or the planar mode data is encoded for the current node, G-PCC encoder 200 may avoid encoding the single occupancy data for the current node. However, if both the inter-prediction occupancy data and the planar mode data are not encoded for the current node, G-PCC encoder 200 may encode the single occupancy data for the current node.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail, a finer representation of the point cloud attribute may be obtained. Each level of detail may be specified based on distance metric from the neighboring nodes or based on a sampling distance.

G-PCC encoder 200 may quantize the residuals obtained as the output of the coding methods for the attributes. G-PCC encoder 200 may entropy encode the quantized residuals using context adaptive arithmetic coding.

G-PCC decoder 300 may be configured to perform a substantially similar, albeit reciprocal, process to decode G-PCC data encoded by G-PCC encoder. For example, G-PCC decoder 300 may decode occupancy data using inter-prediction, planar mode, single occupancy data, or the like. When decoding occupancy using inter-prediction, G-PCC decoder 300 may decode a global motion vector for a current node. The global motion vector may indicate motion of points in a reference frame to form a prediction frame. G-PCC decoder 300 may then apply the global motion vector to the reference frame to generate a prediction frame. G-PCC decoder 300 may decode local motion vectors for one or more nodes of the prediction frame (or one or more points of the prediction frame) that indicate positions of the points in the current frame.

Additionally or alternatively, G-PCC decoder 300 may decode occupancy directly by using the predicted points in the prediction frame to determine contexts to entropy decode occupancy of a current node. That is, G-PCC decoder 300 may determine whether a collocated node in the prediction frame is occupied, and use this determination to decode data indicating whether the current node is occupied.

G-PCC decoder 300 may also decode occupancy data in planar mode. G-PCC decoder 300 may decode data indicating whether the current node is planar in the direction of a particular axis, as well as data indicating which of the planes contains the points of the current node if the current node is planar in that direction. G-PCC decoder 300 may decode this data for each of the three axes, e.g., X-, Y-, and Z-axes. In this manner, G-PCC decoder 300 need not decode occupancy data for sub-nodes of the current node in the other plane of the same direction. That is, G-PCC decoder 300 may determine that occupancy data will not be included in the bitstream for the other plane of the same direction.

In some examples, when planar mode data is included in the bitstream for the current node, G-PCC decoder 300 may entropy decode the planar mode data. According to the techniques of this disclosure, G-PCC decoder 300 may determine the context for entropy decoding the planar mask data according to planar mask data for a collocated node in a reference frame for the current node. For example, if the collocated node is planar in a particular direction, G-PCC decoder 300 may determine a first or second context for entropy encoding data indicating whether the current node is planar in the same direction according to a position of the plane in the collocated node and in the direction. On the other hand, if the collocated node is not planar in that direction, G-PCC decoder 300 may determine a third context for entropy encoding the data indicating whether the current node is planar in the direction. The value indicating whether the current node is planar in a particular direction may be is_planar_flag[axisIdx], where axisIdx indicates the direction of the axis and is_planar_flag[axisIdx] indicates whether the current node is planar in the direction indicated by axisIdx. Thus, is_planar_flag[ ] may be an array of three values, where axisIdx may have a value of 0, 1, or 2, e.g., for the X-, Y-, and Z-axes.

In some examples, G-PCC decoder 300 may decode single occupancy data for a current node. In general, the single occupancy data may indicate whether only a single one of the sub-nodes of the current node is occupied, and if so, an index indicating which of the sub-nodes is occupied. According to the techniques of this disclosure, G-PCC decoder 300 may determine whether inter-prediction occupancy data is included for the current node, and/or whether planar mode data is included for the current node. If either the inter-prediction occupancy data or the planar mode data is encoded for the current node, G-PCC decoder 300 may determine that the bitstream will not include single occupancy data for the current node. That is, while parsing the bitstream, G-PCC decoder 300 may determine whether current bits of the bitstream correspond to the single occupancy data or to a different set of data, and process the current bits accordingly. However, if both the inter-prediction occupancy data and the planar mode data are not encoded for the current node, G-PCC decoder 300 may determine that the bitstream will include the single occupancy data for the current node. Thus, G-PCC decoder 300 may parse the current bits as being single occupancy data and use these bits to determine occupancy of the current node (namely, which of the sub-nodes of the current node is occupied).

Figure 2:
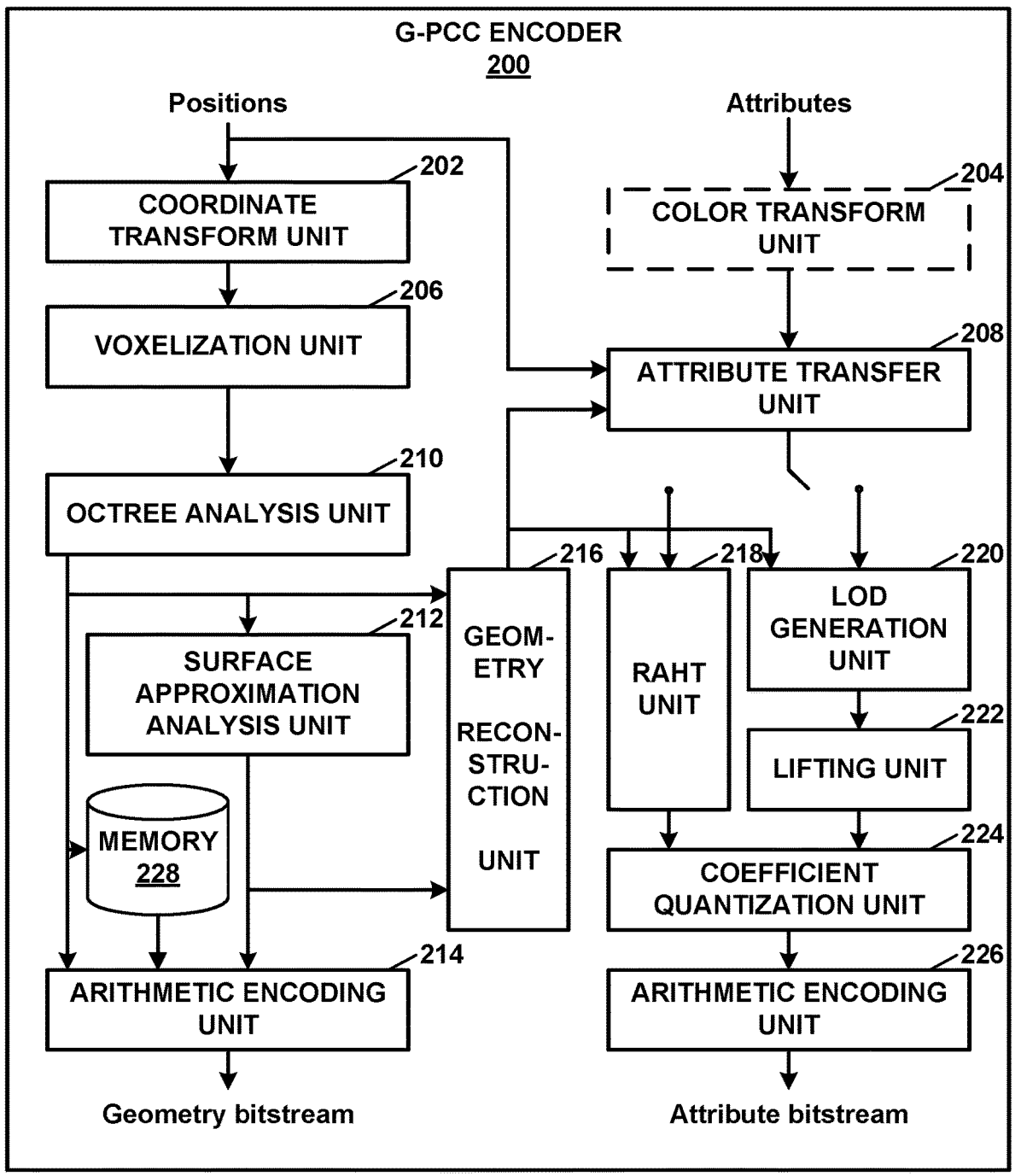
FIG. 2 is a block diagram illustrating an example Geometry Point Cloud Compression (G-PCC) encoder that may be configured to perform the techniques of this disclosure.

FIG. 2 is a block diagram illustrating example components of G-PCC encoder 200 of FIG. 1 that may be configured to perform the techniques of this disclosure. In the example of FIG. 2, G-PCC encoder 200 includes a memory 228, a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Octree analysis unit 210 may also store data representing occupied voxels (i.e., voxels occupied by points of the point cloud) in memory 228 (e.g., in a history buffer of memory 228).

Furthermore, arithmetic encoding unit 214 may entropy encode data representing occupancy of the octree. In some examples, arithmetic encoding unit 214 may entropy encode the occupancy data based only on data of a current point cloud (which may be referred to as "intra-prediction" of the current point cloud). In other examples, arithmetic encoding unit 214 may entropy encode the occupancy data with reference to a previous octree for a previous point cloud, e.g., buffered in memory 228 (which may be referred to as "inter-prediction" of the current point cloud, relative to a reference cloud). Arithmetic encoding unit 214 may perform inter-prediction using local or global motion vectors, e.g., as discussed below in greater detail with respect to FIG. 3.

In particular, in accordance with the techniques of this disclosure, Arithmetic encoding unit 214 may encode occupancy data using inter-prediction, planar mode, single occupancy data, or the like. When encoding occupancy using inter-prediction, arithmetic encoding unit 214 may calculate a global motion vector relative to a reference frame of a previously encoded frame (reference frame) of point cloud data buffered in, e.g., memory 228. The global motion vector may indicate motion of points in the reference frame to form a prediction frame. To calculate the global motion vector, arithmetic encoding unit 214 may estimate motion between reference points in the reference frame and current points in the current frame, and determine the global motion vector that best represents the cumulative motion for each of the points. Arithmetic encoding unit 214 may then apply the global motion vector to the reference frame to generate a prediction frame. Arithmetic encoding unit 214 may then calculate and encode local motion vectors for one or more nodes of the prediction frame (or one or more points of the prediction frame) that indicate positions of the points in the current frame.

Additionally or alternatively, arithmetic encoding unit 214 may encode occupancy directly by using the predicted points in the prediction frame to determine contexts to entropy encode occupancy of a current node. That is, arithmetic encoding unit 214 may determine whether a collocated node in the prediction frame is occupied, and use this determination to encode data indicating whether the current node is occupied.

Arithmetic encoding unit 214 may also encode occupancy data in planar mode. That is, the current node may be partitioned into eight sub-nodes: a front-upper-left sub-node, a front-upper-right sub-node, a rear-upper-left sub-node, a rear-upper-right sub-node, a front-lower-left sub-node, a front-lower-right sub-node, a rear-lower-left sub-node, and a rear-lower-right sub-node. In this manner, the current node may be partitioned along different axes: an X-axis that divides the current node into left and right sub-nodes, a Y-axis that divides the current node into upper and lower sub-nodes, and a Z-axis that divides the current node into front and rear sub-nodes. In planar mode, if all of the points of a current node belong to the same plane for a given one of the axes, the current node may be said to be planar in the direction of that axis. Thus, if a current node is planar in the direction of one of the axes, arithmetic encoding unit 214 may encode data indicating that the current node is planar in the direction of that axis, as well as data indicating which of the planes contains the points of the current node. In this manner, arithmetic encoding unit 214 need not encode occupancy data for sub-nodes of the current node in the other plane of the same direction.

In some examples, when planar mode data is encoded for the current node, arithmetic encoding unit 214 may entropy encode the planar mode data. Entropy coding involves determining a context for encoding one or more bits or "bins" of a value, where the context indicates a probability of the value being, e.g., 0 or 1. According to the techniques of this disclosure, arithmetic encoding unit 214 may determine the context for entropy encoding the planar mask data according to planar mask data for a collocated node in a reference frame for the current node. For example, if the collocated node is planar in a particular direction, arithmetic encoding unit 214 may determine a first or second context for entropy encoding data indicating whether the current node is planar in the same direction according to a position of the plane in the collocated node and in the direction. On the other hand, if the collocated node is not planar in that direction, arithmetic encoding unit 214 may determine a third context for entropy encoding the data indicating whether the current node is planar in the direction. The value indicating whether the current node is planar in a particular direction may be is_planar_flag[axisIdx], where axisIdx indicates the direction of the axis and is_planar_flag[axisIdx] indicates whether the current node is planar in the direction indicated by axisIdx. Thus, is_planar_flag[ ] may be an array of three values, where axisIdx may have a value of 0, 1, or 2, e.g., for the X-, Y-, and Z-axes.

In some examples, arithmetic encoding unit 214 may encode single occupancy data for a current node. In general, the single occupancy data may indicate whether only a single one of the sub-nodes of the current node is occupied, and if so, an index indicating which of the sub-nodes is occupied. According to the techniques of this disclosure, arithmetic encoding unit 214 may determine whether inter-prediction occupancy data is encoded for the current node, and/or whether planar mode data is encoded for the current node. If either the inter-prediction occupancy data or the planar mode data is encoded for the current node, arithmetic encoding unit 214 may avoid encoding the single occupancy data for the current node. However, if both the inter-prediction occupancy data and the planar mode data are not encoded for the current node, arithmetic encoding unit 214 may encode the single occupancy data for the current node.

Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Additionally or alternatively, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level.

Each level of detail is produced by taking a union of all points up to particular refinement level: e.g., LOD1 is obtained based on refinement level RL1, LOD2 is obtained based on RL1 and RL2, LODN is obtained by union of RL1, RL2, RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In this manner, G-PCC encoder 200 represents an example of a device for coding point cloud data, including: a memory configured to store point cloud data; and one or more processors implemented in circuitry and configured to: determine whether inter prediction data is coded for a current node of an octree of the point cloud data; determine whether planar mask data is coded for the current node; when at least one of the inter prediction data or the planar mask data is coded for the current node, avoid coding a single occupancy value for the current node, the single occupancy value indicating whether only a single sub-node of the current node includes one or more points; and code the current node.

Figure 3:
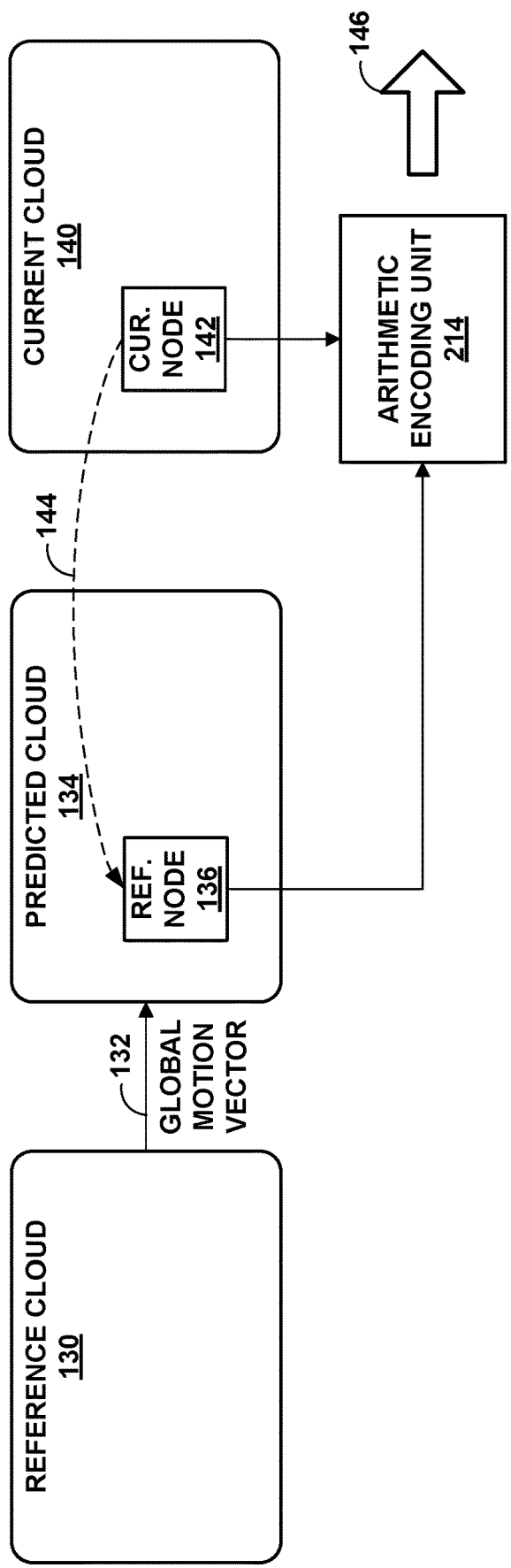
FIG. 3 is a conceptual diagram illustrating an example of inter-prediction encoding in G-PCC.

FIG. 3 is a conceptual diagram illustrating an example of inter-prediction encoding in G-PCC. In some examples, G-PCC encoder 200 may decode/reproduce a point cloud to form reference cloud 130. In other examples, G-PCC encoder 200 may simply store uncoded historical versions of previous point clouds. Reference cloud 130 may be stored in a decoded frame buffer or history buffer (i.e., a memory) of G-PCC encoder 200. G-PCC encoder 200 may further obtain current cloud 140 to be encoded, at least in part, using inter-prediction. For example, G-PCC encoder 200 may use the techniques of this disclosure to determine a set of points of current cloud 140 to be predicted using global motion, as opposed to local motion or intra-prediction.

G-PCC encoder 200 may compare the locations of points of current cloud 140 to be inter-predicted to points of reference cloud 130 and calculate global motion vector 132. Global motion vector 132 may represent a global motion vector that most accurately predicts locations of the points of the current cloud to be inter-predicted using global motion relative to reference cloud 130. G-PCC encoder 200 may then form predicted cloud 134 by applying global motion vector 132 to reference cloud 130. That is, G-PCC encoder 200 may construct predicted cloud 134 by applying global motion vector 132 to each point of reference cloud 130 at respective locations, and setting occupancy of nodes to include a point in predicted cloud 134 at a corresponding location offset by global motion vector 132.

G-PCC encoder 200 (and in particular, arithmetic encoding unit 214) may then encode points of nodes of current cloud 140 using corresponding points within nodes of predicted cloud 134 to determine contexts for context-based entropy encoding, e.g., context adaptive binary arithmetic coding (CABAC). For example, arithmetic encoding unit 214 may encode occupancy of current node 142 of current cloud 140 using occupancy of reference node 136 (which corresponds to the location of current node 142 as indicated by vector 144) to determine context for encoding a value for the occupancy of current node 142.

For example, if reference node 136 is occupied (that is, includes a point), arithmetic encoding unit 214 may determine a first context for encoding a value representing occupancy of current node 142. The first context may indicate a most probable symbol for the value representing occupancy of current node 142 as having a high likelihood of a value representing that current node 142 is occupied (e.g., '1'). On the other hand, if reference node 136 is not occupied (that is, does not include any points), arithmetic encoding unit 214 may determine a second context for encoding the value representing occupancy of current node 142. The second context may indicate a most probable symbol for the value representing occupancy of current node 142 as having a high likelihood of a value representing that current node 142 is not occupied (e.g., '0'). Arithmetic encoding unit 142 may then determine whether current node 142 is actually occupied, determine a value representing whether or not current node 142 is actually occupied, then entropy encode the value using the determined context (e.g., the first context or the second context). Arithmetic encoding unit 214 may add the entropy encoded value to bitstream 146 and proceed to a next node of current cloud 140 (or a next cloud).

Figure 4:
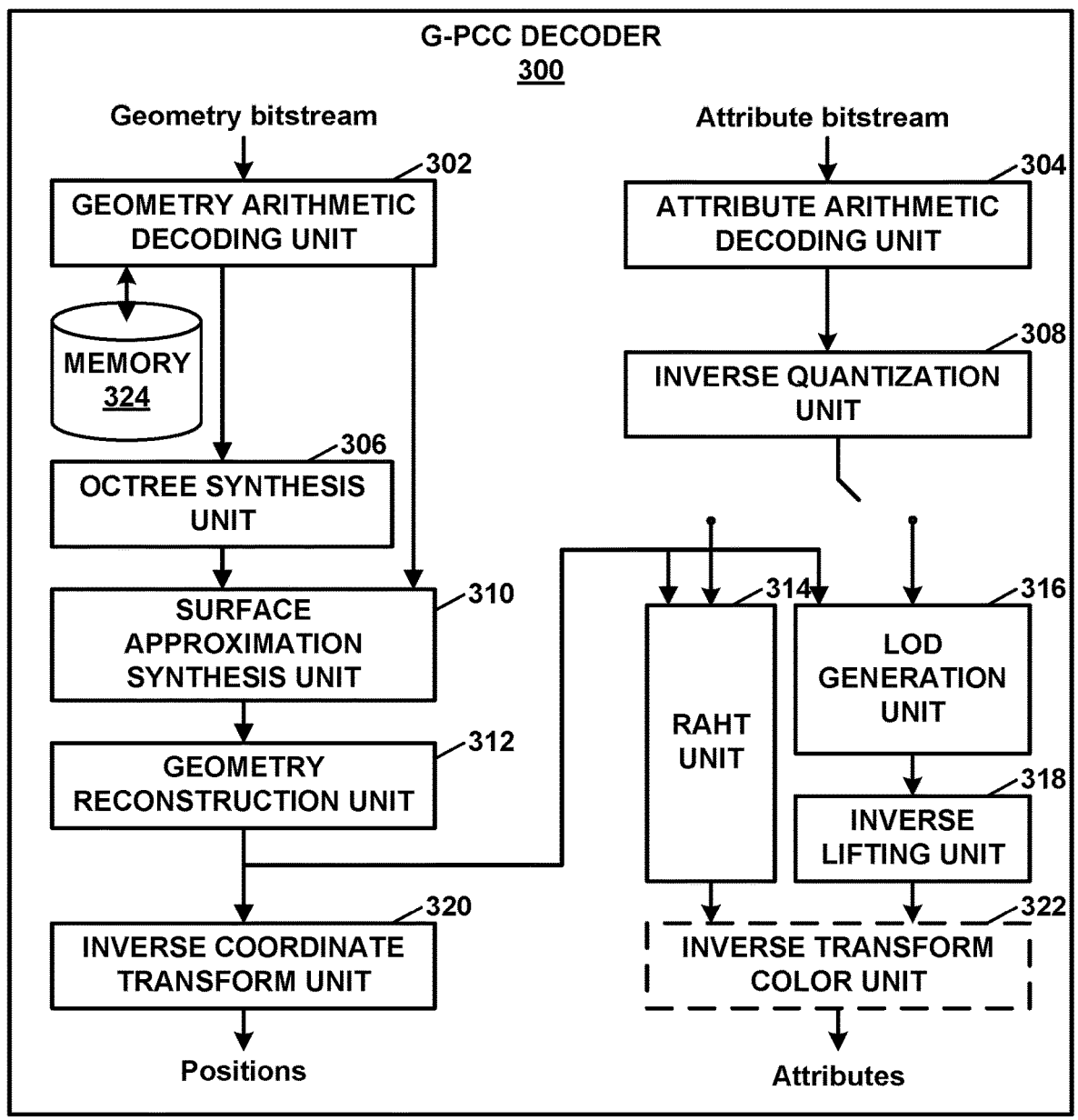
FIG. 4 is a block diagram illustrating an example G-PCC decoder that may be configured to perform the techniques of this disclosure.

FIG. 4 is a block diagram illustrating example components of G-PCC decoder 300 of FIG. 1 that may be configured to perform the techniques of this disclosure. In the example of FIG. 4, G-PCC decoder 300 includes a geometry arithmetic decoding unit 302, a memory 324, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Geometry arithmetic decoding unit 302 may entropy decode data representing occupancy of an octree for a current point cloud. In some examples, geometry arithmetic decoding unit 302 may entropy decode the occupancy data based only on data of a current point cloud (which may be referred to as "intra-prediction" of the current point cloud). In other examples, geometry arithmetic decoding unit 302 may entropy decode the occupancy data with reference to a previous octree for a previous point cloud, e.g., buffered in memory 324 (which may be referred to as "inter-prediction" of the current point cloud, relative to a reference cloud). Geometry arithmetic decoding unit 302 may perform inter-prediction using local or global motion vectors, e.g., as discussed below in greater detail with respect to FIG. 5.

In particular, in accordance with the techniques of this disclosure, geometry arithmetic decoding unit 302 may be configured to perform a substantially similar, albeit reciprocal, process to decode G-PCC data encoded by G-PCC encoder. For example, geometry arithmetic decoding unit 302 may decode occupancy data using inter-prediction, planar mode, single occupancy data, or the like. When decoding occupancy using inter-prediction, geometry arithmetic decoding unit 302 may decode a global motion vector for a current node. The global motion vector may indicate motion of points in a reference frame (e.g., stored in memory 324) to form a prediction frame. Geometry arithmetic decoding unit 302 may then apply the global motion vector to the reference frame to generate a prediction frame. Geometry arithmetic decoding unit 302 may decode local motion vectors for one or more nodes of the prediction frame (or one or more points of the prediction frame) that indicate positions of the points in the current frame.

Additionally or alternatively, geometry arithmetic decoding unit 302 may decode occupancy directly by using the predicted points in the prediction frame to determine contexts to entropy decode occupancy of a current node. That is, geometry arithmetic decoding unit 302 may determine whether a collocated node in the prediction frame is occupied, and use this determination to decode data indicating whether the current node is occupied.

Geometry arithmetic decoding unit 302 may also decode occupancy data in planar mode. Geometry arithmetic decoding unit 302 may decode data indicating whether the current node is planar in the direction of a particular axis, as well as data indicating which of the planes contains the points of the current node if the current node is planar in that direction. Geometry arithmetic decoding unit 302 may decode this data for each of the three axes, e.g., X-, Y-, and Z-axes. In this manner, geometry arithmetic decoding unit 302 need not decode occupancy data for sub-nodes of the current node in the other plane of the same direction. That is, geometry arithmetic decoding unit 302 may determine that occupancy data will not be included in the bitstream for the other plane of the same direction.

In some examples, when planar mode data is included in the bitstream for the current node, geometry arithmetic decoding unit 302 may entropy decode the planar mode data. According to the techniques of this disclosure, geometry arithmetic decoding unit 302 may determine the context for entropy decoding the planar mask data according to planar mask data for a collocated node in a reference frame for the current node. For example, if the collocated node is planar in a particular direction, geometry arithmetic decoding unit 302 may determine a first or second context for entropy encoding data indicating whether the current node is planar in the same direction according to a position of the plane in the collocated node and in the direction. On the other hand, if the collocated node is not planar in that direction, geometry arithmetic decoding unit 302 may determine a third context for entropy encoding the data indicating whether the current node is planar in the direction. The value indicating whether the current node is planar in a particular direction may be is_planar_flag[axisIdx], where axisIdx indicates the direction of the axis and is_planar_flag[axisIdx] indicates whether the current node is planar in the direction indicated by axisIdx. Thus, is_planar_flag[ ] may be an array of three values, where axisIdx may have a value of 0, 1, or 2, e.g., for the X-, Y-, and Z-axes.

In some examples, geometry arithmetic decoding unit 302 may decode single occupancy data for a current node. In general, the single occupancy data may indicate whether only a single one of the sub-nodes of the current node is occupied, and if so, an index indicating which of the sub-nodes is occupied. According to the techniques of this disclosure, geometry arithmetic decoding unit 302 may determine whether inter-prediction occupancy data is included for the current node, and/or whether planar mode data is included for the current node. If either the inter-prediction occupancy data or the planar mode data is encoded for the current node, geometry arithmetic decoding unit 302 may determine that the bitstream will not include single occupancy data for the current node. That is, while parsing the bitstream, geometry arithmetic decoding unit 302 may determine whether current bits of the bitstream correspond to the single occupancy data or to a different set of data, and process the current bits accordingly. However, if both the inter-prediction occupancy data and the planar mode data are not encoded for the current node, geometry arithmetic decoding unit 302 may determine that the bitstream will include the single occupancy data for the current node. Thus, geometry arithmetic decoding unit 302 may parse the current bits as being single occupancy data and use these bits to determine occupancy of the current node (namely, which of the sub-nodes of the current node is occupied).

Octree synthesis unit 306 may synthesize an octree based on data for syntax elements parsed from the geometry bitstream and entropy decoded by geometry arithmetic decoding unit 302. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec may be coded in the integer domain. The inverse transform may be used to convert the positions back to the original domain.

Additionally, in the example of FIG. 4, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 4, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 4 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

The planar coding mode first proposed in Sebastien Lasserre, David Flynn, "[GPCC] Planar mode in octree-based geometry coding," ISO/IEC JTC1/SC29/WG11 MPEG/m48906, Gothenburg, Sweden, July 2019, and was adopted in Sebastien Lasserre, Jonathan Taquet, "[GPCC] CE13.22 report on planar coding mode," ISO/IEC JTC1/SC29/WG11 MPEG/m50008, Geneva, Switzerland, October 2019 at the 128th MPEG meeting in Geneva, Switzerland.

The angular coding mode first proposed in Sebastien Lasserre, Jonathan Taquet, "[GPCC][CE 13.22 related] An improvement of the planar coding mode," ISO/IEC JTC1/SC29/WG11 MPEG/m50642, Geneva, CH, October 2019, and was adopted in Sebastien Lasserre, Jonathan Taquet, "[GPCC] CE 13.22 report on angular mode," ISO/IEC JTC1/SC29/WG11 MPEG/m51594, Brussels, Belgium, January 2020 at the 129th MPEG meeting in Brussels, Belgium, and enhances the coding efficiency of the planar mode by using the sensor characteristics of a typical LIDAR sensor.

The angular coding mode is optionally used together with the planar mode and improves the coding of the vertical (z) plane position syntax element by employing knowledge of positions and angles of sensing laser beams in a typical LIDAR sensor. Furthermore, the angular coding mode can optionally be used to improve the coding of vertical z-position bits in IDCM. In a separate contribution in Geert Van der Auwera, Bappaditya Ray, Louis Kerofsky, Adarsh K. Ramasubramonian, Marta Karczewicz, "[GPCC][New Proposal] Angular mode simplifications and HLS refinements," ISO/IEC JTC1/SC29/WG11 MPEG/m53693, Teleconference (previously Alpbach meeting), April 2020, the angular coding mode's context derivation was simplified and the HLS (high level syntax) coding of sensor data parameters was made more efficient. The angular mode descriptions below are based on the original MPEG contributions documents and the GPCC DIS text, identified above.

The azimuthal coding mode first proposed in Sebastien Lasserre, Jonathan Taquet, "[GPCC] [CE13.22 related] The azimuthal coding mode," ISO/IEC JTC1/SC29/WG11 MPEG/m51596, Brussels, Belgium, January 2020 was adopted in Sebastien Lasserre, Jonathan Taquet, "[GPCC] [CE 13.22] Report on azimuthal coding mode," ISO/IEC JTC1/SC29/WG11 MPEG/m52958, Teleconference (previously Alpbach meeting), April 2020 at the 130th MPEG teleconference meeting. The azimuthal coding mode is similar to the angular mode and extends it to the coding of the (x) and (y) plane position syntax elements of the planar mode and improves the coding of the x- or y-position bits in IDCM. In a separate contribution in Geert Van der Auwera, Bappaditya Ray, Adarsh K. Ramasubramonian, Marta Karczewicz, "[GPCC][New Proposal] Planar and azimuthal coding mode simplifications," ISO/IEC JTC1/SC29/WG11 MPEG/m54694, Teleconference, July 2020, at the 131$^{st}$ MPEG teleconference meeting, the number of contexts used in the azimuthal mode was significantly reduced.

G-PCC encoder 200 and G-PCC decoder 300 may code occupancy for geometry octrees. For instance, a description of geometry octree semantics and geometry octree node semantics as presented in G-PCC FDIS, ISO/IEC JTC1/SC29/WG11 w19617 (Draft 8) is provided below.

In section 7.4.3.4, entitled "Geometry octree semantics," Draft 8 states:

The array NodeNumChildren, with elements NodeNumChildren[depth][sN][tN][vN] represents the number of child nodes present in the geometry octree node at position (sN, tN, vN) at the given depth of the octree. Unset values of GeometryNodeOccupancyCnt are treated as 0. The array NodeParentOccupancy, with elements NodeParentOccupancy[depth][idx], represents the 8-bit occupancy bitmap of parent node a geometry octree node at position (sN, tN, vN) at the given depth of the octree.

The arrays NodeS, NodeT, and NodeV, with elements NodeS[depth][idx], NodeT[depth][idx], and NodeV[depth][idx], represent the s, t, and v co-ordinates of the idx-th node in decoding order at the given depth. The array NumNodesAtDepth, with elements NumNodesAtDepth[depth], represents the number of nodes to be decoded at the given depth.

The variables NodeS, NodeT, NodeV, NumNodesAtDepth, and NodeNumChildren are initialized as follows:

$NodeS[0][0]=NodeT[0][0]=NodeV[0][0]=0$ $NumNodesAtDepth[0]=1$ $NodeNumChildren[-1][0][0][0]=8$ When geometry_angular_enabled_flag is equal to 1, the array phiBuffer is initialized as follows:
for (i=0; i<=number_lasers_minus1; i++)
    phiBuffer[i]=0x80000000 geom_node_qp_offset_present_flag equal to 1 specifies that per-node quantisation parameter offsets are present in the current tree level. geom_node_qp_offset_present_flag equal to 0 specifies that no quantisation parameter offsets are present in the current tree level. When not present, geom_node_qp_offset_present_flag is inferred to be 0.

The variable GeomNodeQpOffsetsSignalled indicates whether geom_node_qp_offet_present_flag=1 has been signalled in a previous tree level. In some examples, when GeomNodeQpOffsetsSignalled is equal to 1, geom_node_qp_offset_present_flag is not signalled.

Section 7.4.3.5, entitled "Geometry octree node semantics," of Draft 8 is discussed below.

A geometry node is a node of the geometry octree. An internal geometry node may be split into a maximum of eight child nodes after decoding the occupancy map for the current node. A leaf node represents one or more points.

The position of the geometry node at a given depth is given by the unscaled co-ordinate of its lower left corner as (sN, tN, vN).

The variables sNp, tNp, and vNp indicating the position of the current node's parent node at depth−1 are derived as follows:

$sNp=depth?sN\!>\!>\!geom\_tree\_coded\_axis\_flag[depth-1][0]\!:\!0$ $tNp=depth?tN\!>\!>\!geom\_tree\_coded\_axis\_flag[depth-1][1]\!:\!0$ $vNp=depth?vN\!>\!>\!geom\_tree\_coded\_axis\_flag[depth-1][2]\!:\!0$ The arrays NodeSizeLog2 and ChildNodeSizeLog2 are derived as follows:

```
for (k = 0; k < 3; k++) {
    NodeSizeLog2[k] = NodeSizesLog2[depth][k]
    ChildNodeSizeLog2[k] = NodeSizesLog2[depth + 1][k]
}
```

The variable NodeMaxDimLog2 is derived as follows: In some examples, the above could be replaced by deriving the intra level in the tree semantics.

NodeMaxDimLog2=MaxVec(NodeSizeLog2)

When geom_node_qp_offset_present_flag is equal to 1, the array ScalingNodeSizeLog2 and variable minScalingNodeDimLog2 are derived as follows: for (k=0; k<3; k++)

ScalingNodeSizeLog2[$k$]=NodeSizeLog2[$k$]

minScalingNodeDimLog2=MinVec(NodeSizeLog2)

The variable NeighbourPattern is derived as follows:—
For each node, the variables rN, lN, fN, bN, uN, and dN are derived as follows:

$rN=NodeNumChildren[depth][sN+1][tN][vN]!=0$ $lN=NodeNumChildren[depth][sN-1][tN][vN]!=0$ $bN=NodeNumChildren[depth][sN][tN+1][vN]!=0$ $fN=NodeNumChildren[depth][sN][tN-1][vN]!=0$ $uN=NodeNumChildren[depth][sN][tN][vN+1]!=0$ $dN=NodeNumChildren[depth][sN][tN][vN-1]!=0$ Neighbours that are unavailable are excluded by application of the mask XXX $lN = ((sN+1)$ & NeighbAvailabilityMask$) == 1 ? 0 : lN$ $rN = ((sN+1)$ & NeighbAvailabilityMask$) == 0 ? 0 : rN$ $lN = ((tN+1)$ & NeighbAvailabilityMask$) == 1 ? 0 : fN$ $bN = ((tN+1)$ & NeighbAvailabilityMask$) == 0 ? 0 : bN$ $dN = ((vN+1)$ & NeighbAvailabilityMask$) == 1 ? 0 : dN$ $uN = ((vN+1)$ & NeighbAvailabilityMask$) == 0 ? 0 : uN$ If adjacent_child_contextualization_enabled_flag is equal to 1, the following applies.

```
sNc0 = sN << geom_tree_coded_axis_flag[depth][0]
tNc0 = tN << geom_tree_coded_axis_flag[depth][1]
vNc0 = vN << geom_tree_coded_axis_flag[depth][2]
lNadj = fNadj = dNadj = 0
for (s = 0; s <= geom_tree_coded_axis_flag[depth][0]; s++) {
  for (t = 0; t <= geom_tree_coded_axis_flag[depth][1]; t++) {
    for (v = 0; v <= geom_tree_coded_axis_flag[depth][2]; v++) {
      lNadj |= NodeNumChildren[depth + 1][sNc0 - 1][tNc0 + t]
              [vNc0 + v] > 0
      fNadj |= NodeNumChildren[depth + 1][sNc0 + s][tNc0 - 1]
              [vNc0 + v] > 0
      dNadj |= NodeNumChildren[depth + 1][sNc0 + s][tNc0 + t]
              [vNc0 - 1] > 0
    }
  }
}
lN &= lNadj
fN &= fNadj
dN &= dNadj
```

Finally, the variable NeighbourPattern is set as follows:

NeighbourPattern$=rN|(lN<<1)|(fN<<2)|(bN<<3)|(dN<<4)|(uN<<5)$ geom_node_qp_offset_abs_gt0_flag equal to 1 specifies that the current node's quantization parameter is offset from the slice quantization parameter. geom_node_qp_offset_abs_gt0_flag equal to 0 specifies that the current node quantization parameter inherits the quantization parameter of the parent node.

geom_node_qp_offset_abs_minus1 plus 1 specifies, when present, the absolute difference between the current node's quantization parameter, nodeQp, and the slice quantisation parameter. When not present, geom_node_qp_offset_abs_minus1 is inferred to be 0.

geom_node_qp_offset_sign_flag specifies, when present, the sign of nodeQpOffset as follows:

If geom_node_qp_offset_sign_flag is equal to 1, the corresponding nodeQpOffset has a negative value.

Otherwise, geom_node_qp_offset_sign_flag is equal to 0, the corresponding nodeQpOffset has a positive value.

The variable nodeQpOffset is derived as follows:

node$Qp$Offset$=(1-2\times$geom_node_$qp$_offset_sign_flag$)\times$
(geom_node_$qp$_offset_abs_$gt0$_flag+geom_node_$qp$_offset_abs_minus1)

The variable NodeQp is derived as follows:
When geom_scaling_enabled_flag is equal to 0:

Node$Qp=0$

Otherwise, when GeomNodeQpOffsetsSignalled is equal to 0: let dcmQp=(geom_base_qp+geom_direct_coding_mode_qp_offset)<<geom_qp_multiplier_log 2

Node$Qp$=Min(minScalingNodeDimLog 2×8,$dcmQp$)

Otherwise, when geom_node_qp_offset_present_flag is equal to 1: NodeQp=(geom_base_qp+ geom_slice_qp_offset+nodeQpOffset)<<geom_qp_multiplier_log 2

Otherwise, when GeomNodeQpOffsetsSignalled is equal to 1: NodeQp=NodeQpMap [depth][nodeIdx]

It is a requirement of bitstream conformance that NodeQp is in the range 0 . . . minScalingNodeDimLog2×8.

The variables EffectiveChildNodeSizeLog2 and EffectiveNodeSizeLog2 are derived as follows:

```
for (k = 0; k < 3; k++) {
  EffectiveNodeSizeLog2[k] = NodeSizeLog2[k] - NodeQp / 8
  EffectiveChildNodeSizeLog2[k] = ChildNodeSizeLog2[k] - NodeQp / 8
}
```

When geom_planar_enabled_flag is equal to 1, the eligibility criterion, PlanarEligible[k], for the presence of is_planar_flag[k] is determined as specified in 8.2.4.1.

is_planar_flag[axisIdx] equal to 1 indicates that the positions of the current node's children form a single plane perpendicular to the axisIdx-th axis. is_planar_flag[axisIdx] equal to 0, when present, indicates that the positions of the current node's children occupy both planes perpendicular to the axisIdx-th axis.

IsNotPlanar$[k]$=PlanarEligible$[k]$&&!is_planar_flag$[k]$

IsPlanar$[k]$=(PlanarEligible$[k]$&&is_planar_flag$[k]$)
||!geom_tree_coded_axis_flag[depth][$k$]||EffectiveChildNodeSizeLog 2$[k]<0$ plane_position[axisIdx] XXX equal to 0 indicates that the position of the plane for the planar mode is the lower position relative to increasing i-th co-ordinates. plane_position[axisIdx] equal 1 indicates that the position of the plane for the planar mode is the higher position relative to increasing axisIdx-th co-ordinates. When not present, plane_position[axisIdx] is inferred to be 0.

When nodeIdx is equal to 0, the variable IdcmEnableMaskIdx is set equal to depth.

The variable DirectModeFlagPresent indicates whether the current node is eligible for early termination using direct position coding.

```
DirectModeFlagPresent = 0
if (NodeIdcmEligible[depth][nodeIdx] && MaxVec(EffectiveNodeSizeLog2) > 0) {
  DirectModeFlagPresent = IdcmEnableMask[IdcmEnableMaskIdx % 32]
  IdcmEnableMaskIdx++
}
``` direct_mode_flag equal to 1 indicates that the current node is a leaf node and contains one or more point co-ordinate residuals. direct_mode_flag equal to 0 indicates that the current node is an internal octree node. When not present, the value of direct_mode_flag is inferred to be 0.

The variable LeafNode indicates whether or not the current node produces any child nodes for evaluation at the next tree level.

LeafNode=direct_mode_flag||MaxVec(EffectiveChildNodeSizeLog 2)<=0

The variable OccupancyIdxMaybePresent specifies when single_occupancy_flag is present in the octree node syntax.

let numPlanarAxes=IsPlanar[0]+IsPlanar[1]+IsPlanar[2]

let numNonPlanarAxes=IsNotPlanar[0]+IsNotPlanar[1]+IsNotPlanar[2]

OccupancyIdxMaybePresent=numPlanarAxes<3||
(!NeighbourPattern&& !numNonPlanarAxes)

single_child_flag equal to 1 indicates that the current node has a single child. single_child_flag equal to 0 indicates the current node may generate multiple children. When not present, single_child_flag is inferred to be 0.

occupancy_idx[i] is the i-th bit of an index representing the position in the geometry octree child node traversal order of the only child of the current node The variable OccupancyMapPresent specifies when one of occupancy_map or occupancy_byte is present in the octree node syntax.

OccupancyMapPresent=!
(numPlanarAxes==3||single_child_flag||
(!NeighbourPattern&&numPlanarAxes==2))

occupancy_map and occupancy_byte are bitmaps that identify the occupied child nodes of the current node.

The variable OccupancyMap is derived as follows:

When OccupancyMapPresent is equal to 1, Occupancy-Map is set equal to the output of the geometry occupancy map permutation process (6.4.2) when invoked with either occupancy_map (when bitwise_occupancy_flag is equal to 1) or occupancy_byte (when bitwise_occupancy_flag is equal to 0) as input.

When either numPlanarAxes is equal to 3 or single_child_flag is equal to 1, OccupancyMap is set as follows:

let occupancyIdx=((IsPlanar[2]?plane_position[2]:
occupancy_idx[0])<<0)|((IsPlanar[1]?plane_position[1]:occupancy_idx[1])<<1)|((IsPlanar[0]?plane_position[0]:occupancy_idx[2])<<2)

OccupancyMap=1<<occupancyIdx

When NeighbourPattern is equal to 0, numPlanarAxes is equal to 2, and single_child_flag is equal to 0, OccupancyMap is set as follows:

let baseIdx=plane_position[2]|(plane_position[1]<<1)
|(plane_position[0])<<2)

if (!IsPlanar[2])OccupancyMap=0x03<<baseIdx if (!IsPlanar[1])OccupancyMap=0x05<<baseIdx if (!IsPlanar[0])OccupancyMap=0x11<<baseIdx The array GeometryNodeChildren[i] identifies the index of the i-th occupied child node of the current node. The variable NumChildren identifies the number of child nodes in the array GeometryNodeChildren[ ].

The child node state information is derived from OccupancyMap as follows:

```
childCnt = 0
for (childIdx = 0; childIdx < 8; childIdx++) {
  if (!(OccupancyMap & (1 << childIdx)))
    continue
  GeometryNodeChildren[childCnt++] = childIdx
}
NumChildren = childCnt
NodeNumChildren[depth][sN][tN][vN] = childCnt
    The variable childDirectModeEligible indicates whether the children of the current
node
are eligible for direct position coding.
if (inferred_direct_coding_mode == 0)
  childDirectModeEligible = 0
if (inferred_direct_coding_mode == 1)
  childDirectModeEligible =
    !NeighbourPattern
    && NumChildren == 1
    && NodeNumChildren[depth − 1][sNp][tNp][vNp] <= 2
if (inferred_direct_coding_mode == 2)
  childDirectModeEligible = !NeighbourPattern
if (inferred_direct_coding_mode == 3)
  childDirectModeEligible = NumChildren > 1
    When LeafNode is equal to 0, the following applies:
for (child = 0; child < NumChildren; child++) {
  childNodeIdx = NumNodesAtDepth[depth + 1]++
  childIdx = GeometryNodeChildren [child]
  sNc = (sN << geom_tree_coded_axis_flag[depth] [0]) + (childIdx & 4 == 4)
  tNc = (tN << geom_tree_coded_axis_flag[depth][1]) + (childIdx & 2 == 2)
  vNc = (vN << geom_tree_coded_axis_flag[depth][2]) + (childIdx & 1 == 1)
  NodeNumChildren [depth + 1][sNc][tNc][vNc] = 1
  NodeS [depth + 1] [childNodeIdx] = sNc
  NodeT [depth + 1] [childNodeIdx] = tNc
  Node V [depth + 1] [childNodeIdx] = vNc
  NodeQpMap[depth + 1][childNodeIdx] = NodeQp
  NodeIdcmEligible [depth + 1][childNodeIdx] = childDirectModeEligible
  NodeParentOccupancy[depth + 1][childNodeIdx] = OccupancyMap
}
``` dup_point_cnt_gt0_flag[n] and dup_point_cnt_minus1[n] together specify the number of identical output points represented by the n-th child of the current leaf node. Any of dup_point_cnt_gt0_flag[n] and dup_point_cnt_minus1 that are not present are inferred to be 0. [Ed, be clearer that this doesn't apply when direct_mode_flag=1?]

GeometryNodeDupPoints[n]=dup_point_cnt_gt0_flag
[n]+dup_point_cnt_minus1[n]

When unique_point_positions_constraint_flag is equal to 1, it is a requirement of bitstream conformance that GeometryNodeDupPoints[n] is equal to 0.

Occupancy coding using bit-wise coding as presented in Draft 8 is discussed below. For instance, Section 9.7, entitled "Bit-wise geometry octree occupancy parsing process," of Draft 8 is discussed below 9.7.1 General Process The parsing and inverse binarization of the arithmetically coded syntax element occupancy_map is described in Section 9.7.4.

The decoding of each arithmetically encoded bin in occupancy_map involves a context selection process that makes use of a dynamic map (the array CtxMap) to select a context (9.7.6) based upon the occupancy state of neighbouring nodes, predicted occupancy values (9.7.8), and previously decoded bins. After decoding a bin, CtxMap is updated based upon the decoded bin value (9.7.7).

At the start of decoding a geometrydata unit, CtxMap is initialized according to Section 9.7.2.

NOTE—While the described process updates CtxMap after decoding each bin, there is no dependency by subsequent bins on the updated value.

9.7.2 Initialisation Process

This process is invoked at the start of each geometry data unit.

The output from this process is the initialized array CtxMap with entries CtxMap[i] for i in the range 0 to 1499×3 set equal to 127.

9.7.3 Determination of Planar Masks Used in the Inverse Binarization Process

In some cases, but not techniques are not limited, the example of 9.7.3 may utilized with qtbt, also called geom_tree_coded_axis_flag.

Two 8-bit binary masks mask_planar_fixed0[axisIdx] and mask_planar[axisIdx] are determined for the current node and for an axis index axisIdx.

The first mask mask_planar_fixed0[axisIdx] is constructed that such its i-th bit, for i=0 . . . 7, is set to 1 if the corresponding i-th child node belongs to the lower plane along the axisIdx-th axis. This bit is set 0 if the child node belongs to the upper plane.

If the node is not planar along the axisIdx-th axis, i.e. is_planar_flag[axisIdx] is equal to 0, then mask_planar [axisIdx] is set to 0.

Otherwise, if is_planar_flag[axisIdx] is equal to 1, the node is planar along the axisIdx-th axis, the occupied plane position is known from plane_position[axisIdx], and the i-th bit, for i=0 . . . 7, of mask_planar[axisIdx] is set to 0 if the corresponding i-th child node belongs to the occupied plane, 1 otherwise.

By construction of mask_planar[axisIdx], its bits whose value is 1 do mask the occupancy bits corresponding to child nodes for which it is known, from the planar information, that they are not occupied.

9.7.4 Inverse Binarization Process

This process reconstructs a value of the syntax element occupancy_map. The input to this process is the variables NeighbourPattern and the planar information mask_planar[ ] and mask_planar_fixed0[ ] associated with the current node.

The output from this process is the syntax element value, constructed as follows:

```
1        value = 0
2        min_non_zero_node = NeighbourPattern == 0 ? 2 : 1
3        for (axisIdx = 0; axisIdx <= 2; axisIdx++)
4            min_non_zero_plane[axisIdx] = NeighbourPattern == 0 &&
mask_planar[axisIdx] ? 2 :1
5
6        initialize_counters_for_zeros( )
7        for (BinIdx = 0; BinIdx < 8; BinIdx++) {
8            binIsInferred0 =
                  ((mask_planar[0] >> bitCodingOrder[BinIdx]) & 1)
                || ((mask_planar[1] >> bitCodingOrder[BinIdx]) & 1)
                || ((mask_planar[2] >> bitCodingOrder[BinIdx]) & 1)
9
10           if (binIsInferredO) {
11               bin = 0
12               continue
13           }
14
15           determine_binIsInferred1( )
16           if (binIsInferredl)
17               bin = 1
18           else {
19               bin = readOccBin( )
20               if (!bin)
21                   update_counter s_for_zeros ( )
22           }
23           value = value | (bin << bitCodingOrder[BinIdx])
24       }
``` where bitCodingOrder[BinIdx] is defined by Table 28, and readOccBin( ) is specified by 9.7.5,

TABLE 28

Values of bitCodingOrder[i]

| i     | 0 | 1 | 2 | 3 | 4 | 5 | 6 | 7 |
|-------|---|---|---|---|---|---|---|---|
| value | 1 | 7 | 5 | 3 | 2 | 6 | 4 | 0 |

The variable binIsInferred0 is set equal to 1 when the value of the bin can be deduced to be 0 from the planar information associated with the node, e.g. when the bin corresponds to the occupancy bit of a child node that belongs to a plane known to be unoccupied from the planar information. Otherwise, binIsInferred0 is set equal to 0.

If binIsInferred0 equal 0, the variable binIsInferred1 is set equal to 1 when the value of the bin can be deduced to be 1 from the planar information, the minimum number min_non_zero_node of non-zero bins in the node, and the minimum number min_non_zero_plane[axisIdx] of non-zero bins in the occupied plane along the axisIdx-th axis (would the node be planar along this axis). Otherwise, binIsInferred1 is set equal to 0.

The value of binIsInferred1 is determined based on counters coded0[axisIdx][planePos] that counts the number of occupancy bits already known to be zero for a plane position planePos (either equal to 0 for the lower plane, or equal to 1 for the upper plane) along the axisIdx-th axis. The counters are initialized at the start of the inverse binarization process as follows:

```
25  initialize_counters_for_zeros() {
26    for (axisIdx = 0; axisIdx <= 2; axisIdx++)
27      for (planePos = 0; planePos <= 1; planePos++)
28        coded0[axisIdx][planePos] = 0
29    for (i = 0; i < 8; i++) {
30      if ((mask_planar[0] >> i) & 1 || ((mask_planar[1] » i) & 1 || ((mask_planar[2]
>> i) & 1) {
31        coded0[0][(mask_planar_fixed0[0] » i) & 1]++
32        coded0[1][(mask_planar_fixed0[1] » i) & 1]++
33        coded0[2][(mask_planar_fixed0[2] » i) & 1]++
34      }
35    }
36  }
```

Thus, the counters coded0[ ][ ] are initialized counting the number of occupancy bits known
to be zero from the planar information. Each time a bin is decoded by readOccBin( ) and this decoded bin is equal to 0, the counters coded0[ ][ ] are updated by

```
37  update_counters_for_zeros( ) {
38    coded0[0][(mask_planar_fixed0[0] >> bitCodingOrder[BinIdx]) & 1]++
39    coded0[1][(mask_planar_fixed0[1] >> bitCodingOrder[BinIdx]) & 1]++
40    coded0[2][(mask_planar_fixed0[2] >> bitCodingOrder[BinIdx]) & 1]++
41  }
```

When binIsInferred0 equal 0, the determaination of the value of binIsInferred1 performed as follows:

```
42  determine_ binIsInferred1( ) {
43    for (axisIdx = 0; axisIdx <= 2; axisIdx ++) {
44      mask0 = mask_planar_fixed0[axisIdx] » bitCodingOrder[BinIdx]) & 1
45      binIsOne[axisidx] =
      (eligible_planar_flag [axisidx]
      && coded0[axisIdx][maskO] >= 4- min_non_zeroj>lane[axisldx])
      || coded0[axisIdx][0] + coded0[axisIdx][0] >= 8 − min_non_zero_node
46    }
47    binIsInferred0 = binIsOne[0] || binIsOne[1] || binIsOne[2]
48  }
```

In this process binIsOne[axisIdx] is equal to 1 when the bin can be deduced to be 1 from the planar information along the axisIdx-th axis; it is equal to 0 otherwise. This deduction can be performed because either the node the planarity of the node is known and already at least 4−min_non_zero_plane[axisIdx] bins are known to be or have been decoded to zero, or already at least 8−min_non_zero node bins are known to be or have been decoded to zero.

9.7.5 Definition of readOccBin( )

The inputs to this process are the variables BinIdx, and PartialSynVal.

The output from this process is the value of the decoded bin.

The process for a decoding a single bin is as follows:

The variables ctxMapIdx and ctxIdx are determined according to the derivation process 9.7.6 with the variables NeighbourPattern, BinIdx, and PartialSynVal as input.

The arithmetic decoding process 9.11.2 for a single bin is invoked for the syntax element occupancy_map with the variable ctxIdx as input. The output binVal is the value of the decoded bin.

The context map update process 9.7.7 is invoked with the variable ctxMapIdx and the decoded bin value.

9.7.6 ctxMapIdx and ctxIdx Derivation Processes

Inputs to this process are, the variable NeighbourPattern, representing the occupancy of the neighbours of the current node's parent neighbours, the planar information mask_planar associated with the current node, the variable depth, indicating the current geometry tree depth, the variable binIdx, indicating the bin to be decoded, and the variable partialSynVal, representing the partially reconstructed value of the syntax element.

Output by this process are the variables ctxMapIdx and ctxIdx.

The variable idxPred is set as follows:

If NodeMaxDimLog 2 is greater than or equal to log 2_intra_pred_max_node_size, the variable idxPred is set equal to 0.

If any of mask_planar[k], k=0 . . . 2, are not equal to 0, the variable idxPred is set equal to 0.

Otherwise, the variable idxPred is set equal to the output of the occupancy prediction process using neighbouring octree nodes (9.7.8) when invoked with the current node and childIdx set equal to the output of the neighbour dependent geometry octree child node scan order Inverse mapping process (6.4.1) with the inputs neighbourPattern and inIdx set equal to bitCodingOrder[binIdx] where values of bitCodingOrder[ ] are given in Table 28.

The variable idxAdj is set as follows:

If adjacent_child_contextualization_enabled_flag is equal to 1, the following applies:

The variables adjOcc and adjUnocc are initialized to 0.

The variables sC, tC, and vC identifying the position of the child node associated with binIdx at depth +1 are initialized as follows:

```
49  sC=2×sN+((bitCodingOrder[binIdx]>>2) & 1)
50  tC=2×tN+((bitCodingOrder[binIdx]>>1) & 1)
51  vC=2×vN+(bitCodingOrder[binIdx]& 1)
```

The following procedure is performed for each of the s, t, and v axes by substituting the variables aK, aN, aC, nPmask, sCn, tCn, vCn, sNn, tNn, and vNn of the corresponding row of Table 29.

```
52  // if child is adjacent to a causally-valid neighbour
53  if (!(aC & 1)) {
54    if (NeighboutPattern & nPmask) {
```

-continued

```
55    aD = ! depth ? 1 : geom_tree_coded_axis_flag [depth - l][aK] ? 1 :
2
56    adjOcc += NodeNumChildren[depth + l][sCn][tCn][vCn]
57  } else
58    // if neighbour is available but not present
59    if ((aN + 1) & Neighb A vailability Mask != 1)
60      if (NodeNumChildren[depth][sNn][tNn][vNn] == 0)
61        adjUnocc = 1
62  }
```

TABLE 29

Variable substitutions for the computation of adjOcc and adjUnocc

| axis | aK | aN | aC | nPmask | sCn | tCn | vCn | sN | tNn | vNn |
|---|---|---|---|---|---|---|---|---|---|---|
| s | 0 | sN | sC | 2 | sC − aD | tc | vC | sN − 1 | tN | vN |
| t | 1 | tN | tc | 4 | sC | tC − aD | vC | sN | tN − 1 | vN |
| V | 2 | vN | vC | 16 | sC | tC | vC-aD | sN | tN | vN − 1 |

The variable idxAdj is derived as follows:
63 idxAdj=adjUnocc+2×Min(2, adjOcc)
64 if (binIdx>4)
65 idxAdj=ctxIdxAdjReduc567[idxAdj]

TABLE 30

Values of ctxIdxAdjReduc567[i]

| i | 0 | 1 | 2 | 3 | 4 | 5 |
|---|---|---|---|---|---|---|
| ctxIdxAdjReduc567[i] | 0 | 0 | 1 | 2 | 3 | 3 |

The variable ctxIdxMapIdx is set equal to 3×idxAdj+idxPred.

TABLE 31

Values of neighbourPattern64to9[j + i]

| | | | | | | | | | i | | | | | | | |
|---|---|---|---|---|---|---|---|---|---|---|---|---|---|---|---|---|
| j | 0 | 1 | 2 | 3 | 4 | 5 | 6 | 7 | 8 | 9 | 10 | 11 | 12 | 13 | 14 | 15 |
| 0 | 0 | 1 | 1 | 1 | 1 | 2 | 2 | 3 | 1 | 2 | 2 | 3 | 1 | 3 | 3 | 4 |
| 16 | 1 | 2 | 2 | 3 | 2 | 5 | 5 | 6 | 2 | 5 | 5 | 6 | 3 | 6 | 6 | 7 |
| 32 | 1 | 2 | 2 | 3 | 2 | 5 | 5 | 6 | 2 | 5 | 5 | 6 | 3 | 6 | 6 | 7 |
| 48 | 1 | 3 | 3 | 4 | 3 | 6 | 6 | 7 | 3 | 6 | 6 | 7 | 4 | 7 | 7 | 8 |

TABLE 32

Values of neighbourPattern64to6[j + i]

| | | | | | | | | | i | | | | | | | |
|---|---|---|---|---|---|---|---|---|---|---|---|---|---|---|---|---|
| j | 0 | 1 | 2 | 3 | 4 | 5 | 6 | 7 | 8 | 9 | 10 | 11 | 12 | 13 | 14 | 15 |
| 0 | 0 | 5 | 5 | na | 5 | 1 | 1 | na | 5 | 1 | 1 | na | na | na | na | na |
| 16 | 2 | 3 | 3 | na | 3 | 7 | 7 | na | 3 | 7 | 7 | na | na | na | na | na |
| 32 | 2 | 3 | 3 | na | 3 | 7 | 7 | na | 3 | 7 | 7 | na | na | na | na | na |
| 48 | na | na | na | na | na | na | na | na | na | na | na | na | na | na | na | na |

The output variable ctxMapIdx is derived as follows:
If NeighbourPattern is equal to 0, ctxIdxMapOffset is set equal to popcnt(partialSynVal).
Otherwise, NeighbourPattern is not equal to 0, the following applies:
66 if (log 2_neighbour_avail_boundary_minus1>0)
67 pattern=neighbourPattern64to9[NeighbourPattern];
68 else
69 pattern=neighbourPattern64to6[NeighbourPattern];
70
71 if (binIdx==7)
72 pattern=1;
73 else if (binIdx==6)
74 pattern=neighbourPattern9to3[pattern];
75 else if (binIdx>3)
76 pattern=neighbourPattern9to5[pattern];
77    ctxIdxMapOffset=((pattern−1)<<binIdx)+partialSynVal+binIdx+1;
Finally, the output variable ctxIdx is set as follows:
78 ctxMapIdx=ctxIdxMapIdx×1499+ctxIdxMapOffset
79 ctxIdx=CtxMap[ctxMapIdx]>>3

TABLE 33

Specification of neighbourPattern9to5[i]

| i | 0 | 1 | 2 | 3 | 4 | 5 | 6 | 7 | 8 |
|---|---|---|---|---|---|---|---|---|---|
| neighbourPattern9to5[i] | 0 | 1 | 2 | 3 | 1 | 2 | 3 | 4 | 4 |

TABLE 34

Specification of neighbourPattern9to3[i]

| i | 0 | 1 | 2 | 3 | 4 | 5 | 6 | 7 | 8 |
|---|---|---|---|---|---|---|---|---|---|
| neighbour Pattern9to3[i] | 0 | 1 | 1 | 2 | 2 | 1 | 2 | 2 | 2 |

9.7.7 Context Map Update Process

This process updates the context mapping table for the syntax element occupancy_map.

Input to this process are the variable ctxMapIdx and a decoded bin value.

The context mapping CtxMap[ctxMapIdx] is updated as follows:

```
80 stateVal=CtxMap[ctxMapIdx]
81 if (binVal)
82     CtxMap[ctxMapIdx]+=ctxMapTransition[(255-stateVal)>>4]
83 else
84 CtxMap[ctxMapIdx]-=ctxMapTransition[stateVal>>4]
```

Where values of ctxMapTransition are given by Table 35.

TABLE 35

Values of ctxMapTransition[i]

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| value | 0 | 1 | 1 | 2 | 4 | 7 | 9 | 11 | 14 | 16 | 19 | 23 | 22 | 18 | 13 | 6 |

9.7.8 Occupancy Prediction Process Using Neighbouring Octree Nodes

The occupancy prediction process generates a tri-state occupancy prediction of a single child node based on the occupancy state of nodes neighbouring the parent node.

Input to this process are the variables sN, tN, vN, and depth, identifying a node in the geometry octree, and the variable childIdx identifying a child node position according to the geometry octree child traversal order for occupancy prediction.

Output from this process is the predicted occupancy state for the specified child node.

A list of neighbouring occupied geometry tree nodes is determined as follows:

```
85   for (i = 0; i < 26; i++) {
86     s = sN + dS[i]
87     t = tN + dT[i]
88     v = vN + dV[i]
89     if (available(sN, tN, vN, s, t, v))
90       occupiedNeigh[i] = NodeNumChildren[depth][s][t][v] != 0
91     else
92       occupiedNeigh[i] = 0
93   }
```

Where the function available (sN, tN, vN, s, t, v) evaluates to true if all of the following conditions are true:

```
94 log 2_neighbour_avail_boundary_minus1>0
95 (s^sN)>>(log 2_neighbour_avail_boundary_minus1+1)==0
96 (t^tN)>>(log 2_neighbour_avail_boundary_minus1+1)==0
97 (v^vN)>>(log 2_neighbour_avail_boundary_minus1+1)==0
```

And where the values of the neighbour position offsets dS[i], dT[i], and dV[i] are given in Table 36.

A score is determined for the predicted child node as the sum of the score contributions of occupied neighbours:

```
98 score=0
99 for (i=0; i<26; i++)
100   score+=childScore[i][childIdx]&&occupiedNeigh[i]
```

A threshold for predicting the predicted child node as occupied is determined according to the number of occupied neighbour nodes:

```
101 numOccupiedNeigh=0
102 for (i=0; i<26; i++)
103   numOccupiedNeigh+=occupiedNeigh[i]
104 thresholdOccupied=numOccupiedNeigh <14?4:5
```

The output predicted occupancy state, prediction, is set according to the following:

```
105 if (score <=2)
106   prediction=1
107 else if (score >=thresholdOccupied)
108   prediction=2
109 else
110   prediction=0
```

TABLE 36

Values of dS[i], dT[i], dV[i], and childScore[i][childIdx] for intra occupancy prediction

| | | | | childScore[i][childIdx] | | | | | | | |
|---|---|---|---|---|---|---|---|---|---|---|---|
| i | dS[i] | dT[i] | dV[i] | 0 | 1 | 2 | 3 | 4 | 5 | 6 | 7 |
| 0 | −1 | −1 | −1 | 1 | 0 | 0 | 0 | 0 | 0 | 0 | 0 |
| 1 | −1 | −1 | 0 | 1 | 1 | 0 | 0 | 0 | 0 | 0 | 0 |
| 2 | −1 | −1 | 1 | 0 | 1 | 0 | 0 | 0 | 0 | 0 | 0 |
| 3 | −1 | 0 | −1 | 1 | 0 | 1 | 0 | 0 | 0 | 0 | 0 |
| 4 | −1 | 0 | 0 | 1 | 1 | 1 | 1 | 0 | 0 | 0 | 0 |
| 5 | −1 | 0 | 1 | 0 | 1 | 0 | 1 | 0 | 0 | 0 | 0 |
| 6 | −1 | 1 | −1 | 0 | 0 | 1 | 0 | 0 | 0 | 0 | 0 |
| 7 | −1 | 1 | 0 | 0 | 0 | 1 | 1 | 0 | 0 | 0 | 0 |
| 8 | −1 | 1 | 1 | 0 | 0 | 0 | 1 | 0 | 0 | 0 | 0 |
| 9 | 0 | −1 | −1 | 1 | 0 | 0 | 0 | 1 | 0 | 0 | 0 |
| 10 | 0 | −1 | 0 | 1 | 1 | 0 | 0 | 1 | 1 | 0 | 0 |
| 11 | 0 | −1 | 1 | 0 | 1 | 0 | 0 | 0 | 1 | 0 | 0 |
| 12 | 0 | 0 | −1 | 1 | 0 | 1 | 0 | 1 | 0 | 1 | 0 |
| 13 | 0 | 0 | 1 | 0 | 1 | 0 | 1 | 0 | 1 | 0 | 1 |
| 14 | 0 | 1 | −1 | 0 | 0 | 1 | 0 | 0 | 0 | 1 | 0 |
| 15 | 0 | 1 | 0 | 0 | 0 | 1 | 1 | 0 | 0 | 1 | 1 |
| 16 | 0 | 1 | 1 | 0 | 0 | 0 | 1 | 0 | 0 | 0 | 1 |
| 17 | 1 | −1 | −1 | 0 | 0 | 0 | 0 | 1 | 0 | 0 | 0 |
| 18 | 1 | −1 | 0 | 0 | 0 | 0 | 0 | 1 | 1 | 0 | 0 |
| 19 | 1 | −1 | 1 | 0 | 0 | 0 | 0 | 0 | 1 | 0 | 0 |
| 20 | 1 | 0 | −1 | 0 | 0 | 0 | 0 | 1 | 0 | 1 | 0 |
| 21 | 1 | 0 | 0 | 0 | 0 | 0 | 0 | 1 | 1 | 1 | 1 |
| 22 | 1 | 0 | 1 | 0 | 0 | 0 | 0 | 0 | 1 | 0 | 1 |
| 23 | 1 | 1 | −1 | 0 | 0 | 0 | 0 | 0 | 0 | 1 | 0 |
| 24 | 1 | 1 | 0 | 0 | 0 | 0 | 0 | 0 | 0 | 1 | 1 |
| 25 | 1 | 1 | 1 | 0 | 0 | 0 | 0 | 0 | 0 | 0 | 1 |

G-PCC motion prediction is described below. There are two kinds of motion involved in G-PCC InterEM (exploratory model of inter-prediction) software, as described in "Exploratory model for inter-prediction in G-PCC", ISO/IEC JTC1/SC29 WG11 N18096, Macau, C N, October 2018: global motion matrix and local node motion vector. Global motion parameters are defined as a rotation matrix and translation vector which will be applied on all the points (except the points being applied local motion mode) in prediction (reference) frame. Local node motion vector of a node of the octree is a motion vector that is only applied on points within the node in prediction (reference) frame.

Given input prediction (reference) frame and current frame, global motion is estimated first at a global scale. After applying global motion on prediction, local motion is estimated at a finer scale, node level in octree. The estimated local node motion is applied in motion compensation.

A process to estimate a global motion matrix and a translation vector is used below. The motion vector may be estimated in a recursive manner. The cost function used for choosing the best suitable motion vector may be based on the Rate-Distortion cost.

If a current node is not split into 8 children, the motion vector that could result in the lowest cost between current node and prediction node may be determined. If the current node is divided into 8 children, the motion estimation algorithm may be applied and the total cost under split condition is obtained by adding the estimated cost value of each child node. The decision whether to split or not to split is arrived by comparing the cost between splitting and not splitting; if split, each sub-node is assigned its respective the motion vector (or may be further split to its children), if not split, the current node is assigned the motion vector.

Two parameters that affect the performance of motion vector estimation are block size (BlockSize) and minimum prediction unit size (MinPUSize). BlockSize defines the upper bound of node size to apply motion vector estimation and MinPUSize defines the lower bound.

This disclosure recognizes certain issues that may be present. Currently, the use of inter prediction has not been implemented in the G-PCC specification (G-PCC FDIS Draft 8). The original implementation (InterEM version 1) of inter prediction in occupancy coding was implemented on top of the reference software for GPCC, i.e., TMC version 4, as described in "Exploratory model for inter-prediction in G-PCC", ISO/IEC JTC1/SC29 WG11 N18096, Macau, C N, October 2018. The inter prediction (InterEM version 2) was recently improved and adopted in a newer version of the reference software TMC version 12, as described in Luong Pham Van, Geert Van der Auwera, Adarsh Krishnan Ramasubramonian, Marta Karczewicz, "EE13.2 Test 1.1: Global motion using two-threshold classification", ISO/IEC JTC 1/SC 29/WG 7 MPEG/m56818, Teleconference, April 2021. The source code corresponding with this improved version may be found in mpegx.int-evry.fr/software/MPEG/PCC/CE/mpeg-pcc-tmc13/-/tree/mpeg133/ee 13.2/m56113-InterEM-v2.0-TMC13v12-GlobalMotionEst-two-thresholds/.

It should be noted that in the current InterEM version 2, the inter prediction was tested without the newly adopted mode, i.e., planar mode, as shown in Sébastien Lasserre, David Flynn, "[GPCC] Planar mode in octree-based geometry coding," ISO/IEC JTC1/SC29/WG11 MPEG/m48906, Gothenburg, Sweden, July 2019. It should also be noted that, the planar mode is a part of occupancy coding of a node. Therefore, it has some interactions when the inter prediction and planar mode are both enabled. In the initial implementation of InterEM version 2, if any direction in the node is planar mode (or equivalently, if any of mask_planar[k] defined in Section 9.7.3 with k=0 . . . 2 are not equal to 0), the inter prediction is set equal to zero and it is not used in the selection of context for occupancy coding. In this case, the benefit of inter prediction is eliminated in occupancy coding.

Examples in accordance with one or more techniques in this disclosure are discussed below. The example techniques may address some of the issues described above, but the example techniques should not be considered limited to requiring to address the above issues. In general, this disclosure describes example techniques to utilize inter-prediction in occupancy coding when the planar mode is enabled in G-PCC.

In the following description, updates/modifications of specification text or code may be understood as follows: added text/code is presented by text between <ADD> . . . </ADD>, deleted text/code is presented by text between <DELETE> . . . </DELETE>

The following are some examples of the terms in this section:

NeighbourPattern which is derived as in Section 7.4.3.5 of Draft 8 represents the occupancy of the neighbours of the current node's parent neighbours.

mask_planar[k] is the planar mask of the k-th direction axis in the node. This term is derived as presented in Section 9.7.3. If the k-th direction has the planar mode (planar_flag [k]) of 0, mask_planar[k] is set equal to 0. Otherwise, mask_planar[k] is set based on the plane position of the k-th direction as follows: The i-th bit, for i=0 . . . 7, of mask_planar[axisIdx] is set to 0 if the corresponding i-th child node belongs to the occupied plane, 1 otherwise. By using mask_planar[k], if a bit in mask_planar[k] is equal to 1, the occupancy of the corresponding child node does not need to be signalled.

IsNotPlanar[k]=PlanarEligible[k]&&!is_planar_flag[k]

is_planar_flag is defined in Section 7.4.3.5 of Draft 8. is_planar_flag[axisIdx] equal to 1 indicates that the positions of the current node's children form a single plane perpendicular to the axisIdx-th axis. is_planar_flag[axisIdx] equal to 0, when present, indicates that the positions of the current node's children occupy both planes perpendicular to the axisIdx-th axis.

Single node coding using inter prediction and planar mask is discussed below. It should be noted that the encoder (e.g., G-PCC encoder 200) may need to signal single_occupancy_flag to indicate whether the node has a single occupied child or not. If this flag is true, the encoder may need to further signal the index of the single occupied child. This signal may not be efficient compared to directly encoding the occupancy using inter prediction or when the node has planar masks.

In Section 7.4.3.5 of GPCC Draft 8, OccupancyIdxMaybePresent specifies when single_occupancy_flag is present in the octree node syntax as follows:

---

The variable OccupancyIdxMaybePresent specifies when single_occupancy_flag is present in the octree node syntax.
let numPlanarAxes = IsPlanar[0] + IsPlanar[1] + IsPlanar[2]
let numNonPlanarAxes = IsNotPlanar[0] + IsNotPlanar[1] + IsNotPlanar[2]
  OccupancyIdxMaybePresent = numPlanarAxes < 3 ||
(!NeighbourPattern && !numNonPlanarAxes)

---

In the above condition, single_occupancy_flag may be signaled only if numPlanarAxes <3 or if the occupancy of the neighbor (NeighbourPattern) is equal to zero and the number of non-planar axes is zero. For instance, because when the NeighbourPattern is non-zero (!NeighbourPattern), and/or it may have planar at an axis (the number of occupancy bits is reduced by using the planar mask), directly coding of occupancy (adaptive context base coding using NeighbourPattern) may be more efficient than encoding the single_occupancy_flag and the occupancy position for the single node.

In one or more examples described in this disclosure, the occupancy (inter_pred_Occ) of the inter prediction block and the mask_planar[k] with k=0 . . . 2 may be used to check whether the single_occupancy_flag may be signalled or not. For example, when there is inter prediction data or the node has planar masks, it may be better to directly encode the occupancy than encode the single_occupancy_flag and the position of the single node. In this case, the overhead for signalling the single_occupancy_flag is also avoided.

In one example, OccupancyIdxMaybePresent may be derived as follows:

---

The variable OccupancyIdxMaybePresent specifies when single_occupancy_flag is present in the octree node syntax.

```
let numPlanarAxes = IsPlanar[0] + IsPlanar[1] + IsPlanar[2]
let numNonPlanarAxes = IsNotPlanar[0] + IsNotPlanar[1] +
IsNotPlanar[2]
  OccupancyIdxMaybePresent = numPlanarAxes < 3 ||
(!NeighbourPattern <<ADD>&& (!inter_pred_Occ || (mask_planar[0] |
mask_planar[1] | mask_planar[2]) )<</ADD> && !numNonPlanarAxes)
```

In the above condition, the occupancy of the inter collocated prediction node is derived as in the reference software (e.g., source code identified above). The derivation of the occupancy of the inter collocated prediction node is briefly described below with respect to using the inter-prediction in context selection for occupancy coding. A syntax may be added to the geometry octree node semantics as follows:

<ADD>inter_pred_Occ</ADD>: representing the occupancy of the collocated node in the inter prediction reference frame. In some examples, the derivation of this occupancy should be added to comply with the reference software.

The implementation in the reference software for derivation of the single_occupancy_flag and the position of occupied child node in a single node may be accordingly modified as follows (Function GeometryOctreeDecoder::decodeOccupancy( . . . )):

condition may be used to select the context used to code single_occupancy indication/flag.

Using the inter-prediction in context selection for occupancy coding is discussed below. As mentioned above, in the current implementation of inter prediction in InterEM version 2, as described in Luong Pham Van, Geert Van der Auwera, Adarsh Krishnan Ramasubramonian, Marta Karczewicz, "EE13.2 Test 1.1: Global motion using two-threshold classification", ISO/IEC JTC 1/SC 29/WG 7 MPEG/ m56818, Teleconference, April 2021, if any of mask_planar [k] defined in Section 9.7.3 with k=0 . . . 2 are not equal to 0, the inter prediction is set equal to zero and it is not used in the context selection process for occupancy coding. This is originally following the rule to decide idxPred in ctxMapIdx and ctxIdx derivation processes (Section 9.7.6 of Draft 8):

If any of mask_planar[k], k=0 . . . 2, are not equal to 0, the variable idxPred is set equal to 0

This rule is presented in the interEM reference software as follows with text within <RULE> . . . </RULE>identifying the rule.

In GeometryOctreeDecoder::decodeGeometryOctree( . . . ):

```
// decode occupancy pattern
uint32_t occupancy;
// single child and we know its position
if (planarMaskX && planarMaskY && planarMaskZ) {
   uint32_t cnt = (planarMaskZ & 1);
   cnt |= (planarMaskY & 1) << 1;
   cnt |= (planarMaskX & 1) << 2;
   occupancy = 1 << cnt;
   return occupancy;
}
<ADD> //Note (!predOcc || (planarMaskX | planarMaskY | planarMaskZ) is
equivalent to the condition: (!inter_pred_Occ || (mask_planar[0] | mask_planar[1] |
mask_planar[2])
if (gnp.neighPattern == 0 && (!predOcc || (planarMaskX | planarMaskY |
planarMaskZ))) {</ADD>
   <DELETE>if (gnp.neighPattern == 0) {</DELETE>
   bool singleChild = false;
   if (planarPossibleX && planarPossibleY && planarPossibleZ) {
      singleChild = _arithmeticDecoder->decode(_ctxSingleChild)
== 1;
   }
   if (singleChild) {
      uint32_t cnt;
      if (!planarMaskZ)
         cnt = _arithmeticDecoder->decode( );
      else
         cnt = (planarMaskZ & 1);
      if (!planarMaskY)
         cnt |= _arithmeticDecoder->decode( ) << 1;
      else
         cnt |= (planarMaskY & 1) << 1;
      if (!planarMaskX)
         cnt |= _arithmeticDecoder->decode( ) << 2;
      else
         cnt |= (planarMaskX & 1) << 2;
      occupancy = 1 << cnt;
      return occupancy;
   }
}
```

Alternatively, instead of determining whether to signal single_occupancy based on the above condition, the above

```
bool intraPredUsed = !(planarMask[0] | planarMask[1] | planarMask[2]);
int occupancyIsPredicted = 0;
int occupancyPrediction = 0;
```

```
//Note: Only when intraPredUsed is true (or planarMask[0] | planarMask[1] |
planarMask[2] is zero), predictGeometryOccupancyIntra is invoked where
occupancyIsPredicted and occupancyPrediction are updated using the neighbor node
information.
    if (nodeMaxDimLog2 < gps.intra_pred_max_node_size_log2
       && gps.neighbour_avail_boundary_log2_minus1 > 0 &&
intraPredUsed) {
        predictGeometryOccupancyIntra(occupancyAtlas, node0.pos,
codedAxesPrevLvl, &occupancyIsPredicted,&occupancyPrediction);
    }
    #if INTER_EM_VERSION2
    if (predOccupancy) {
       predOccupancyStrong |= predOccupancy & occupancyPrediction;
    }
    <RULE>//Note: inter is not used when (planarMask[0] | planarMask[1] |
planarMask[2]) is non-zero, or equivalently, any of mask_planar[ k ], k = 0 .. 2, are
not equal to 0.
    bool interPredUsed = !(planarMask[0] | planarMask[1] | planarMask[2]);
    if (! interPredUsed)
    {
       predOccupancy = 0;
       predOccupancyStrong = 0;
    }</RULE>
    if (!isIntra) {
       occupancyIsPredicted = 0;
       occupancyPrediction = 0;
    }
    #endif
```

In the functions GeometryOctreeDecoder::decodeOccupancyNeighZ( . . . ) and GeometryOctreeDecoder::decodeOccupancyNeighNZ( . . . ): (Note: decodeOccupancyNeighZ( . . . ) is to decode the occupancy of the block when the neigh pattern (NeighbourPattern) is non-zero. decodeOccupancyNeighZ( . . . ) is to decode the occupancy of the block when the neigh pattern is zero. It firstly obtains the context index ctxIdx. Then it uses this index to decode the occupancy bit.)

In some examples, predOccupancy and predOccupancyStrong are derived as specified in the function decodeGeometryOctree( . . . ) of the reference software. The reference frame and the global motion vector are used to generate the inter prediction reference frame. The reference block is then derived by collecting the points in the collocated position with the location of the current node in the inter prediction reference frame. The reference block is then divided into 2×2×2 child nodes and predOccupancy is derived using the

```
...
// Note: The following code is to obtain the CtxIdxMapIdx (Section 9.7.6)
based on the neighboring information idxAdj, the predicted bits using intra
(bitIsPredicted + bitPrediction), and predicted bits using inter prediction
(!!mappedPred + bitPred + bitPredStrong). mappedOcdsPredicted and
mappedOccPrediction are obtained using the intra prediction occupancy using
neighbouring node information.
    #if INTER_EM_VERSION2
    int ctxIdxMapIdx = 4 * idxAdj;
    #else
    int ctxIdxMapIdx = 3 * idxAdj;
    #endif
    if (!maskedOccupancy) {
       int bitIsPredicted = (mappedOccIsPredicted >> bitIdx) & 1;
       int bitPrediction = (mappedOccPrediction >> bitIdx) & 1;
    #if INTER_EM_VERSION2
       ctxIdxMapIdx = 4 * idxAdj + bitIsPredicted + bitPrediction
          + !!mappedPred + bitPred + bitPredStrong; // inter
    #else
       ctxIdxMapIdx = 3 * idxAdj + bitIsPredicted + bitPrediction;
    #endif
    }
    //Note: ctxIdxMapIdx is then used to derive ctxIdx as specified in section
9.7.6.
...
```

In the above code, bitPred, bitPredStrong represent the bit values in mappedPred and mappedPredStrong, corresponding to the position of the being coded child node. idxAdj represent the part of ctxIdxMapIdx based on the neighbouring occupancy. mappedPred and mappedPredStrong are determined based on predOccupancy and predOccupancyStrong as described below:

occupancy in each child node. predOccupancyStrong is derived using the number of points occupied in each child node of the reference block. If a child node has the number of points being less than 3, the corresponding bit in the predOccupancyStrong is set equal to 0. Otherwise, this bit is set equal to 1. predOccupancyStrong is then updated by applying bit OR operation with the "intra" occupancy predicted using the neighbouring octree nodes presented in Section 9.7.8 of Draft 8.

Then, the predOccupancy and predOccupancyStrong is mapped to take into account symmetries in the neighbour configuration using the function mapGeometryOccupancy( . . . ) per the reference software. This function outputs mappedPred and mappedPredStrong.

In one or more examples described in this disclosure, the inter prediction information (for example, bitPred and bitPredStrong and mappedPred) may be used in context selection for occupancy coding without the condition of planar mask of the current node. In other words, a single unified method may be applied to get the context when the node has at least one planar direction or when the node has no planar direction.

In one example, the section 9.7.6 of Draft 8 may be modified as follows: A syntax may need to be added into Geometry octree node semantics (Section 7.4.3.5):

<ADD>geom_node_is_inter equal to 1 indicates that the variable idxPred in the ctxMapIdx and ctxIdx derivation processes is derived using the occupancy of the inter prediction block as presented in 9.7.x. geom_node_is_inter equal to 0 indicates that variable idxPred in the ctxMapIdx and ctxIdx derivation processes is derived using the occupancy prediction process using the neighbouring octree nodes as presented in 9.7.8. </ADD>

---

9.7.6 ctxMapIdx and ctxIdx derivation processes

---

Inputs to this process are,
the variable NeighbourPattern, representing the occupancy of the neighbours of the current node's parent neighbours,
the planar information mask_planar associated with the current node,
the variable depth, indicating the current geometry tree depth,
the variable binIdx, indicating the bin to be decoded, and
the variable partialSynVal, representing the partially reconstructed value of the syntax element.
<ADD>The variable inter_pred_Occ, representing the inter prediction occupancy of the current node.
The variable occupancyPrediction, representing the strong inter prediction occupancy of the current node. </ADD>
    [NB: inter_pred_Occ and occupancyPrediction are generated using inter prediction as presented in "EE13.2 Test 1.1: Global motion using two-threshold classification". The corresponding text should be added]
    Output by this process are the variables ctxMapIdx and ctxIdx.
    The variable idxPred is set as follows:
If NodeMaxDimLog2 is greater than or equal to log2_intra_pred_max_node_size, the variable idxPred is set equal to 0.
If any of mask_planar[ k ], k = 0 .. 2, are not equal to 0 <ADD> and geom_node_is_inter of the node is not equal to 1 </ADD>, the variable idxPred is set equal to 0.
Otherwise, <ADD> if geom_node_is_inter of the node is not equal to 1 </ADD>, the variable idxPred is set equal to the output of the occupancy prediction process using neighbouring octree nodes (9.7.8) when invoked with the current node and childIdx set equal to the output of the neighbour dependent geometry octree child node scan order Inverse mapping process (6.4.1) with the inputs neighbourPattern and inIdx set equal to bitCodingOrder[ binIdx ] where values of bitCodingOrder[ ] are given in Table 28.
<ADD> Otherwise, the variable idxPred is set equal to the output of the occupancy prediction process using inter prediction octree nodes (9.7.x) when invoked with the inputs including inter_pred_Occ and occupancyPrediction. </ADD>
    The variable idxAdj is set as follows:
If adjacent_child_contextualization_enabled_flag is equal to 1, the following applies:
The variables adjOcc and adjUnocc are initialized to 0.
The variables sC, tC, and vC identifying the position of the child node associated with binIdx at depth + 1 are initialized as follows:
111  sC = 2 × sN + ((bitCodingOrder [binIdx] >> 2) & 1)
112  tC = 2 × tN + ((bitCodingOrder[binIdx] >> 1) & 1)
113  vC = 2 × vN + (bitCodingOrder[binIdx] & 1)
    The following procedure is performed for each of the s, t, and v axes by substituting the variables aK, aN, aC, nPmask, sCn, tCn, vCn, sNn, tNn, and vNn of the corresponding row of Table 29.
114  // if child is adjacent to a causally-valid neighbour
115  if (!(aC& 1)) {
116    if (NeighboutPattern & nPmask) {
117      aD = !depth ? 1 : geom_tree_coded_axis_flag[depth − 1][aK] ? 1 : 2
118      adjOcc += NodeNumChildren[depth + 1][sCn][tCn][vCn]
119    } else
120      // if neighbour is available but not present
121      if ((aN + 1) & NeighbAvailabilityMask != 1)
122        if (NodeNumChildren[depth][sNn][tNn][vNn] == 0)
123          adjUnocc = 1
124  }

9.7.6 ctxMapIdx and ctxIdx derivation processes

Table 29 - Variable substitutions for the computation of adjOcc and adjUnocc

| axis | aK | aN | aC | nPmask | sCn    | tCn    | vCn    | sNn    | tNn    | yNn    |
|------|----|----|----|--------|--------|--------|--------|--------|--------|--------|
| s    | 0  | sN | sC | 2      | sC − aD| tC     | vC     | sN − 1 | tN     | vN     |
| t    | 1  | tN | tC | 4      | sC     | tC − aD| vC     | sN     | tN − 1 | vN     |
| v    | 2  | vN | vC | 16     | sC     | tC     | vC − aD| sN     | tN     | vN − 1 |

The variable idxAdj is derived as follows:
125 idxAdj = adjUnocc + 2 × Min(2, adjOcc)
126 if (binIdx > 4)
127   idxAdj = ctxIdxAdjReduc567[idxAdj]

Table 30 - Values of ctxIdxAdjReduc567[i]

| i                    | 0 | 1 | 2 | 3 | 4 | 5 |
|----------------------|---|---|---|---|---|---|
| ctxIdxAdjReduc567[i] | 0 | 0 | 1 | 2 | 3 | 3 |

The variable ctxIdxMapIdx is set equal to <DELETE>3</DELETE><ADD>4</ADD>× idxAdj + idxPred.
The output variable ctxMapIdx is derived as follows:
If NeighbourPattern is equal to 0, ctxIdxMapOffset is set equal to popcnt( partialSynVal ).
Otherwise, NeighbourPattern is not equal to 0, the following applies:
128 if (log2_neighbour_avail_boundary_minus1 > 0)
129   pattern = neighbourPattern64to9[NeighbourPattern];
130 else
131   pattern = neighbourPattern64to6[NeighbourPattern];
132
133 if (binIdx == 7)
134   pattern = 1;
135 else if (binIdx == 6)
136   pattern = neighbourPattern9to3[pattern];
137 else if (binIdx > 3)
138   pattern = neighbourPattern9to5[pattern];
139 ctxIdxMapOffset = ((pattern − 1) << binIdx) + partialSynVal + binIdx + 1;
Finally, the output variable ctxIdx is set as follows:
140 ctxMapIdx = ctxIdxMapIdx × 1499 + ctxIdxMapOffset
141 ctxIdx = CtxMap[ctxMapIdx] >> 3
<ADD>9.7.x Occupancy prediction process using inter prediction</ADD>
Inputs to this process are,
the variable binIdx, indicating the bin to be decoded, and
<ADD>The variable inter_pred_Occ, representing the inter prediction occupancy of the current node.
The variable occupancyPrediction, representing the strong inter prediction occupancy of the current node. </ADD>
Output by this process is the variable <ADD> idxPred </ADD> which is used to obtain the context for occupancy coding in Section 9.7.6.
[NB: This section present the methodology which derives the context selection (the variable idxPred) using inter prediction information. This derivation complies with the method of getting the variable ctxIdxMapIdx in the reference software in the functions GeometryOctreeDecoder::decodeOccupancyNeighZ(...) and GeometryOctreeDecoder::decodeOccupancyNeighNZ(...) ]

In this example, the reference software may be changed accordingly as follows: In GeometryOctreeDecoder::decodeOccupancy:

```
bool intraPredUsed = !(planarMask[0] | planarMask[1] | planarMask[2]);
    int occupancyIsPredicted = 0;
    int occupancyPrediction = 0;
    if (nodeMaxDimLog2 < gps.intra_pred_max_node_size_log2
        && gps.neighbour_avail_boundary_log2_minus1 > 0 && intraPredUsed) {
          predictGeometryOccupancyIntra(occupancy Atlas, node0.pos,
codedAxesPrevLvl, &occupancyIsPredicted,&occupancyPrediction);
    }
#if INTER_EM_VERSION2
    if (predOccupancy) {
       predOccupancyStrong = predOccupancy & occupancyPrediction;
    }
    <DELETE> bool interPredUsed = !(planarMask[0] | planarMask[1] | planarMask[2]);
    if (!interPredUsed)
    {
       predOccupancy = 0;
       predOccupancyStrong = 0;
    }</DELETE>
    if (!isIntra) {
       occupancyIsPredicted = 0;
       occupancyPrediction = 0;
    }
#endif
```

In the function GeometryOctreeDecoder::decodeOccupancyNeighZ( . . . ) and GeometryOctreeDecoder::decodeOccupancyNeighNZ( . . . ):

```
#if INTER_EM_VERSION2
int ctxIdxMapIdx = 4 * idxAdj;
#else
int ctxIdxMapIdx = 3 * idxAdj;
#endif
<DELETE> if (!maskedOccupancy) { </DELETE>
    int bitIsPredicted = (mappedOccIsPredicted >> bitIdx) & 1;
    int bitPrediction = (mappedOccPrediction >> bitIdx) & 1;
#if INTER_EM_VERSION2
    ctxIdxMapIdx = 4 * idxAdj + bitIsPredicted + bitPrediction
        + !!mappedPred + bitPred + bitPredStrong; // inter
#else
    ctxIdxMapIdx = 3 * idxAdj + bitIsPredicted + bitPrediction;
#endif
}
```

In another example, the implementation may be updated as follows:

```
#if INTER_EM_VERSION2
int ctxIdxMapIdx = 4 * idxAdj;
#else
int ctxIdxMapIdx = 3 * idxAdj;
#endif
if (!maskedOccupancy <ADD> || geom_node_is_inter </ADD>) {
    int bitIsPredicted = (mappedOccIsPredicted >> bitIdx) & 1;
    int bitPrediction = (mappedOccPrediction >> bitIdx) & 1;
#if INTER_EM_VERSION2
    ctxIdxMapIdx = 4 * idxAdj + bitIsPredicted + bitPrediction
        + !!mappedPred + bitPred + bitPredStrong; // inter
#else
    ctxIdxMapIdx = 3 * idxAdj + bitIsPredicted + bitPrediction;
#endif
}
```

Using the inter-prediction in context selection for planar flag signaling is discussed below. Currently, there are three contexts for signalling the planar flag (is_planar_flag). The selection of the index is simply selected by the direction index (axisIdx) (Draft 8).

In some examples, the context to encode the planar flag may be extended using the planar mode of the reference node. An example of the extension may be described as follows:

The inputs to this process are:
- the variable childIdx identifying the child of the current node,
- the variable axisIdx identifying the axis normal to a plane, and
- the position (sN, tN, vN) of the current node within a geometry tree level.
The output of this proces is the variable ctxIdx. The value of ctxIdx is set equal to <ADD>(3*</ADD>axisIdx <ADD>+ (RefPlane [ axisIdx ] + 1))</ADD> and no further processing is performed.

In this example, RefPlane[axisIdx]) indicates the plane position the axisIdx direction in the reference node. If the planar mode in axisIdx direction is false, RefPlane[axisIdx]) may be set equal to −1. Otherwise, it may be set equal to the plane position in the axisIdx direction.

In this manner, G-PCC decoder 300 represents an example of a device for coding point cloud data, including: a memory configured to store point cloud data; and one or more processors implemented in circuitry and configured to: determine whether inter prediction data is coded for a current node of an octree of the point cloud data; determine whether planar mask data is coded for the current node; when at least one of the inter prediction data or the planar mask data is coded for the current node, avoid coding a single occupancy value for the current node, the single occupancy value indicating whether only a single sub-node of the current node includes one or more points; and code the current node.

Figure 5:
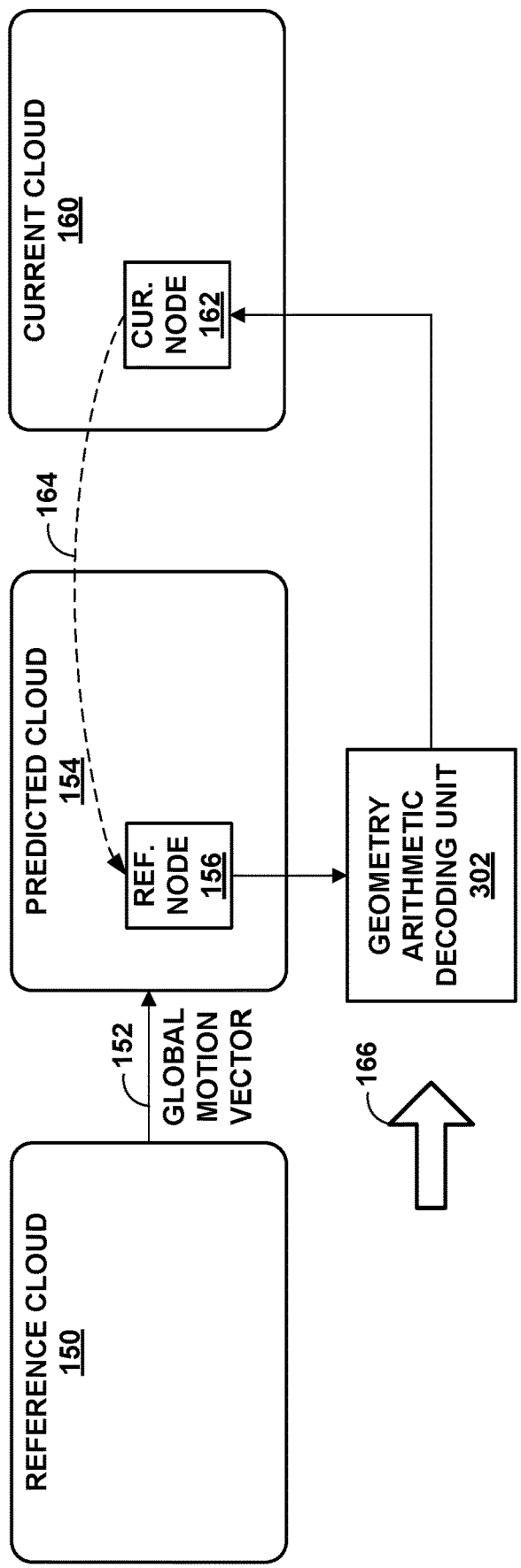
FIG. 5 is a conceptual diagram illustrating an example of inter-prediction decoding in G-PCC.

FIG. 5 is a conceptual diagram illustrating an example of inter-prediction decoding in G-PCC. In accordance with the techniques of this disclosure, G-PCC decoder 300 may use the global motion vector inter-prediction techniques of FIG. 5 to decode a set of points of current cloud 160, and local motion vector inter-prediction or intra-prediction to decode a second set of points of current cloud 160. G-PCC decoder 300 may receive and decode data of bitstream 166 representing whether sets of points for one or more nodes are to be decoded using global motion vector inter-prediction.

G-PCC decoder 300 may initially decode one or more previous point clouds and store the previously decoded point clouds in a decoded frame buffer or history buffer (i.e., a memory of G-PCC decoder 300). G-PCC decoder 300 may also decode motion information including data for global motion vector 152 and identifying reference cloud 150 in the previously decoded point clouds.

G-PCC decoder 300 may apply global motion vector 152 to reference cloud 150 to generate predicted cloud 154. That is, G-PCC decoder 300 may construct predicted cloud 154 by applying global motion vector 152 to each point of reference cloud 150 at respective locations, and setting occupancy of nodes (e.g., reference node 156) of predicted cloud 154 to include a point at a corresponding location offset by global motion vector 152.

Geometry arithmetic decoding unit 302 may then use the occupancy of nodes of predicted cloud 154 (e.g., reference node 156) to determine a context for decoding a value representing occupancy of current node 162 of current cloud 160. Current cloud 162 corresponds to reference node 156 as indicated by vector 164. For example, if reference node 156 is occupied (that is, includes a point), geometry arithmetic decoding unit 302 may determine a first context for encoding a value representing occupancy of current node 162. The first context may indicate a most probable symbol for the value representing occupancy of current node 162 as having a high likelihood of a value representing that current node 162 is occupied (e.g., '1'). On the other hand, if reference node 156 is not occupied (that is, does not include any points), geometry arithmetic decoding unit 302 may determine a second context for encoding the value representing occupancy of current node 162. The second context may indicate a most probable symbol for the value representing occupancy of current node 162 as having a high likelihood of a value representing that current node 162 is not occupied (e.g., '0'). Geometry arithmetic decoding unit 302 may then decode a value of bitstream 166 representing occupancy of current node 162 using the determined context.

Figure 6:
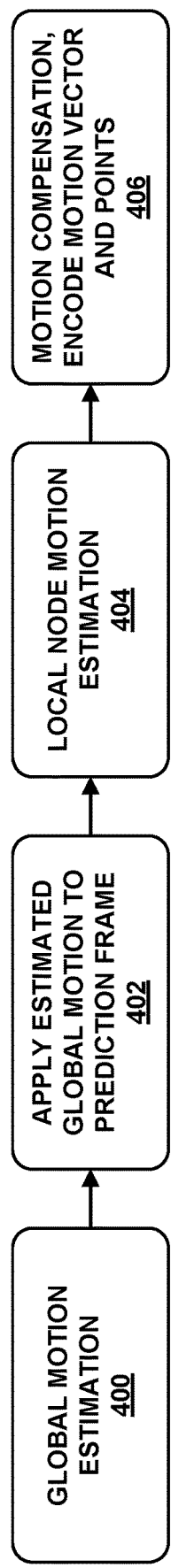
FIG. 6 is a flowchart illustrating an example motion estimation process for G-PCC InterEM software.

FIG. 6 is a flowchart illustrating an example motion estimation process for G-PCC InterEM software. There are two kinds of motion involved in G-PCC InterEM software, a global motion matrix and a local node motion vector. Global motion parameters are defined as a rotation matrix and translation vector, which will be applied on all the points in a prediction (reference) frame. A local node motion vector of a node of the octree is a motion vector that may only be applied on points within the node in a prediction (reference) frame. Details of the motion estimation algorithm in InterEM are described below. FIG. 6 illustrates flowchart for a motion estimation algorithm.

Given input prediction (reference) frame and current frame, G-PCC encoder 200 may first estimate global motion at a global scale (400). G-PCC encoder 200 may then apply estimated global motion to the prediction (reference) frame (402). After applying global motion on the prediction (reference) frame, G-PCC encoder 200 may estimate local motion at a finer scale (404), e.g., node level in octree. Finally, G-PCC encoder 200 may perform motion compensation (406) to encode the estimated local node motion vectors and points.

G-PCC decoder 300 may perform a similar method to that of FIG. 6. However, rather than performing global motion estimation, G-PCC decoder 300 may decode data from the bitstream representing the global motion vector. Likewise, rather than performing local node motion estimation, G-PCC decoder 300 may decode data representing one or more local node motion vectors. Then, after performing motion compensation, G-PCC decoder 300 may also decode occupancy of the nodes using the prediction frame.

Figure 7:
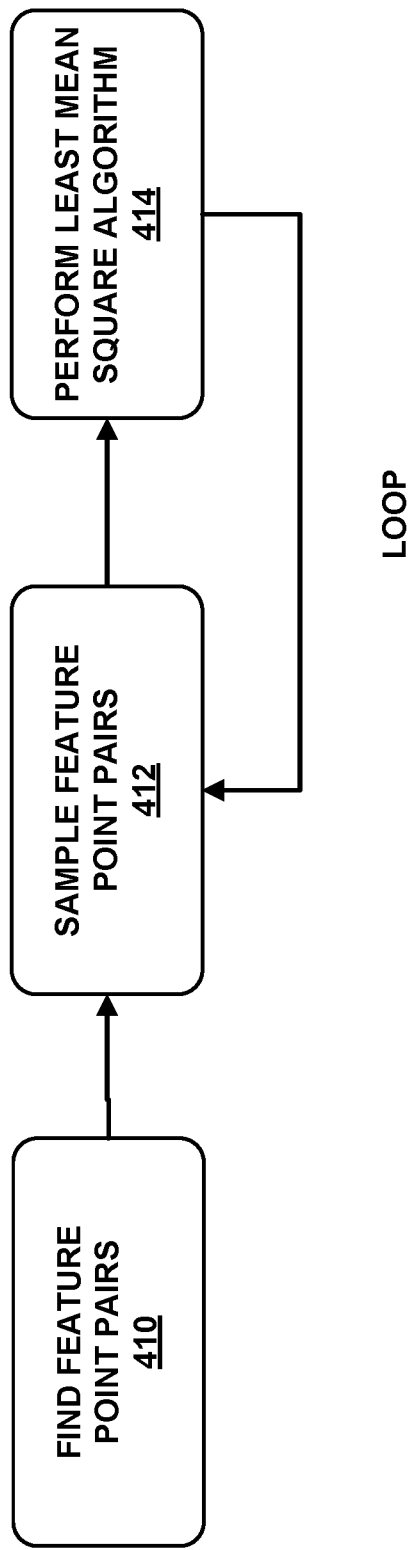
FIG. 7 is a flowchart illustrating an example process for estimating global motion.

FIG. 7 is a flowchart illustrating an example process for estimating global motion. In the InterEM software, the global motion matrix is defined to match feature points between the prediction frame (reference) and the current frame. FIG. 7 illustrates the pipeline for estimating global motion. The global motion estimation algorithm may be divided into three steps: finding feature points (410), sampling feature points pairs (412), and motion estimation using a Least Mean Square (LMS) algorithm (414).

The algorithm defines feature points to be those points that have large position change between the prediction frame and current frame. For each point in the current frame, G-PCC encoder 200 finds the closest point in the prediction frame and builds point pairs between the current frame and the prediction frame. If the distance between the paired points is greater than a threshold, G-PCC encoder 200 regards the paired points as feature points.

After finding the feature points, G-PCC encoder 200 performs a sampling on the feature points to reduce the scale of the problem (e.g., by choosing a subset of feature points to reduce the complexity of motion estimation). Then, G-PCC encoder 200 applies the LMS algorithm to derive motion parameters by attempting to reduce the error between respective features points in the prediction frame and the current frame.

Figure 8:
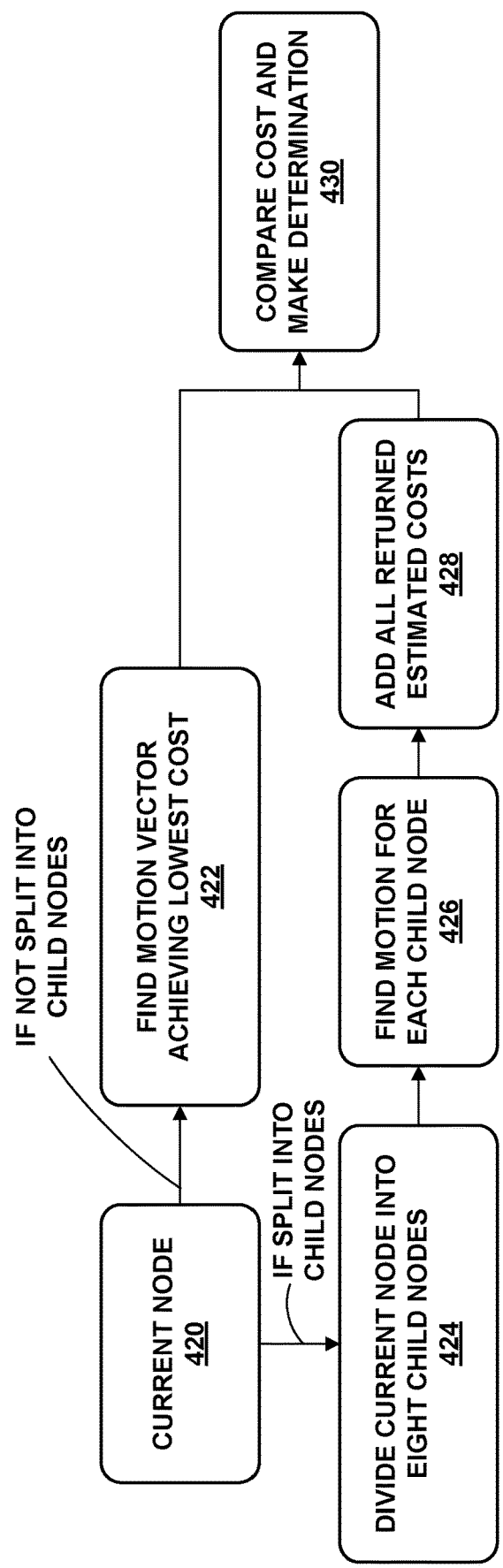
FIG. 8 is a flowchart illustrating an example process for estimating a local node motion vector.

FIG. 8 is a flowchart illustrating an example process for estimating a local node motion vector. G-PCC encoder 200 may estimate the motion vectors for nodes of the prediction tree in a recursive manner. G-PCC encoder 200 may evaluate a cost function for selecting a best suitable motion vector based on rate-distortion (RD) costs.

In the example of FIG. 8, G-PCC encoder 200 receives a current node (420). If the current node is not split into 8 children, G-PCC encoder 200 determines a motion vector that would result in the lowest cost between the current node and the prediction node (422). On the other hand, if the current node is divided into 8 children, G-PCC encoder 200 divides the current node into 8 children (424), finds motion for each of the child nodes (426), and adds all returned estimated costs (428). That is, G-PCC encoder 200 applies a motion estimation algorithm and obtains a total cost under a split condition by adding the estimated cost value of each child node. G-PCC encoder 200 may determine whether to split or not split a node by comparing costs between splitting and not splitting. If split, G-PCC encoder 200 may assign each sub-node its respective motion vector (or further split the node into respective child nodes). If not split, G-PCC encoder 200 may assign the node its motion vector. G-PCC encoder 200 may then compare the costs to determine whether to split the current node or not split the current node (430).

Two parameters that may affect the performance of motion vector estimation are block size (BlockSize) and minimum prediction unit size (MinPUSize). BlockSize defines the upper bound of node size to apply motion vector estimation and MinPUSize defines the lower bound.

Figure 9:
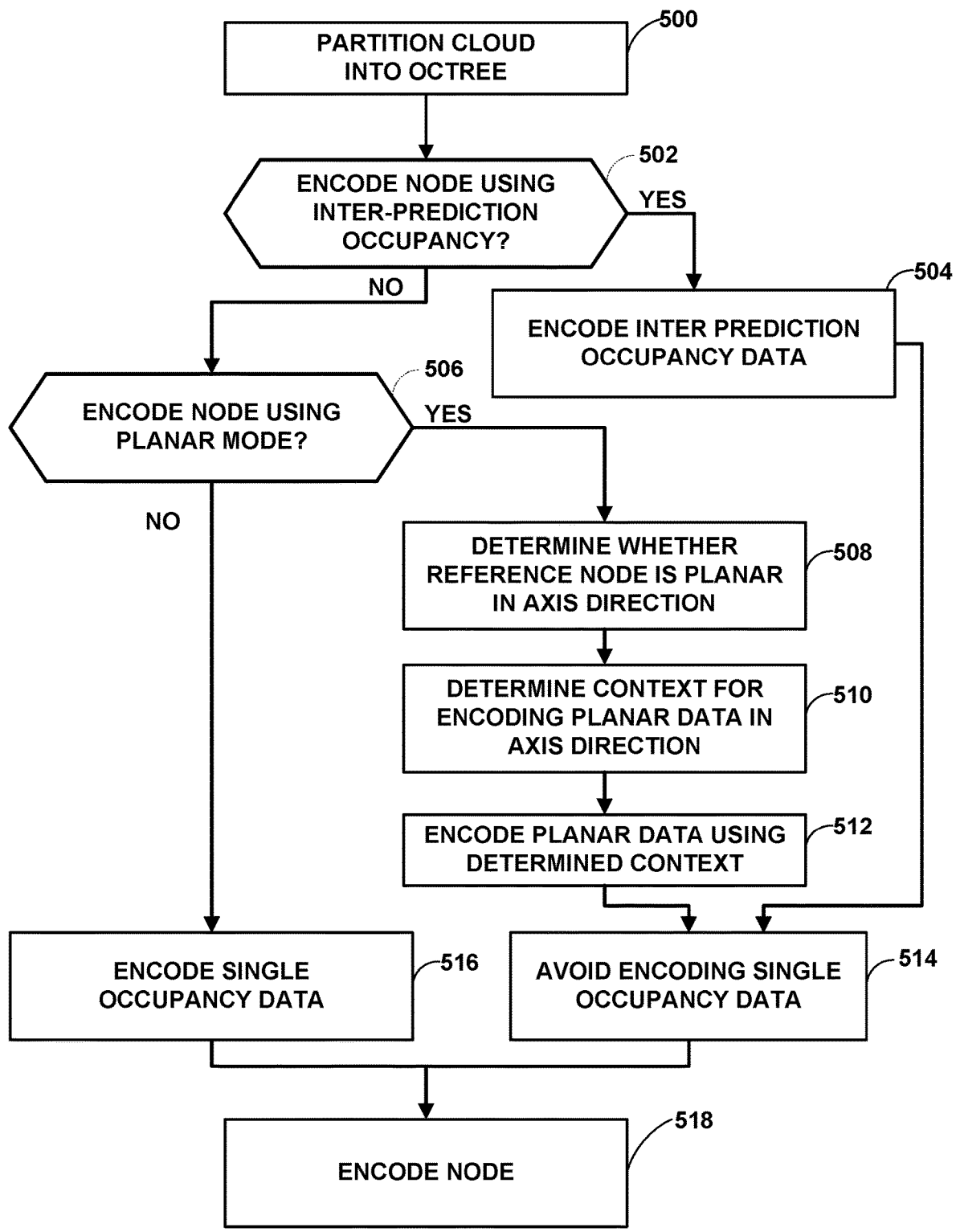
FIG. 9 is a flowchart illustrating an example method of encoding a point cloud according to the techniques of this disclosure.

FIG. 9 is a flowchart illustrating an example method of encoding a point cloud according to the techniques of this disclosure. The method of FIG. 9 is explained with respect to G-PCC encoder 200 of FIGS. 1 and 2. Other G-PCC encoding devices may be configured to perform this or a similar method.

Initially, G-PCC encoder 200 may obtain a point cloud to be encoded. The point cloud may include a set of points, each of which has a geometric position (e.g., expressed in (x, y, z) coordinates) and one or more attributes. G-PCC encoder 200 may partition the point cloud in into an octree (500), having a set of nodes and subnodes, the nodes corresponding to bounding boxes.

G-PCC encoder 200 may then determine whether to encode a current node using inter-prediction occupancy (502). That is, G-PCC encoder 200 may determine whether a collocated node in a prediction frame generated from a global motion vector is occupied by one or more points. If the collocated node in the prediction frame is occupied by one or more points ("YES" branch of 502), G-PCC encoder 200 may encode inter prediction occupancy data (504). For example, G-PCC encoder 200 may determine a context for encoding a value indicating whether the current node is occupied according to the collocated node being occupied, determine whether the current node is occupied, and entropy encode a value indicating whether the current node is occupied using the determined context.

If the current node is not encoded using inter-prediction occupancy ("NO" branch of 502) (or in some examples, even if the current node is encoded using inter-prediction occupancy), G-PCC encoder 200 may determine whether to encode the current node using planar mode (506). For example, for each of an X-, Y-, and Z-axis, G-PCC encoder 200 may determine whether one or more points of the current node exist in only one plane in the direction of the corresponding axis. If the current node is planar in one or more axes, and G-PCC encoder 200 determines to perform planar mode, G-PCC encoder 200 may determine, for each axis, whether a reference node is planar in the axis direction (508), determine a context for encoding the planar mode data for the axis in the axis direction according to the position of the plane in the reference node in the axis direction (510), and then entropy encode the planar data for the axis using the determined context (512). In particular, G-PCC encoder 200 may determine the context for encoding the planar mode data (e.g., is_planar_flag[axisIdx]) according to (3*axisIdx+(RefPlane [axisIdx]+1)), where axisIdx indicates the corresponding axis direction and RefPlane [axisIdx] indicates the position of the plane in the reference node in the axis direction of axisIdx. For non-planar axes, G-PCC encoder 200 may encode occupancy of sub-nodes using, e.g., inter prediction occupancy data as explained above with respect to step 504.

In the case that G-PCC encoder 200 determines not to encode the current node using planar mode ("NO" branch of 506) (and determines not to encode the current node using inter-prediction occupancy), G-PCC encoder 200 may encode single occupancy data for the current node (516). In particular, as explained above, G-PCC encoder 200 may determine to encode the single occupancy data if a number of planar axes for the current node is less than three, or if the current node is not coded according to occupancy of neighboring nodes to the current node and is not coded according to inter prediction occupancy of a collocated node in an inter prediction reference frame, or planar mask data is encoded for the current node, and there is a certain number of non planar axes for the current node greater than zero. That is, G-PCC encoder 200 may determine to encode the single occupancy data if numPlanarAxes <3||(!NeighbourPattern &&(!inter_pred_Occ||(mask_planar[0]|mask_planar[1] |mask_planar[2]))&&!numNonPlanarAxes), as discussed above. The single occupancy data may include data indicating whether the current node is single occupied (that is, has only a single occupied sub-node), and if so, an index indicating which of the sub-nodes is the occupied sub-node.

On the other hand, if G-PCC encoder 200 determines to encode the current node using at least one of inter-prediction occupancy or planar mode ("YES" of at least one of 502 or 506), G-PCC encoder 200 may avoid encoding the single occupancy data (514).

G-PCC encoder 200 may further encode the current node (518), e.g., encoding occupancy of sub-nodes of the current node if the current node is occupied, as well as attribute data for points in the current node if the current node is occupied.

In this manner, the method of FIG. 9 represents an example of a method of coding point cloud data, including determining whether inter prediction data is coded for a current node of an octree of point cloud data; determining whether planar mask data is coded for the current node; and when at least one of the inter prediction data or the planar mask data is coded for the current node, avoiding coding a single occupancy value for the current node, the single occupancy value indicating whether only a single sub-node of the node includes one or more points.

Figure 10:
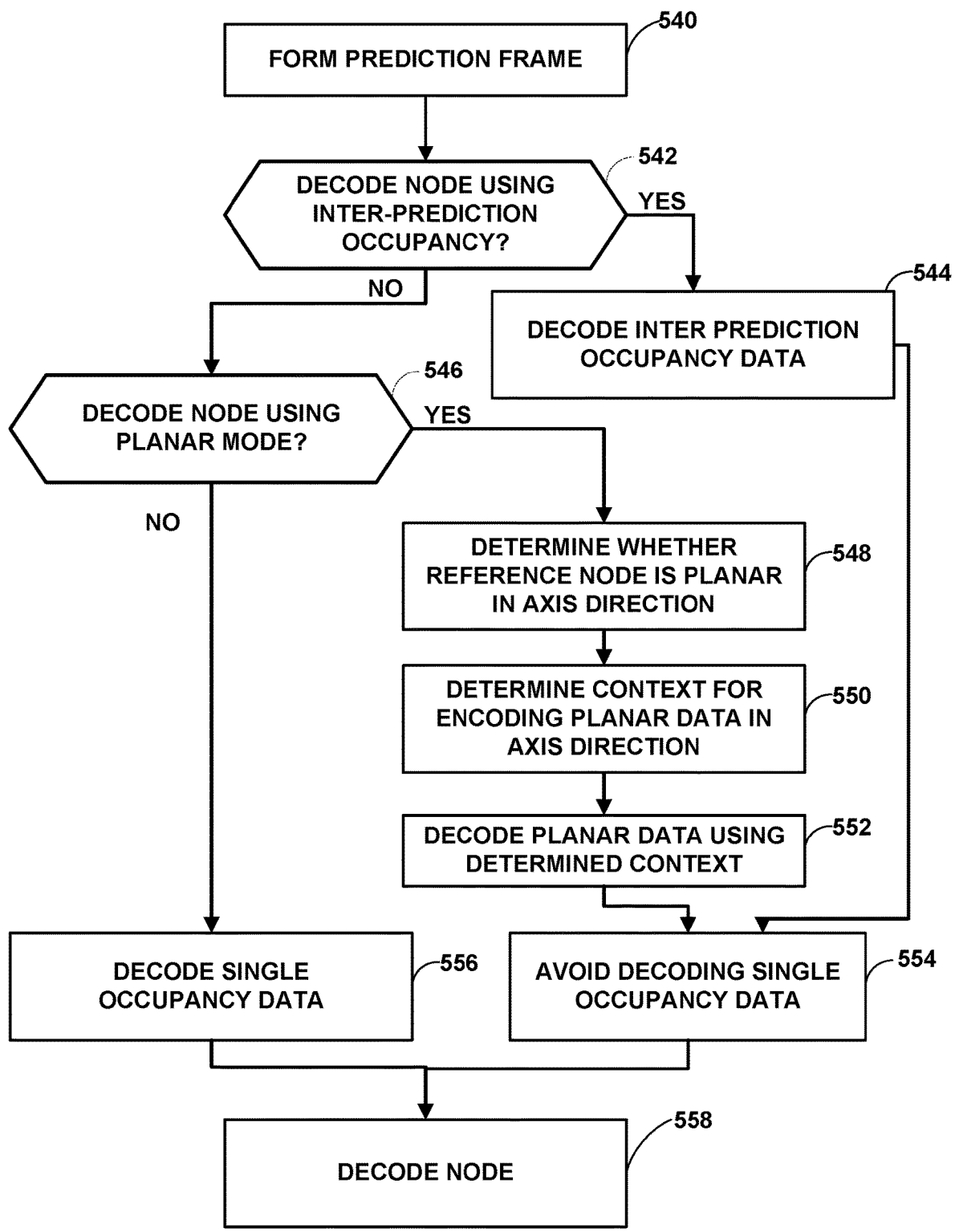
FIG. 10 is a flowchart illustrating an example method of decoding a point cloud according to the techniques of this disclosure.

FIG. 10 is a flowchart illustrating an example method of decoding a point cloud according to the techniques of this disclosure. The method of FIG. 10 is explained as being performed by G-PCC decoder 300 of FIGS. 1 and 4. However, in other examples, other decoding devices may be configured to perform this or a similar method.

Initially, G-PCC decoder 300 may form a prediction frame for a current frame (540). That is, G-PCC decoder 300 may decode a global motion vector for the current frame, and apply the global motion vector to points in a reference frame to form the prediction frame. The prediction frame may be partitioned into nodes and sub-nodes according to an octree.

G-PCC decoder 300 may then determine whether a current node is to be decoded using inter-prediction occupancy (542). That is, G-PCC decoder 300 may determine whether a collocated node in the prediction frame generated from the global motion vector is occupied by one or more points. If the collocated node in the prediction frame is occupied by one or more points ("YES" branch of 542), G-PCC decoder 300 may decode inter prediction occupancy data (544). For example, G-PCC decoder 300 may determine a context for decoding a value indicating whether the current node is occupied according to the collocated node being occupied and entropy decode a value indicating whether the current node is occupied using the determined context.

If the current node is not encoded using inter-prediction occupancy ("NO" branch of 542) (or in some examples, even if the current node is encoded using inter-prediction occupancy), G-PCC decoder 300 may determine whether to decode the current node using planar mode (546). For example, G-PCC decoder 300 may determine whether planar mask data is included in the bitstream for the current node ("YES" branch of 546). If planar mask data is included in the bitstream for the current node, G-PCC decoder 300 may determine, for each axis of the current node, whether a reference node from the reference frame is planar in the axis direction (548), determine a context for decoding the planar mode data for the axis in the axis direction according to whether the reference node is planar in the axis direction (and if so, a location of the plane) (550), and then entropy decode the planar data for the axis using the determined context (552). In particular, G-PCC decoder 300 may determine the context for decoding the planar mode data (e.g., is_planar_flag[axisIdx]) according to (3*axisIdx+(RefPlane [axisIdx]+1)), where axisIdx indicates the corresponding axis direction and RefPlane[axisIdx] indicates the position of the plane in the reference node in the axis direction of axisIdx. For non-planar axes, G-PCC decoder 300 may decode occupancy of sub-nodes using, e.g., inter prediction occupancy data as explained above with respect to step 544).

In the case that G-PCC decoder 300 determines not to decode the current node using planar mode ("NO" branch of 546) (and determines not to decode the current node using inter-prediction occupancy), G-PCC decoder 300 may decode single occupancy data for the current node (556). In particular, as explained above, G-PCC decoder 300 may determine to decode the single occupancy data if a number of planar axes for the current node is less than three, or if the current node is not coded according to occupancy of neighboring nodes to the current node and is not coded according to inter prediction occupancy of a collocated node in an inter prediction reference frame, or planar mask data is encoded for the current node, and there is a certain number of non planar axes for the current node greater than zero. That is, G-PCC decoder 300 may determine to decode the single occupancy data if numPlanarAxes <3||(!NeighbourPattern &&(!inter_pred_Occ||(mask_planar[0]|mask_planar[1] |mask_planar[2]))&&!numNonPlanarAxes), as discussed above. The single occupancy data may include data indicating whether the current node is single occupied (that is, has only a single occupied sub-node), and if so, an index indicating which of the sub-nodes is the occupied sub-node.

On the other hand, if G-PCC decoder 300 determines that the current node is to be decoded using at least one of inter-prediction occupancy or planar mode ("YES" of at least one of 502 or 506), G-PCC decoder 300 may avoid decoding the single occupancy data (554). That is, G-PCC decoder 300 may determine that single occupancy data is not included in the bitstream, and that bits of the bitstream that may otherwise correspond to single occupancy data instead correspond to a different syntax element.

G-PCC decoder 300 may further decode the current node (558), e.g., decoding occupancy of sub-nodes of the current node if the current node is occupied, as well as attribute data for points in the current node if the current node is occupied.

In this manner, the method of FIG. 10 represents an example of a method of coding point cloud data, including determining whether inter prediction data is coded for a current node of an octree of point cloud data; determining whether planar mask data is coded for the current node; and when at least one of the inter prediction data or the planar mask data is coded for the current node, avoiding coding a single occupancy value for the current node, the single occupancy value indicating whether only a single sub-node of the node includes one or more points.

Figure 11:
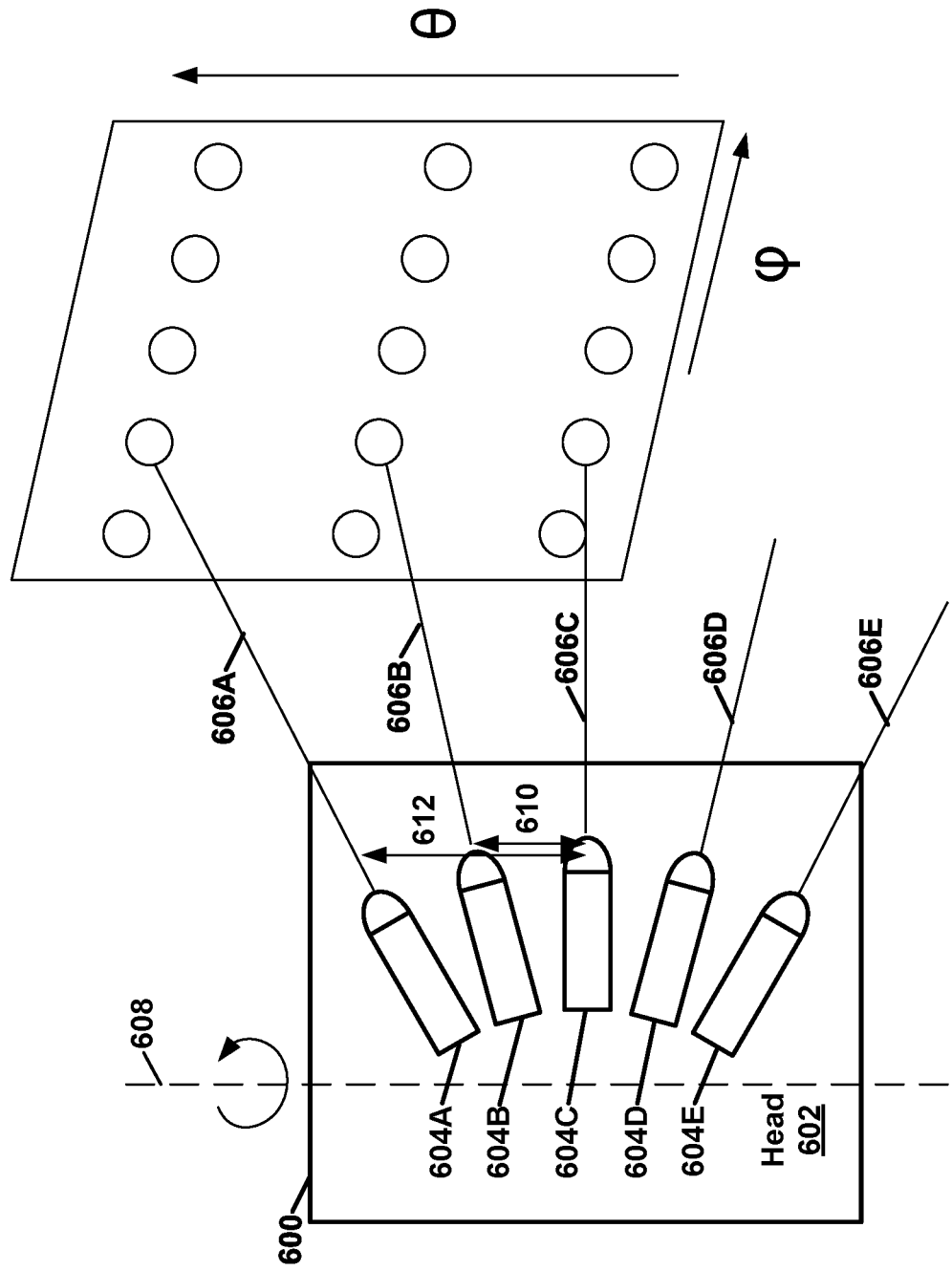
FIG. 11 is a conceptual diagram illustrating a laser package, such as a LIDAR sensor or other system that includes one or more lasers, scanning points in 3-dimensional space.

FIG. 11 is a conceptual diagram illustrating a laser package 600, such as a LIDAR sensor or other system that includes one or more lasers, scanning points in 3-dimensional space. Laser package 600 may correspond to LIDAR 380 of FIG. 7. Data source 104 (FIG. 1) may include laser package 600.

As shown in FIG. 11, point clouds can be captured using laser package 600, i.e., the sensor scans the points in 3D space. It is to be understood, however, that some point clouds are not generated by an actual LIDAR sensor but may be encoded as if they were. In the example of FIG. 11, laser package 600 includes a LIDAR head 602 that includes multiple lasers 604A-604E (collectively, "lasers 604") arrayed in a vertical plane at different angles relative to an origin point. Laser package 600 may rotate around a vertical axis 608. Laser package 600 may use returned laser light to determine the distances and positions of points of the point cloud. Laser beams 606A-606E (collectively, "laser beams 606") emitted by lasers 604 of laser package 600 may be characterized by a set of parameters. Distances denoted by arrows 610, 612 denotes an example laser correction values for laser 604B, 604A, respectively.

Figure 12:
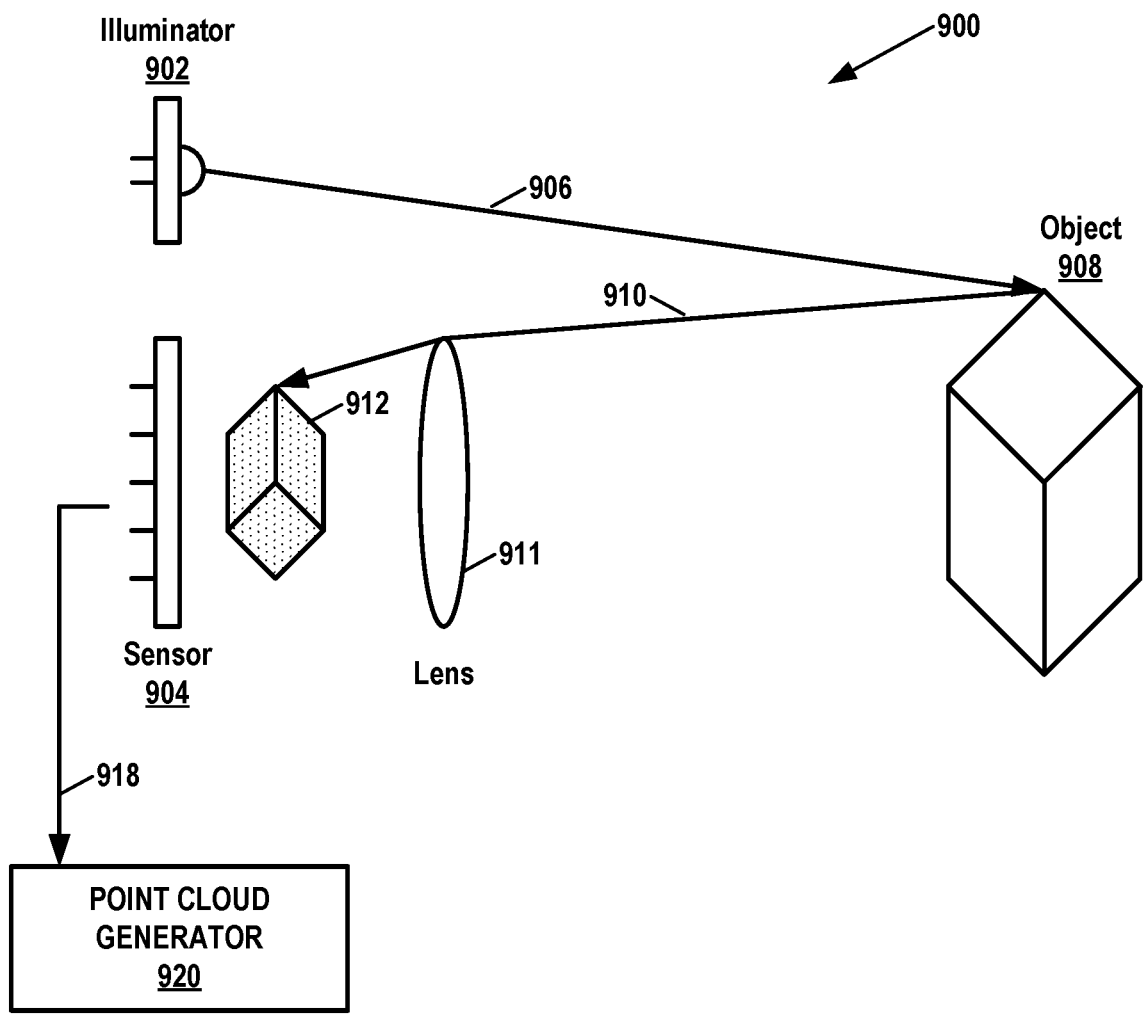
FIG. 12 is a conceptual diagram illustrating an example range-finding system 900 that may be used with one or more techniques of this disclosure.

FIG. 12 is a conceptual diagram illustrating an example range-finding system 900 that may be used with one or more techniques of this disclosure. In the example of FIG. 12, range-finding system 900 includes an illuminator 902 and a sensor 904. Illuminator 902 may emit light 906. In some examples, illuminator 902 may emit light 906 as one or more laser beams. Light 906 may be in one or more wavelengths, such as an infrared wavelength or a visible light wavelength. In other examples, light 906 is not coherent, laser light. When light 906 encounters an object, such as object 908, light 906 creates returning light 910. Returning light 910 may include backscattered and/or reflected light. Returning light 910 may pass through a lens 911 that directs returning light 910 to create an image 912 of object 908 on sensor 904. Sensor 904 generates signals 914 based on image 912. Image 912 may comprise a set of points (e.g., as represented by dots in image 912 of FIG. 12).

In some examples, illuminator 902 and sensor 904 may be mounted on a spinning structure so that illuminator 902 and sensor 904 capture a 360-degree view of an environment. In other examples, range-finding system 900 may include one or more optical components (e.g., mirrors, collimators, diffraction gratings, etc.) that enable illuminator 902 and sensor 904 to detect objects within a specific range (e.g., up to 360-degrees). Although the example of FIG. 12 only shows a single illuminator 902 and sensor 904, range-finding system 900 may include multiple sets of illuminators and sensors.

In some examples, illuminator 902 generates a structured light pattern. In such examples, range-finding system 900 may include multiple sensors 904 upon which respective images of the structured light pattern are formed. Range-finding system 900 may use disparities between the images of the structured light pattern to determine a distance to an object 908 from which the structured light pattern backscatters. Structured light-based range-finding systems may have a high level of accuracy (e.g., accuracy in the sub-millimeter range), when object 908 is relatively close to sensor 904 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 900 is a time of flight (ToF)-based system. In some examples where range-finding system 900 is a ToF-based system, illuminator 902 generates pulses of light. In other words, illuminator 902 may modulate the amplitude of emitted light 906. In such examples, sensor 904 detects returning light 910 from the pulses of light 906 generated by illuminator 902. Range-finding system 900 may then determine a distance to object 908 from which light 906 backscatters based on a delay between when light 906 was emitted and detected and the known speed of light in air). In some examples, rather than (or in addition to) modulating the amplitude of the emitted light 906, illuminator 902 may modulate the phase of the emitted light 1404. In such examples, sensor 904 may detect the phase of returning light 910 from object 908 and determine distances to points on object 908 using the speed of light and based on time differences between when illuminator 902 generated light 906 at a specific phase and when sensor 904 detected returning light 910 at the specific phase.

In other examples, a point cloud may be generated without using illuminator 902. For instance, in some examples, sensor 904 of range-finding system 900 may include two or more optical cameras. In such examples, range-finding system 900 may use the optical cameras to capture stereo images of the environment, including object 908. Range-finding system 900 (e.g., point cloud generator 920) may then calculate the disparities between locations in the stereo images. Range-finding system 900 may then use the disparities to determine distances to the locations shown in the stereo images. From these distances, point cloud generator 920 may generate a point cloud.

Sensors 904 may also detect other attributes of object 908, such as color and reflectance information. In the example of FIG. 12, a point cloud generator 920 may generate a point cloud based on signals 918 generated by sensor 904. Range-finding system 900 and/or point cloud generator 920 may form part of data source 104 (FIG. 1).

Figure 13:
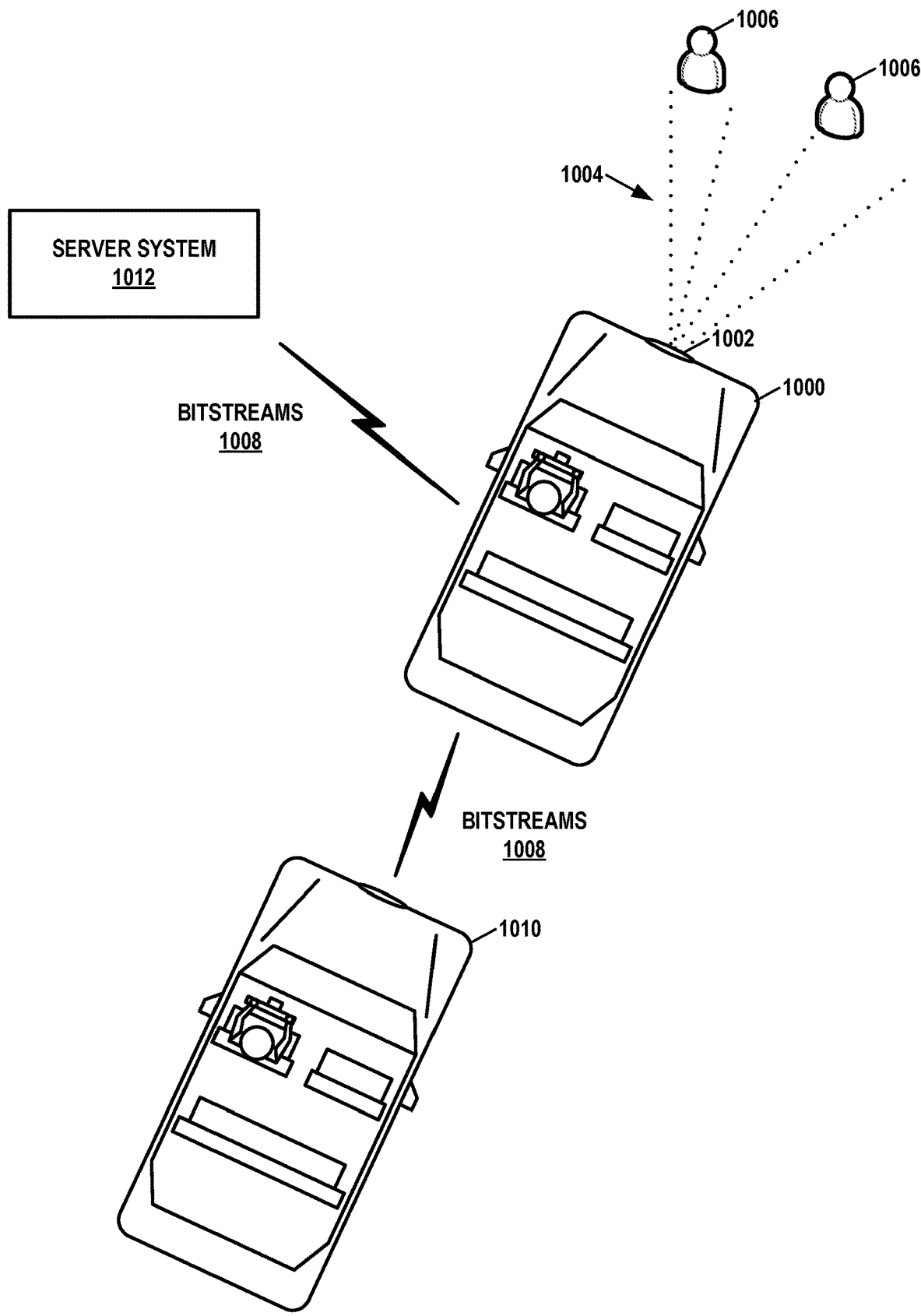
FIG. 13 is a conceptual diagram illustrating an example vehicle-based scenario in which one or more techniques of this disclosure may be used.

FIG. 13 is a conceptual diagram illustrating an example vehicle-based scenario in which one or more techniques of this disclosure may be used. In the example of FIG. 13, a vehicle 1000 includes a laser package 1002, such as a LIDAR system. Laser package 1002 may be implemented in the same manner as laser package 600 (FIG. 11). Although not shown in the example of FIG. 13, vehicle 1000 may also include a data source, such as data source 104 (FIG. 1), and a G-PCC encoder, such as G-PCC encoder 200 (FIG. 1). In the example of FIG. 13, laser package 1002 emits laser beams 1004 that reflect off pedestrians 1006 or other objects in a roadway. The data source of vehicle 1000 may generate a point cloud based on signals generated by laser package 1002. The G-PCC encoder of vehicle 1000 may encode the point cloud to generate bitstreams 1008, such as the geometry bitstream of FIG. 2 and the attribute bitstream of FIG. 2. Bitstreams 1008 may include many fewer bits than the uncoded point cloud obtained by the G-PCC encoder. An output interface of vehicle 1000 (e.g., output interface 108 (FIG. 1) may transmit bitstreams 1008 to one or more other devices. Thus, vehicle 1000 may be able to transmit bitstreams 1008 to other devices more quickly than the encoded point cloud data. Additionally, bitstreams 1008 may require less data storage capacity.

The techniques of this disclosure may further reduce the number of bits in bitstreams 1008. For instance, as discussed above, if a current node is encoded using at least one of inter-prediction occupancy or planar mask data, single occupancy data need not be encoded for the current node. Avoiding encoding the single occupancy data in these cases may reduce the number of bits in the bitstream, because occupancy for the current node may be more efficiently coded using inter-prediction occupancy or planar mask data.

In the example of FIG. 13, vehicle 1000 may transmit bitstreams 1008 to another vehicle 1010. Vehicle 1010 may include a G-PCC decoder, such as G-PCC decoder 300 (FIG. 1). The G-PCC decoder of vehicle 1010 may decode bitstreams 1008 to reconstruct the point cloud. Vehicle 1010 may use the reconstructed point cloud for various purposes.

For instance, vehicle 1010 may determine based on the reconstructed point cloud that pedestrians 1006 are in the roadway ahead of vehicle 1000 and therefore start slowing down, e.g., even before a driver of vehicle 1010 realizes that pedestrians 1006 are in the roadway. Thus, in some examples, vehicle 1010 may perform an autonomous navigation operation, generate a notification or warning, or perform another action based on the reconstructed point cloud.

Additionally or alternatively, vehicle 1000 may transmit bitstreams 1008 to a Server system 1012. Server system 1012 may use bitstreams 1008 for various purposes. For example, server system 1012 may store bitstreams 1008 for subsequent reconstruction of the point clouds. In this example, server system 1012 may use the point clouds along with other data (e.g., vehicle telemetry data generated by vehicle 1000) to train an autonomous driving system. In other example, server system 1012 may store bitstreams 1008 for subsequent reconstruction for forensic crash investigations (e.g., if vehicle 1000 collides with pedestrians 1006).

Figure 14:
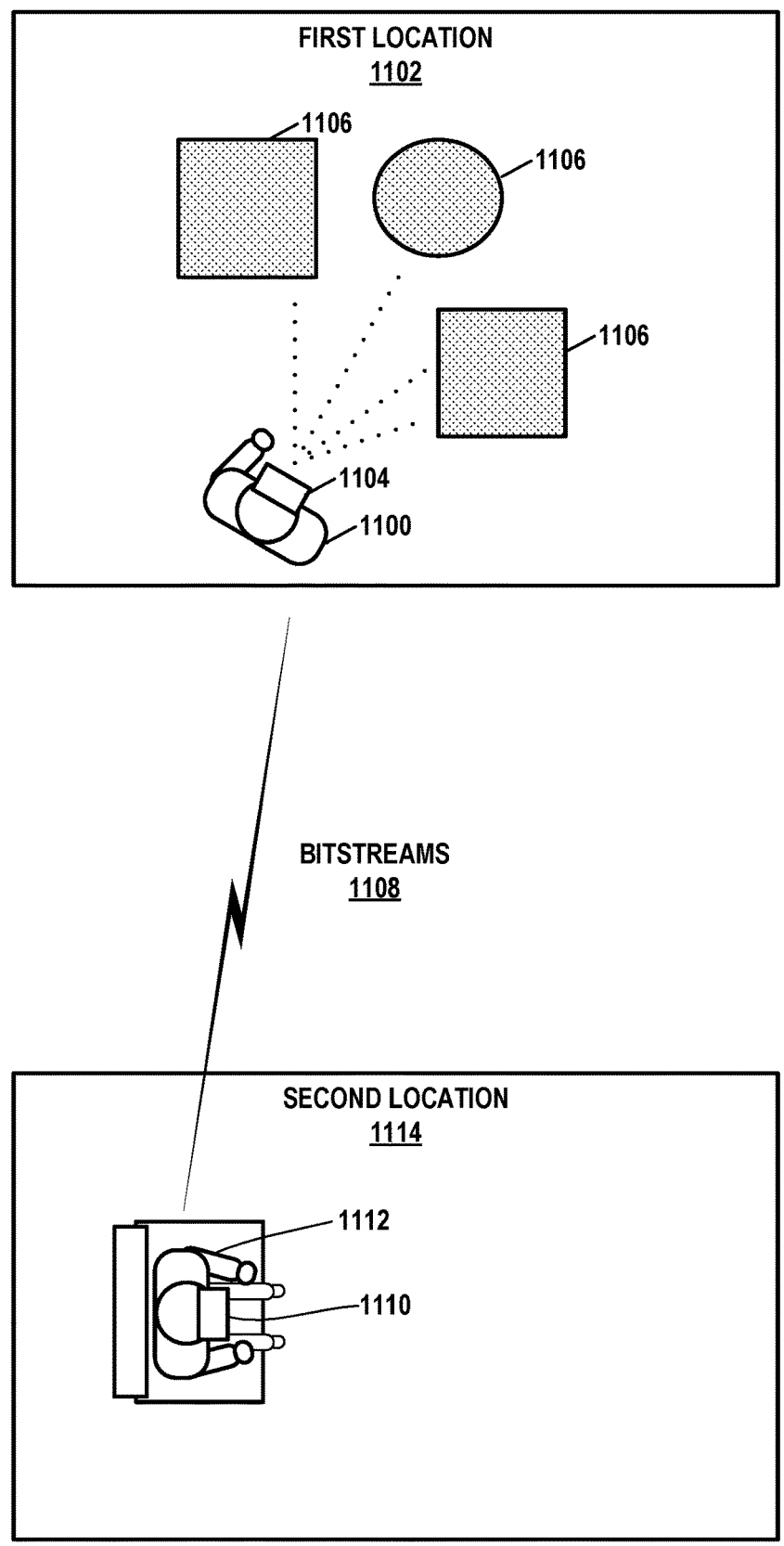
FIG. 14 is a conceptual diagram illustrating an example extended reality system in which one or more techniques of this disclosure may be used.

FIG. 14 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 14, a first user 1100 is located in a first location 1102. User 1100 wears an XR headset 1104. As an alternative to XR headset 1104, user 1100 may use a mobile device (e.g., mobile phone, tablet computer, etc.). XR headset 1104 includes a depth detection sensor, such as a LIDAR system, that detects positions of points on objects 1106 at location 1102. A data source of XR headset 1104 may use the signals generated by the depth detection sensor to generate a point cloud representation of objects 1106 at location 1102. XR headset 1104 may include a G-PCC encoder (e.g., G-PCC encoder 200 of FIG. 1) that is configured to encode the point cloud to generate bitstreams 1108.

The techniques of this disclosure may further reduce the number of bits in bitstreams 1108. For instance, as discussed above, if a current node is encoded using at least one of inter-prediction occupancy or planar mask data, single occupancy data need not be encoded for the current node. Avoiding encoding the single occupancy data in these cases may reduce the number of bits in the bitstream, because occupancy for the current node may be more efficiently coded using inter-prediction occupancy or planar mask data.

XR headset 1104 may transmit bitstreams 1108 (e.g., via a network such as the Internet) to an XR headset 1110 worn by a user 1112 at a second location 1114. XR headset 1110 may decode bitstreams 1108 to reconstruct the point cloud. XR headset 1110 may use the point cloud to generate an XR visualization (e.g., an AR, MR, VR visualization) representing objects 1106 at location 1102. Thus, in some examples, such as when XR headset 1110 generates a VR visualization, user 1112 at location 1114 may have a 3D immersive experience of location 1102. In some examples, XR headset 1110 may determine a position of a virtual object based on the reconstructed point cloud. For instance, XR headset 1110 may determine, based on the reconstructed point cloud, that an environment (e.g., location 1102) includes a flat surface and then determine that a virtual object (e.g., a cartoon character) is to be positioned on the flat surface. XR headset 1110 may generate an XR visualization in which the virtual object is at the determined position. For instance, XR headset 1110 may show the cartoon character sitting on the flat surface.

Figure 15:
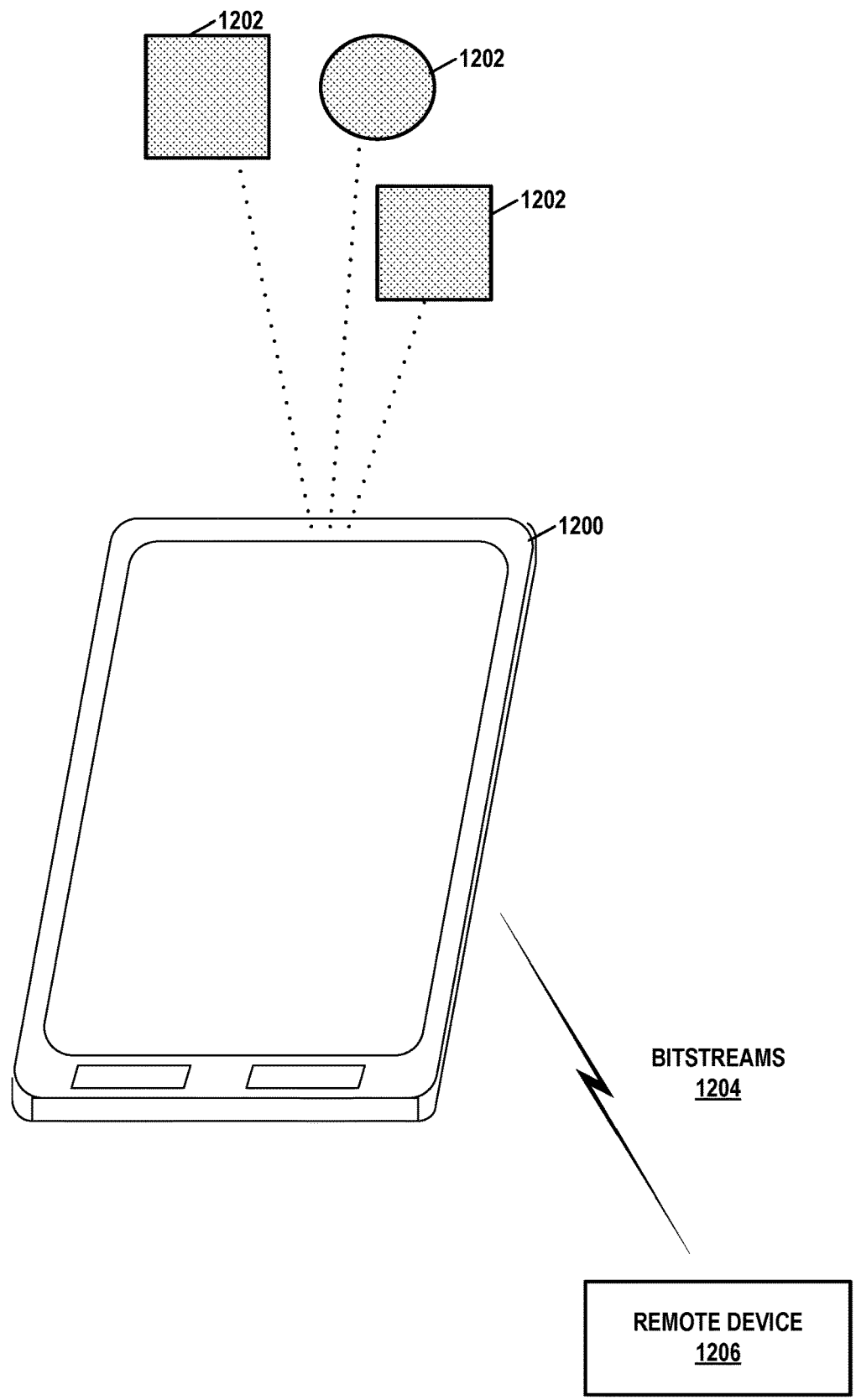
FIG. 15 is a conceptual diagram illustrating an example mobile device system in which one or more techniques of this disclosure may be used.

FIG. 15 is a conceptual diagram illustrating an example mobile device system in which one or more techniques of this disclosure may be used. In the example of FIG. 15, a mobile device 1200, such as a mobile phone or tablet computer, includes a depth detection sensor, such as a LIDAR system, that detects positions of points on objects 1202 in an environment of mobile device 1200. A data source of mobile device 1200 may use the signals generated by the depth detection sensor to generate a point cloud representation of objects 1202. Mobile device 1200 may include a G-PCC encoder (e.g., G-PCC encoder 200 of FIG. 1) that is configured to encode the point cloud to generate bitstreams 1204. In the example of FIG. 15, mobile device 1200 may transmit bitstreams to a remote device 1206, such as a server system or other mobile device. Remote device 1206 may decode bitstreams 1204 to reconstruct the point cloud. Remote device 1206 may use the point cloud for various purposes. For example, remote device 1206 may use the point cloud to generate a map of environment of mobile device 1200. For instance, remote device 1206 may generate a map of an interior of a building based on the reconstructed point cloud. In another example, remote device 1206 may generate imagery (e.g., computer graphics) based on the point cloud. For instance, remote device 1206 may use points of the point cloud as vertices of polygons and use color attributes of the points as the basis for shading the polygons. In some examples, remote device 1206 may perform facial recognition using the point cloud.

The following clauses represent various examples of techniques described in this disclosure:

Clause 1: A method of coding a point cloud, the method comprising determining an occupancy of an inter-prediction block, selecting a context for coding of a current node occupancy of the point cloud based on the determination, and coding the current node based on the selected context.

Clause 2: The method of clause 1, wherein the current node is in an octree geometry of the point cloud.

Clause 3: The method of any of clause 1 and 2, wherein the current node occupancy is at least partially coded using planar mode.

Clause 4: The method of any of clauses 1-3, wherein selecting the context comprises selecting the context without determining the condition of planar mask of the current node.

Clause 5: The method of any of clauses 1-4, wherein selecting the context comprises utilizing a single unified selection technique that is same when a node has at least one planar direction and when the node has no planar direction.

Clause 6: A method of coding a point cloud, the method comprising determining whether there is a current node has planar masks, and at least one of signaling or parsing occupancy based on whether the current node has planar masks.

Clause 7: The method of clause 6, wherein at least one of signaling or parsing occupancy comprises at least one of signaling or parsing occupancy based on the current node having planar masks.

Clause 8: The method of clause 6, wherein at least one signaling or parsing occupancy comprises avoiding signaling or parsing occupancy based on the current node not having planar masks, the method further comprising at least one of signaling or parsing a single occupancy flag and a position of a single node.

Clause 9: A method comprising any combination of clauses 1-8.

Clause 10: The method of any of clauses 1-9, further comprising generating the point cloud.

Clause 11: A device for processing a point cloud, the device comprising one or more means for performing the method of any of clauses 1-10.

Clause 12: The device of clause 11, wherein the one or more means comprise one or more processors implemented in circuitry.

Clause 13: The device of any of clauses 11 or 12, further comprising a memory to store the data representing the point cloud.

Clause 14: The device of any of clauses 11-13, wherein the device comprises a decoder.

Clause 15: The device of any of clauses 11-14, wherein the device comprises an encoder.

Clause 16: The device of any of clauses 11-15, further comprising a device to generate the point cloud.

Clause 17: The device of any of clauses 11-16, further comprising a display to present imagery based on the point cloud.

Clause 18: A computer-readable storage medium having stored thereon instructions that, when executed, cause one or more processors to perform the method of any of clause 1-10.

Clause 19: A method of coding a point cloud, the method comprising determining an occupancy of an inter-prediction block, selecting a context for coding of a current node occupancy of the point cloud based on the determination, and coding the current node based on the selected context.

Clause 20: The method of clause 19, wherein the current node is in an octree geometry of the point cloud.

Clause 21: The method of clause 19, wherein the current node occupancy is at least partially coded using planar mode.

Clause 22: The method of clause 19, wherein selecting the context comprises selecting the context without determining the condition of planar mask of the current node.

Clause 23: The method of clause 19, wherein selecting the context comprises utilizing a single unified selection technique that is same when a node has at least one planar direction and when the node has no planar direction.

Clause 24: A method of coding a point cloud, the method comprising determining whether a current node has planar masks, and at least one of signaling or parsing occupancy based on whether the current node has planar masks.

Clause 25: The method of clause 24, wherein at least one of signaling or parsing occupancy comprises at least one of signaling or parsing occupancy based on the current node having planar masks.

Clause 26: The method of clause 24, wherein at least one signaling or parsing occupancy comprises avoiding signaling or parsing occupancy based on the current node not having planar masks, the method further comprising at least one of signaling or parsing a single occupancy flag and a position of a single node.

Clause 27: A device for processing a point cloud, the device comprising circuitry and memory for performing the method of any of clauses 19-26.

Clause 28: A device for coding point cloud data, the device comprising: a memory configured to store point cloud data; and one or more processors implemented in circuitry and configured to: determine whether inter prediction data is coded for a current node of an octree of the point cloud data; determine whether planar mask data is coded for the current node; when at least one of the inter prediction data or the planar mask data is coded for the current node, avoid coding a single occupancy value for the current node, the single occupancy value indicating whether only a single sub-node of the current node includes one or more points; and code the current node.

Clause 29: The device of clause 28, wherein when the inter prediction is coded for the current node, the one or more processors are configured to code the current node using the inter prediction data.

Clause 30: The device of clause 28, wherein when the planar mask data is coded for the current node, the one or more processors are configured to code the current node using the planar mask data.

Clause 31: The device of clause 28, wherein when the inter prediction data and the planar mask data are not coded for the current node, the one or more processors are configured to: code the single occupancy value for the current node; and code the current node using the single occupancy value.

Clause 32: The device of clause 28, wherein the one or more processors are configured to determine whether to code the single occupancy value according to numPlanarAxes <3||(!NeighbourPattern &&(!inter_pred_Occ|| (mask_planar[0]||mask_planar[1]||mask_planar[2])) &&!numNonPlanarAxes, wherein numPlanarAxes indicates a number of planar axes for the current node, "||" represents a bitwise or operator, "!" represents a not operator, NeighbourPattern represents whether occupancy of neighboring nodes to the current node can be used to code occupancy of the current node, "&&" represents a bitwise and operator, inter_pred_Occ indicates whether a collocated node in an inter prediction reference frame for the current node is occupied by at least one point, mask_planar represents the planar mask data for the current node, and numNonPlanarAxes represents a number of non-planar axes for the current node.

Clause 33: The device of clause 28, wherein when the planar mask data is coded for the current node, the one or more processors are configured to determine a context for entropy coding the planar mask data according to planar mask data for a collocated node in a reference frame.

Clause 34: The device of clause 33, wherein the planar mask data includes an indication of a location of a plane in a direction, and wherein the one or more processors are configured to calculate a context index for coding the indication according to (3*axisIdx+(RefPlane[axisIdx]+1)), wherein axisIdx indicates the direction of the plane, and RefPlane[axisIdx] indicates a location of a corresponding plane for the collocated node in the direction.

Clause 35: The method of clause 28, wherein the one or more processors are configured to decode the current node.

Clause 36: The method of clause 28, wherein the one or more processors are configured to encode the current node.

Clause 37: A method of coding point cloud data, the method comprising: determining whether inter prediction data is coded for a current node of an octree of point cloud data; determining whether planar mask data is coded for the current node; and when at least one of the inter prediction data or the planar mask data is coded for the current node, avoiding coding a single occupancy value for the current node, the single occupancy value indicating whether only a single sub-node of the node includes one or more points.

Clause 38: The method of clause 37, wherein when the inter prediction is coded for the current node, the method includes coding the current node using the inter prediction data.

Clause 39: The method of clause 37, wherein when the inter prediction is coded for the current node, the method includes coding the current node using the planar mask data.

Clause 40: The method of clause 37, wherein when the inter prediction data and the planar mask data are not coded for the current node, the method includes: coding the single occupancy value for the current node; and coding the current node using the single occupancy value.

Clause 41: The method of clause 37, further comprising determining whether to code the single occupancy value according to numPlanarAxes <3||(!NeighbourPattern &&(!inter_pred_Occ||(mask_planar[0]|mask_planar[1] |mask_planar[2]))&& !numNonPlanarAxes, wherein numPlanarAxes indicates a number of planar axes for the current node, "||" represents a bitwise or operator, "!" represents a not operator, NeighbourPattern represents whether occupancy of neighboring nodes to the current node can be used to code occupancy of the current node, "&&" represents a bitwise and operator, inter_pred_Occ indicates whether a collocated node in an inter prediction reference frame for the current node is occupied by at least one point, mask_planar represents the planar mask data for the current node, and numNonPlanarAxes represents a number of non-planar axes for the current node.

Clause 42: The method of clause 37, wherein when the planar mask data is coded for the current node, the method includes determining a context for entropy coding the planar mask data according to planar mask data for a collocated node in a reference frame.

Clause 43: The method of clause 42, wherein the planar mask data includes an indication of a location of a plane in a direction, the method further comprising calculating a context index for coding the indication according to (3*axisIdx+(RefPlane[axisIdx]+1)), wherein axisIdx indicates the direction of the plane, and RefPlane[axisIdx] indicates a location of a corresponding plane for the collocated node in the direction.

Clause 44: The method of clause 37, wherein coding the current node comprises decoding the current node.

Clause 45: The method of clause 37, wherein coding the current node comprises encoding the current node.

Clause 46: A computer-readable storage medium having stored thereon instructions that, when executed, cause a processor to: determining whether inter prediction data is coded for a current node of an octree of point cloud data; determining whether planar mask data is coded for the current node; and when at least one of the inter prediction data or the planar mask data is coded for the current node, avoiding coding a single occupancy value for the current node, the single occupancy value indicating whether only a single sub-node of the node includes one or more points.

Clause 47: The computer-readable storage medium of clause 46, further comprising instructions that cause the processor to, when the inter prediction is coded for the current node, code the current node using the inter prediction data.

Clause 48: The computer-readable storage medium of clause 46, further comprising instructions that cause the processor to, when the inter prediction is coded for the current node, code the current node using the planar mask data.

Clause 49: The computer-readable storage medium of clause 46, further comprising instructions that cause the processor to, when the inter prediction data and the planar mask data are not coded for the current node: code the single occupancy value for the current node; and code the current node using the single occupancy value.

Clause 50: The computer-readable storage medium of clause 46, further comprising instructions that cause the processor to determine whether to code the single occupancy value according to numPlanarAxes <3||(!NeighbourPattern && (!inter_pred_Occ||(mask_planar[0]|mask_planar[1] |mask_planar[2]))&& !numNonPlanarAxes, wherein numPlanarAxes indicates a number of planar axes for the current node, "||" represents a bitwise or operator, "!" represents a not operator, NeighbourPattern represents whether occupancy of neighboring nodes to the current node can be used to code occupancy of the current node, "&&" represents a bitwise and operator, inter_pred_Occ indicates whether a collocated node in an inter prediction reference frame for the current node is occupied by at least one point, mask_planar represents the planar mask data for the current node, and numNonPlanarAxes represents a number of non-planar axes for the current node.

Clause 51: The computer-readable storage medium of clause 46, further comprising instructions that cause the processor to, when the planar mask data is coded for the current node, determine a context for entropy coding the planar mask data according to planar mask data for a collocated node in a reference frame.

Clause 52: The computer-readable storage medium of clause 51, wherein the planar mask data includes an indication of a location of a plane in a direction, further comprising instructions that cause the processor to calculate a context index for coding the indication according to (3*axisIdx+(RefPlane[axisIdx]+1)), wherein axisIdx indicates the direction of the plane, and RefPlane[axisIdx] indicates a location of a corresponding plane for the collocated node in the direction.

Clause 53: A device for coding point cloud data, the device comprising: means for determining whether inter prediction data is coded for a current node of an octree of point cloud data; means for determining whether planar mask data is coded for the current node; and means for avoiding coding a single occupancy value for the current node, the single occupancy value indicating whether only a single sub-node of the node includes one or more points when at least one of the inter prediction data or the planar mask data is coded for the current node.

Clause 54: The device of clause 53, further comprising: means for coding the single occupancy value for the current node when the inter prediction data and the planar mask data are not coded for the current node; and means for coding the current node using the single occupancy value when the inter prediction data and the planar mask data are not coded for the current node.

Clause 55: The device of clause 53, further comprising means for determining whether to code the single occupancy value according to numPlanarAxes <3||(!NeighbourPattern &&(!inter_pred_Occ||(mask_planar[0]|mask_planar[1] |mask_planar[2]))&&!numNonPlanarAxes, wherein numPlanarAxes indicates a number of planar axes for the current node, "||" represents a bitwise or operator, "!" represents a not operator, NeighbourPattern represents whether occupancy of neighboring nodes to the current node can be used to code occupancy of the current node, "&&" represents a bitwise and operator, inter_pred_Occ indicates whether a collocated node in an inter prediction reference frame for the current node is occupied by at least one point, mask_planar represents the planar mask data for the current node, and numNonPlanarAxes represents a number of non-planar axes for the current node.

Clause 56: The device of clause 53, further comprising means for determining a context for entropy coding the planar mask data according to planar mask data for a collocated node in a reference frame when the planar mask data is coded for the current node.

Clause 57: The device of clause 56, wherein the planar mask data includes an indication of a location of a plane in a direction, further comprising means for calculating a context index for coding the indication according to (3*axisIdx+(RefPlane[axisIdx]+1)), wherein axisIdx indicates the direction of the plane, and RefPlane[axisIdx] indicates a location of a corresponding plane for the collocated node in the direction.

Clause 58: A device for coding point cloud data, the device comprising: a memory configured to store point cloud data; and one or more processors implemented in circuitry and configured to: determine whether inter prediction data is coded for a current node of an octree of the point cloud data; determine whether planar mask data is coded for the current node; when at least one of the inter prediction data or the planar mask data is coded for the current node, avoid coding a single occupancy value for the current node, the single occupancy value indicating whether only a single sub-node of the current node includes one or more points; and code the current node.

Clause 59: The device of clause 58, wherein when the inter prediction is coded for the current node, the one or more processors are configured to code the current node using the inter prediction data.

Clause 60: The device of any of clauses 58 and 59, wherein when the planar mask data is coded for the current node, the one or more processors are configured to code the current node using the planar mask data.

Clause 61: The device of any of clauses 58-60, wherein when the planar mask data is coded for the current node, the one or more processors are configured to determine a context for entropy coding the planar mask data according to planar mask data for a collocated node in a reference frame.

Clause 62: The device of clause 61, wherein the planar mask data includes an indication of a location of a plane in a direction, and wherein the one or more processors are configured to calculate a context index for coding the indication according to (3*axisIdx+(RefPlane[axisIdx]+1)), wherein axisIdx indicates the direction of the plane, and RefPlane[axisIdx] indicates a location of a corresponding plane for the collocated node in the direction.

Clause 63: The device of clause 58, wherein when the inter prediction data and the planar mask data are not coded for the current node, the one or more processors are configured to: code the single occupancy value for the current node; and code the current node using the single occupancy value.

Clause 64: The device of any of clauses 58-63, wherein the one or more processors are configured to determine whether to code the single occupancy value according to numPlanarAxes <3||(!NeighbourPattern &&(!inter_pred_Occ||(mask_planar[0]|mask_planar[1]|mask_planar[2])) &&!numNonPlanarAxes, wherein numPlanarAxes indicates a number of planar axes for the current node, "||" represents a bitwise or operator, "!" represents a not operator, NeighbourPattern represents whether occupancy of neighboring nodes to the current node can be used to code occupancy of the current node, "&&" represents a bitwise and operator, inter_pred_Occ indicates whether a collocated node in an inter prediction reference frame for the current node is occupied by at least one point, mask_planar represents the planar mask data for the current node, and numNonPlanarAxes represents a number of non-planar axes for the current node.

Clause 65: The device of any of clauses 58-64, wherein the one or more processors are configured to decode the current node.

Clause 66: The device of any of clauses 58-65, wherein the one or more processors are configured to encode the current node.

Clause 67: A method of coding point cloud data, the method comprising: determining whether inter prediction data is coded for a current node of an octree of point cloud data; determining whether planar mask data is coded for the current node; and when at least one of the inter prediction data or the planar mask data is coded for the current node, avoiding coding a single occupancy value for the current node, the single occupancy value indicating whether only a single sub-node of the node includes one or more points.

Clause 68: The method of clause 67, wherein when the inter prediction is coded for the current node, the method includes coding the current node using the inter prediction data.

Clause 69: The method of any of clauses 67 and 68, wherein when the inter prediction is coded for the current node, the method includes coding the current node using the planar mask data.

Clause 70: The method of any of clauses 67-69, wherein when the planar mask data is coded for the current node, the method includes determining a context for entropy coding the planar mask data according to planar mask data for a collocated node in a reference frame.

Clause 71: The method of clause 70, wherein the planar mask data includes an indication of a location of a plane in a direction, the method further comprising calculating a context index for coding the indication according to (3*axisIdx+(RefPlane[axisIdx]+1)), wherein axisIdx indicates the direction of the plane, and RefPlane[axisIdx] indicates a location of a corresponding plane for the collocated node in the direction.

Clause 72: The method of clause 67, wherein when the inter prediction data and the planar mask data are not coded for the current node, the method includes: coding the single occupancy value for the current node; and coding the current node using the single occupancy value.

Clause 73: The method of any of clauses 67-72, further comprising determining whether to code the single occupancy value according to numPlanarAxes <3||(!NeighbourPattern &&(!inter_pred_Occ||(mask_planar[0]|mask_planar[1]|mask_planar[2]))&&!numNonPlanarAxes, wherein numPlanarAxes indicates a number of planar axes for the current node, "||" represents a bitwise or operator, "!" represents a not operator, NeighbourPattern represents whether occupancy of neighboring nodes to the current node can be used to code occupancy of the current node, "&&" represents a bitwise and operator, inter_pred_Occ indicates whether a collocated node in an inter prediction reference frame for the current node is occupied by at least one point, mask_planar represents the planar mask data for the current node, and numNonPlanarAxes represents a number of non-planar axes for the current node.

Clause 74: The method of any of clauses 67-73, wherein coding the current node comprises decoding the current node.

Clause 75: The method of any of clauses 67-74, wherein coding the current node comprises encoding the current node.

Clause 76: A computer-readable storage medium having stored thereon instructions that, when executed, cause a processor to: determining whether inter prediction data is coded for a current node of an octree of point cloud data;

determining whether planar mask data is coded for the current node; and when at least one of the inter prediction data or the planar mask data is coded for the current node, avoiding coding a single occupancy value for the current node, the single occupancy value indicating whether only a single sub-node of the node includes one or more points.

Clause 77: The computer-readable storage medium of clause 76, further comprising instructions that cause the processor to, when the inter prediction is coded for the current node, code the current node using the inter prediction data.

Clause 78: The computer-readable storage medium of any of clauses 76 and 77, further comprising instructions that cause the processor to, when the inter prediction is coded for the current node, code the current node using the planar mask data.

Clause 79: The computer-readable storage medium of any of clauses 76-78, further comprising instructions that cause the processor to, when the planar mask data is coded for the current node, determine a context for entropy coding the planar mask data according to planar mask data for a collocated node in a reference frame.

Clause 80: The computer-readable storage medium of clause 79, wherein the planar mask data includes an indication of a location of a plane in a direction, further comprising instructions that cause the processor to calculate a context index for coding the indication according to (3*axisIdx+(RefPlane[axisIdx]+1)), wherein axisIdx indicates the direction of the plane, and RefPlane[axisIdx] indicates a location of a corresponding plane for the collocated node in the direction.

Clause 81: The computer-readable storage medium of clause 76, further comprising instructions that cause the processor to, when the inter prediction data and the planar mask data are not coded for the current node: code the single occupancy value for the current node; and code the current node using the single occupancy value.

Clause 82: The computer-readable storage medium of any of clauses 76-81, further comprising instructions that cause the processor to determine whether to code the single occupancy value according to numPlanarAxes <3||(!NeighbourPattern && (!inter_pred_Occ||(mask_planar[0]| mask_planar[1]|mask_planar[2]))&& !numNonPlanarAxes, wherein numPlanarAxes indicates a number of planar axes for the current node, "||" represents a bitwise or operator, "!" represents a not operator, NeighbourPattern represents whether occupancy of neighboring nodes to the current node can be used to code occupancy of the current node, "&&" represents a bitwise and operator, inter_pred_Occ indicates whether a collocated node in an inter prediction reference frame for the current node is occupied by at least one point, mask_planar represents the planar mask data for the current node, and numNonPlanarAxes represents a number of non-planar axes for the current node.

Clause 83: A device for coding point cloud data, the device comprising: means for determining whether inter prediction data is coded for a current node of an octree of point cloud data; means for determining whether planar mask data is coded for the current node; and means for avoiding coding a single occupancy value for the current node, the single occupancy value indicating whether only a single sub-node of the node includes one or more points when at least one of the inter prediction data or the planar mask data is coded for the current node.

Clause 84: The device of clause 83, further comprising: means for coding the single occupancy value for the current node when the inter prediction data and the planar mask data are not coded for the current node; and means for coding the current node using the single occupancy value when the inter prediction data and the planar mask data are not coded for the current node.

Clause 85: The device of any of clauses 83 and 84, further comprising means for determining whether to code the single occupancy value according to numPlanarAxes <3|| (!NeighbourPattern &&(!inter_pred_Occ||(mask_planar[0] |mask_planar[1]|mask_planar[2]))&&!numNonPlanarAxes, wherein numPlanarAxes indicates a number of planar axes for the current node, "||" represents a bitwise or operator, "!" represents a not operator, NeighbourPattern represents whether occupancy of neighboring nodes to the current node can be used to code occupancy of the current node, "&&" represents a bitwise and operator, inter_pred_Occ indicates whether a collocated node in an inter prediction reference frame for the current node is occupied by at least one point, mask_planar represents the planar mask data for the current node, and numNonPlanarAxes represents a number of non-planar axes for the current node.

Clause 86: The device of any of clauses 83-85, further comprising means for determining a context for entropy coding the planar mask data according to planar mask data for a collocated node in a reference frame when the planar mask data is coded for the current node.

Clause 87: The device of any of clauses 83-86, wherein the planar mask data includes an indication of a location of a plane in a direction, further comprising means for calculating a context index for coding the indication according to (3*axisIdx+(RefPlane[axisIdx]+1)), wherein axisIdx indicates the direction of the plane, and RefPlane[axisIdx] indicates a location of a corresponding plane for the collocated node in the direction.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for coding point cloud data, the device comprising:
   a memory configured to store point cloud data; and
   a processing system comprising one or more processors implemented in circuitry, the processing system being configured to:
      determine that inter prediction data is coded for point data of a current node of an octree of the point cloud data;
      in response to the inter prediction data being coded for the point data of the current node, avoid coding a single occupancy value for the point data of the current node, the single occupancy value indicating whether only a single sub-node of the current node includes one or more points; and
      code the point data of the current node using the inter prediction data.

2. The device of claim 1, wherein the current node comprises a first node, the single occupancy value comprises a first single occupancy value, and wherein the processing system is further configured to:
   determine that planar mask data is coded for a second node of the octree of the point cloud data;
   in response to the planar mask data being coded for the second node:
      avoid coding a second single occupancy value for the second node; and
      code the second node using the planar mask data.

3. The device of claim 2, wherein when the inter prediction data and the planar mask data are not coded for a third node of the octree of the point cloud data, the processing system is configured to:
   code the single occupancy value for the third node; and
   code the third node using the single occupancy value.

4. The device of claim 1, wherein the processing system is configured to determine whether to code the single occupancy value according to numPlanarAxes <3||(!NeighbourPattern &&(!inter_pred_Occ||(mask_planar[0]| mask_planar[1]|mask_planar[2]))&&!numNonPlanarAxes, wherein numPlanarAxes indicates a number of planar axes for the current node, "||" represents a bitwise or operator, "!" represents a not operator, NeighbourPattern represents whether occupancy of neighboring nodes to the current node can be used to code occupancy of the current node, "&&" represents a bitwise and operator, inter_pred_Occ indicates whether a collocated node in an inter prediction reference frame for the current node is occupied by at least one point, mask_planar represents planar mask data for the current node, and numNonPlanarAxes represents a number of non-planar axes for the current node.

5. The device of claim 2, wherein the processing system is configured to determine a context for entropy coding the planar mask data according to planar mask data for a collocated node to the second node in a reference frame.

6. The device of claim 5, wherein the planar mask data includes an indication of a location of a plane in a direction, and wherein the processing system is configured to calculate a context index for coding the indication according to (3*axisIdx+(RefPlane[axisIdx]+1)), wherein axisIdx indicates the direction of the plane, and RefPlane[axisIdx] indicates a location of a corresponding plane for the collocated node in the direction.

7. The device of claim 1, wherein the processing system is configured to decode the current node.

8. The device of claim 1, wherein the processing system is configured to encode the current node.

9. A method of coding point cloud data, the method comprising:
   determining that inter prediction data is coded for point data of a current node of an octree of point cloud data;
   in response to the inter prediction data being coded for the point data of the current node, avoiding coding a single occupancy value for the point data of the current node, the single occupancy value indicating whether only a single sub-node of the current node includes one or more points; and
   coding the point data of the current node using the inter prediction data.

10. The method of claim 9, wherein the current node comprises a first node and the single occupancy value comprises a first single occupancy value, the method further comprising:
   determining that planar mask data is coded for a second node of the octree of the point cloud data;

in response to the planar mask data being coded for the second node:
avoiding coding a second single occupancy value for the second node; and
coding the second node using the planar mask data.

11. The method of claim 10, wherein when the inter prediction data and the planar mask data are not coded for a third node of the octree of the point cloud data, the method includes:
coding the single occupancy value for the third node; and
coding the third node using the single occupancy value.

12. The method of claim 9, further comprising determining whether to code the single occupancy value according to numPlanarAxes <3||(!NeighbourPattern &&(!inter_pred_Occ||(mask_planar[0]|mask_planar[1]|mask_planar[2]))&&!numNonPlanarAxes, wherein numPlanarAxes indicates a number of planar axes for the current node, "||" represents a bitwise or operator, "!" represents a not operator, NeighbourPattern represents whether occupancy of neighboring nodes to the current node can be used to code occupancy of the current node, "&&" represents a bitwise and operator, inter_pred_Occ indicates whether a collocated node in an inter prediction reference frame for the current node is occupied by at least one point, mask_planar represents planar mask data for the current node, and numNonPlanarAxes represents a number of non-planar axes for the current node.

13. The method of claim 11, further comprising determining a context for entropy coding the planar mask data according to planar mask data for a collocated node to the second node in a reference frame.

14. The method of claim 13, wherein the planar mask data includes an indication of a location of a plane in a direction, the method further comprising calculating a context index for coding the indication according to (3*axisIdx+(RefPlane[axisIdx]+1)), wherein axisIdx indicates the direction of the plane, and RefPlane[axisIdx] indicates a location of a corresponding plane for the collocated node in the direction.

15. The method of claim 9, wherein coding the current node comprises decoding the current node.

16. The method of claim 9, wherein coding the current node comprises encoding the current node.

17. A computer-readable storage medium having stored thereon instructions that, when executed, cause a processor to:
determine that inter prediction data is coded for point data of a current node of an octree of point cloud data;
in response to the inter prediction data being coded for the point data of the current node, avoid coding a single occupancy value for the point data of the current node, the single occupancy value indicating whether only a single sub-node of the current node includes one or more points; and
code the current node using the inter prediction data.

18. The computer-readable storage medium of claim 17, wherein the current node comprises a first node, the single occupancy value comprises a first single occupancy value, further comprising instructions that cause the processor to:
determine that planar mask data is coded for a second node of the octree of the point cloud data;
in response to the planar mask data being coded for the second node:
avoid coding a second single occupancy value for the second node; and
code the second node using the planar mask data.

19. The computer-readable storage medium of claim 18, further comprising instructions that cause the processor to, when the inter prediction data and the planar mask data are not coded for a third node of the octree of the point cloud data:
code the single occupancy value for the third node; and
code the third node using the single occupancy value.

20. The computer-readable storage medium of claim 17, further comprising instructions that cause the processor to determine whether to code the single occupancy value according to numPlanarAxes numPlanarAxes <3||(!NeighbourPattern &&(!inter_pred_Occ||(mask_planar[0]|mask_planar[1]|mask_planar[2]))&&!numNonPlanarAxes, wherein numPlanarAxes indicates a number of planar axes for the current node, "||" represents a bitwise or operator, "!" represents a not operator, NeighbourPattern represents whether occupancy of neighboring nodes to the current node can be used to code occupancy of the current node, "&&" represents a bitwise and operator, inter_pred_Occ indicates whether a collocated node in an inter prediction reference frame for the current node is occupied by at least one point, mask_planar represents planar mask data for the current node, and numNonPlanarAxes represents a number of non-planar axes for the current node.

21. The computer-readable storage medium of claim 18, further comprising instructions that cause the processor to determine a context for entropy coding the planar mask data according to planar mask data for a collocated node to the second node in a reference frame.

22. The computer-readable storage medium of claim 21, wherein the planar mask data includes an indication of a location of a plane in a direction, further comprising instructions that cause the processor to calculate a context index for coding the indication according to (3*axisIdx+(RefPlane[axisIdx]+1)), wherein axisIdx indicates the direction of the plane, and RefPlane[axisIdx] indicates a location of a corresponding plane for the collocated node in the direction.

23. A device for coding point cloud data, the device comprising:
means for determining that inter prediction data is coded for point data of a current node of an octree of point cloud data;
means for avoiding coding a single occupancy value for the point data of the current node, the single occupancy value indicating whether only a single sub-node of the current node includes one or more points, in response to the inter prediction data being coded for the point data of the current node; and
means for coding the point data of the current node using the inter prediction data.

24. The device of claim 23, further comprising:
means for coding the single occupancy value for a second node when the inter prediction data and planar mask data are not coded for the second node; and
means for coding the second node using the single occupancy value when the inter prediction data and the planar mask data are not coded for the second node.

25. The device of claim 23, further comprising means for determining whether to code the single occupancy value according to numPlanarAxes <3||(!NeighbourPattern &&(!inter_pred_Occ||(mask_planar[0]|mask_planar[1]|mask_planar[2]) )&&!numNonPlanarAxes, wherein numPlanarAxes indicates a number of planar axes for the current node, "||" represents a bitwise or operator, "!" represents a not operator, NeighbourPattern represents whether occupancy of neighboring nodes to the current node can be used to code occupancy of the current node, "&&" represents a bitwise and operator, inter_pred_Occ indicates whether a collocated node in an inter prediction reference frame for the current node is occupied by at least one point, mask_planar represents planar mask data for the current node, and numNonPlanarAxes represents a number of non-planar axes for the current node.

26. The device of claim 24, further comprising means for determining a context for entropy coding the planar mask data according to planar mask data for a collocated node to the second node in a reference frame.

27. The device of claim 26, wherein the planar mask data includes an indication of a location of a plane in a direction, further comprising means for calculating a context index for coding the indication according to (3*axisIdx+(RefPlane[axisIdx]+1)), wherein axisIdx indicates the direction of the plane, and RefPlane[axisIdx] indicates a location of a corresponding plane for the collocated node in the direction.

28. The device of claim 1, wherein the current node comprises a first node of the octree of the point cloud data, wherein the single occupancy value comprises a first single occupancy value, and wherein the processing circuitry is further configured to:
- determine that inter prediction data is not coded for a second node of the point cloud data;
- determine not to generate planar mask data for the second node;
- in response to the inter prediction data not being coded and the determination not to generate the planar mask data for the second node, code a second single occupancy value for the second node, the second single occupancy value indicating whether only a single sub-node of the second node includes one or more points; and
- code the second node using the second single occupancy value.

29. The method of claim 9, wherein the current node comprises a first node of the octree of the point cloud data, wherein the single occupancy value comprises a first single occupancy value, the method further comprising:
- determining that inter prediction data is not coded for a second node of the point cloud data;
- determining not to generate planar mask data for the second node;
- in response to the inter prediction data not being coded and the determination not to generate the planar mask data for the second node, coding a second single occupancy value for the second node, the second single occupancy value indicating whether only a single sub-node of the second node includes one or more points; and
- coding the second node using the second single occupancy value.

30. The computer-readable storage medium of claim 17, wherein the current node comprises a first node of the octree of the point cloud data, wherein the single occupancy value comprises a first single occupancy value, further comprising instructions that cause the processor to:
- determine that inter prediction data is not coded for a second node of the point cloud data;
- determine not to generate planar mask data for the second node;
- in response to the inter prediction data not being coded and the determination not to generate the planar mask data for the second node, code a second single occupancy value for the second node, the second single occupancy value indicating whether only a single sub-node of the second node includes one or more points; and
- code the second node using the second single occupancy value.

* * * * *